(12) United States Patent
Ambrefe, Jr.

(10) Patent No.: US 9,516,460 B2
(45) Date of Patent: Dec. 6, 2016

(54) SYSTEMS AND METHODS FOR SECURITY CHECKPOINT CONDITION INFORMATION AND SHARING

(75) Inventor: Joseph T. Ambrefe, Jr., Indian Rocks Beach, FL (US)

(73) Assignee: SecurityPoint Holdings LLC, Tampa, FL (US)

( * ) Notice: Subject to any disclaimer, the term of this patent is extended or adjusted under 35 U.S.C. 154(b) by 270 days.

(21) Appl. No.: 13/608,785

(22) Filed: Sep. 10, 2012

(65) Prior Publication Data
US 2014/0070946 A1    Mar. 13, 2014

(51) Int. Cl.
| | |
|---|---|
| *G08B 13/00* | (2006.01) |
| *G05B 19/00* | (2006.01) |
| *G05B 23/00* | (2006.01) |
| *H04W 4/02* | (2009.01) |
| *G08B 21/02* | (2006.01) |
| *G06Q 30/02* | (2012.01) |

(52) U.S. Cl.
CPC ............... *H04W 4/02* (2013.01); *G06Q 30/02* (2013.01); *G08B 21/0269* (2013.01)

(58) Field of Classification Search
CPC .......... G08B 13/2417; G08B 13/2448; G08B 13/2462; G08B 25/014; G08B 25/016; G07C 9/00111; G07C 9/00031; G07C 9/00103; G07C 9/00007; G07C 9/00087; G07C 9/00166; G05B 19/0428; G06K 9/00771; G05D 23/1934; G06F 21/31
See application file for complete search history.

(56) References Cited

U.S. PATENT DOCUMENTS

| | | |
|---|---|---|
| 1,089,518 A | 3/1914 | Woodruff |
| 2,047,835 A | 7/1936 | Prew |

(Continued)

FOREIGN PATENT DOCUMENTS

| | | |
|---|---|---|
| DE | 3116679 | 1/1982 |
| DE | 3317087 | 11/1984 |

(Continued)

OTHER PUBLICATIONS

Transportation Security Administration, Automated Wait Time Technology, Aug. 3, 2012.*

(Continued)

*Primary Examiner* — Emily C Terrell
(74) *Attorney, Agent, or Firm* — Sheppard, Mullin, Richter & Hampton LLP

(57) ABSTRACT

Various embodiments discussed herein disclose a system comprising a user location engine, a checkpoint identification engine, a checkpoint identification engine, a presence notification engine, a checkpoint information engine, and an interuser connection engine. The user location engine determines an initial location when a user enters a given distance of a security checkpoint. The checkpoint identification engine provides a checkpoint identifier of the security checkpoint when the user is at the initial location. The presence notification engine receives a selection of the checkpoint identifier. The checkpoint information engine that receives user-generated information about the security checkpoint and also comprises a condition crowdsourcing engine to integrate the user-generated information into crowdsourced condition data associated with the security checkpoint. The interuser connection engine that provides the crowdsourced condition data to another user. Various systems and methods discussed herein may also discloses related methods and related computer-readable media.

33 Claims, 12 Drawing Sheets

(56) References Cited

U.S. PATENT DOCUMENTS

| | | |
|---|---|---|
| 2,069,957 A | 2/1937 | Klein |
| 2,123,257 A | 7/1938 | Provost |
| 2,206,775 A | 7/1940 | Hoofer |
| 2,573,164 A | 10/1951 | Scheinker |
| 2,699,235 A | 1/1955 | Chestnut |
| 2,830,825 A | 4/1958 | Berger et al. |
| 2,895,148 A | 7/1959 | Hildmann |
| 2,898,985 A | 8/1959 | Starr |
| 2,908,985 A | 10/1959 | Hartman |
| 2,924,900 A | 2/1960 | Hoofer |
| 2,937,947 A | 5/1960 | Hamilton et al. |
| 3,021,959 A | 2/1962 | KatterJohn |
| 3,190,386 A | 6/1965 | Swinny |
| 3,223,255 A | 12/1965 | Graybeal et al. |
| 3,330,576 A | 7/1967 | Willis |
| 3,341,219 A | 9/1967 | Marini et al. |
| 3,404,804 A | 10/1968 | Frater et al. |
| 3,418,947 A | 12/1968 | Harrison |
| 3,420,392 A | 1/1969 | Flint |
| 3,424,078 A | 1/1969 | Boyd et al. |
| RE26,587 E | 5/1969 | Thompson |
| 3,503,489 A | 3/1970 | Selis |
| 3,605,767 A | 9/1971 | Ettlinger et al. |
| 3,642,158 A | 2/1972 | Koennecke et al. |
| 3,666,073 A | 5/1972 | Hellermann et al. |
| 3,695,462 A | 10/1972 | Sullivan |
| 3,719,408 A | 3/1973 | Fullington et al. |
| 3,722,700 A | 3/1973 | Cummings |
| 3,729,037 A | 4/1973 | Dare et al. |
| 3,762,738 A | 10/1973 | Christina |
| 3,776,395 A | 12/1973 | Lingg et al. |
| 3,782,747 A | 1/1974 | Hamilton |
| 3,826,351 A | 7/1974 | Fromme |
| 3,976,208 A | 8/1976 | Buix et al. |
| 3,976,369 A | 8/1976 | McCardell et al. |
| 3,980,204 A | 9/1976 | DuBroff et al. |
| 3,995,164 A | 11/1976 | Ramsay et al. |
| 3,995,385 A | 12/1976 | Clipson et al. |
| 3,997,182 A | 12/1976 | Mortenson |
| 4,020,346 A | 4/1977 | Dennis |
| 4,021,266 A | 5/1977 | Kitterman et al. |
| 4,023,678 A | 5/1977 | Fiedler |
| 4,024,660 A | 5/1977 | Goto |
| 4,137,567 A | 1/1979 | Grube |
| 4,170,303 A | 10/1979 | Nolan |
| 4,239,969 A | 12/1980 | Haas et al. |
| 4,248,442 A | 2/1981 | Barrett |
| 4,324,915 A | 4/1982 | Roman |
| 4,354,600 A | 10/1982 | Treiber |
| 4,362,244 A | 12/1982 | Cornou |
| 4,411,829 A | 10/1983 | Schulte-Elte et al. |
| 4,434,306 A | 2/1984 | Kobayashi et al. |
| 4,468,165 A | 8/1984 | Kawasaki |
| 4,549,729 A | 10/1985 | Hoffstetter et al. |
| 4,579,489 A | 4/1986 | Sarantitis |
| 4,586,441 A | 5/1986 | Zekich |
| 4,629,383 A | 12/1986 | Buss |
| 4,679,691 A | 7/1987 | Halloran |
| 4,720,228 A | 1/1988 | Horiguchi et al. |
| 4,739,607 A | 4/1988 | Annas et al. |
| 4,741,657 A | 5/1988 | Cassel |
| 4,790,610 A | 12/1988 | Welch et al. |
| 4,823,955 A | 4/1989 | Apps |
| 4,844,264 A | 7/1989 | Deskiewicz, Jr. |
| 4,928,411 A | 5/1990 | Danis et al. |
| 4,976,369 A | 12/1990 | Shindo et al. |
| 4,979,870 A | 12/1990 | Mojden et al. |
| 5,010,668 A | 4/1991 | Zeligson |
| 5,060,249 A | 10/1991 | Eisen et al. |
| 5,080,217 A | 1/1992 | Garlichs et al. |
| 5,092,452 A | 3/1992 | Nakayama |
| 5,097,959 A | 3/1992 | Tilles et al. |
| 5,151,684 A | 9/1992 | Johnsen |
| 5,163,806 A | 11/1992 | Robertson et al. |
| 5,180,069 A | 1/1993 | Krummell et al. |
| 5,190,156 A | 3/1993 | Conaway |
| 5,190,428 A | 3/1993 | Bryant et al. |
| 5,192,092 A | 3/1993 | DiBenedetto |
| 5,214,574 A | 5/1993 | Chang |
| 5,301,790 A | 4/1994 | Prydtz et al. |
| 5,313,393 A | 5/1994 | Varley et al. |
| 5,329,102 A | 7/1994 | Sansone |
| 5,337,947 A | 8/1994 | Eskandry |
| 5,348,169 A | 9/1994 | Allen |
| 5,372,471 A | 12/1994 | Wu |
| 5,381,901 A | 1/1995 | Hundley |
| 5,388,049 A | 2/1995 | Sansone et al. |
| 5,390,785 A | 2/1995 | Garric et al. |
| 5,394,456 A | 2/1995 | Livingston |
| 5,413,205 A | 5/1995 | Taylor et al. |
| 5,445,397 A | 8/1995 | Evans |
| 5,462,299 A | 10/1995 | Maddux |
| 5,470,427 A | 11/1995 | Mikel et al. |
| 5,479,023 A | 12/1995 | Bartle |
| 5,484,160 A | 1/1996 | Ek |
| 5,487,010 A | 1/1996 | Drake et al. |
| 5,566,961 A | 10/1996 | Snell et al. |
| 5,575,375 A | 11/1996 | Sandusky et al. |
| 5,577,367 A | 11/1996 | Abrams et al. |
| 5,586,493 A | 12/1996 | McEntee |
| 5,588,659 A | 12/1996 | Boes et al. |
| 5,678,568 A | 10/1997 | Uchikubo et al. |
| 5,724,225 A | 3/1998 | Hrusoff et al. |
| 5,749,305 A | 5/1998 | Jacovelli |
| 5,805,660 A | 9/1998 | Perion et al. |
| 5,820,143 A | 10/1998 | Rigo |
| 5,841,346 A | 11/1998 | Park |
| 5,845,692 A | 12/1998 | Kellem et al. |
| 5,882,174 A | 3/1999 | Woerner et al. |
| 5,934,444 A | 8/1999 | Kierpaul et al. |
| 5,950,816 A | 9/1999 | Reid |
| 5,978,770 A * | 11/1999 | Waytena et al. ............ 705/5 |
| 5,988,858 A | 11/1999 | Yuyama et al. |
| 5,993,936 A | 11/1999 | Gardner |
| 6,058,159 A | 5/2000 | Conway et al. |
| 6,069,936 A | 5/2000 | Bjorkholm |
| 6,079,719 A | 6/2000 | Tisbo et al. |
| 6,109,492 A | 8/2000 | Eastwood |
| 6,131,927 A | 10/2000 | Krawczyz |
| 6,240,667 B1 | 6/2001 | Harney et al. |
| 6,253,948 B1 | 7/2001 | Ficker |
| 6,263,688 B1 | 7/2001 | Bedard |
| 6,264,219 B1 | 7/2001 | Smith |
| 6,276,515 B1 | 8/2001 | Wayer |
| 6,279,721 B1 | 8/2001 | Lyngso et al. |
| 6,286,522 B1 | 9/2001 | Host-Madsen et al. |
| 6,304,629 B1 | 10/2001 | Conway et al. |
| 6,311,822 B1 | 11/2001 | LeCroy |
| 6,356,802 B1 | 3/2002 | Tekehara et al. |
| 6,366,203 B1 | 4/2002 | Burns |
| 6,366,206 B1 | 4/2002 | Ishikawa et al. |
| 6,382,642 B1 | 5/2002 | Rainey |
| 6,431,344 B1 | 8/2002 | Emmermann et al. |
| 6,501,041 B1 | 12/2002 | Burns et al. |
| 6,507,278 B1 * | 1/2003 | Brunetti et al. ............ 340/541 |
| 6,520,544 B1 | 2/2003 | Mitchell et al. |
| 6,546,071 B2 | 4/2003 | Graves |
| 6,580,778 B2 | 6/2003 | Meder |
| 6,597,760 B2 | 7/2003 | Beneke et al. |
| 6,648,284 B2 | 11/2003 | Caporali et al. |
| 6,676,141 B1 | 1/2004 | Hadley |
| 6,720,874 B2 | 4/2004 | Fufido et al. |
| 6,745,520 B2 | 6/2004 | Puskaric et al. |
| 6,753,830 B2 | 6/2004 | Gelbman |
| 6,763,083 B2 | 7/2004 | Fernandez |
| 6,789,660 B1 | 9/2004 | Bruun et al. |
| 6,877,828 B2 | 4/2005 | Strong |
| 6,888,460 B2 | 5/2005 | Ambrefe |
| 6,907,982 B2 | 6/2005 | Olson et al. |
| 6,953,906 B2 | 10/2005 | Burns et al. |
| 7,012,256 B1 | 3/2006 | Roos et al. |
| 7,012,525 B1 | 3/2006 | Ghioto |
| 7,106,192 B2 | 9/2006 | Johnson et al. |
| 7,126,470 B2 * | 10/2006 | Clift et al. ............ 340/539.13 |

(56) References Cited

U.S. PATENT DOCUMENTS

| | | | |
|---|---|---|---|
| 7,156,220 | B2 | 1/2007 | Olson et al. |
| 7,210,545 | B1 | 5/2007 | Waid |
| 7,237,267 | B2* | 6/2007 | Rayes et al. ............... 726/25 |
| 7,270,227 | B2 | 9/2007 | Bender et al. |
| 7,451,925 | B2 | 11/2008 | Bonalle et al. |
| 7,599,770 | B2 | 10/2009 | Hardy |
| 7,599,847 | B2 | 10/2009 | Block |
| 7,617,136 | B1* | 11/2009 | Lessing et al. ............... 705/28 |
| 7,840,435 | B2 | 11/2010 | Robertson et al. |
| 8,577,708 | B2* | 11/2013 | Robertson et al. ......... 705/7.12 |
| 2003/0062373 | A1 | 4/2003 | Holland |
| 2003/0085808 | A1* | 5/2003 | Goldberg ..................... 340/531 |
| 2003/0210139 | A1* | 11/2003 | Brooks et al. ............... 340/531 |
| 2003/0214407 | A1* | 11/2003 | Sweatte ..................... 340/573.1 |
| 2003/0221931 | A1 | 12/2003 | Marsh |
| 2004/0016271 | A1 | 1/2004 | Shah et al. |
| 2004/0066012 | A1 | 4/2004 | Choi et al. |
| 2004/0100390 | A1* | 5/2004 | Giraldin ................ G06Q 10/02 340/4.6 |
| 2004/0124982 | A1* | 7/2004 | Kovach ..................... 340/572.1 |
| 2004/0174263 | A1 | 9/2004 | Sata |
| 2005/0065834 | A1* | 3/2005 | Hale et al. ....................... 705/8 |
| 2005/0083171 | A1* | 4/2005 | Hamilton ........... G07C 9/00103 340/5.7 |
| 2005/0173284 | A1 | 8/2005 | Ambrefe |
| 2005/0190061 | A1 | 9/2005 | Trela |
| 2005/0193648 | A1 | 9/2005 | Klein et al. |
| 2006/0100922 | A1 | 5/2006 | Odemis et al. |
| 2006/0149640 | A1 | 7/2006 | Gordon et al. |
| 2006/0243632 | A1 | 11/2006 | Trahan |
| 2006/0279422 | A1 | 12/2006 | Sweatte |
| 2007/0046426 | A1 | 3/2007 | Ishibashi |
| 2007/0126575 | A1 | 6/2007 | Ambrefe |
| 2007/0132580 | A1 | 6/2007 | Ambrefe |
| 2007/0286220 | A1* | 12/2007 | Stenning ................ G07C 11/00 370/412 |
| 2007/0290843 | A1 | 12/2007 | Manneschi |
| 2008/0261510 | A1* | 10/2008 | Lin .......................... G06Q 10/06 455/3.01 |
| 2009/0270693 | A1 | 10/2009 | Hyde et al. |
| 2009/0319306 | A1* | 12/2009 | Chanick ............. G01C 21/3679 705/5 |
| 2010/0321155 | A1* | 12/2010 | Ballard ......................... 340/5.81 |
| 2011/0143728 | A1 | 6/2011 | Holopainen et al. |
| 2011/0227697 | A1* | 9/2011 | Spencer et al. ................ 340/5.6 |
| 2015/0186957 | A1* | 7/2015 | Barr et al. ........................ 30/281 |

FOREIGN PATENT DOCUMENTS

| | | |
|---|---|---|
| DE | 3840816 | 6/1990 |
| DE | 4012084 | 10/1991 |
| EP | 0227254 | 7/1987 |
| EP | 0275521 | 1/1990 |
| EP | 0556037 | 4/1996 |
| EP | 0787668 | 8/1998 |
| EP | 1151919 | 11/2001 |
| EP | 1232879 | 8/2005 |
| FR | 914076 | 9/1946 |
| GB | 682669 | 11/1952 |
| GB | 2147569 | 5/1985 |
| GB | 2362710 | 11/2001 |
| GB | 2362711 | 11/2001 |
| NL | 8005534 | 10/1980 |
| WO | 90/03723 | 4/1990 |
| WO | 9003140 | 4/1990 |
| WO | 9314008 | 7/1993 |
| WO | 9933723 | 7/1999 |
| WO | 0151369 | 7/2001 |
| WO | 0229744 | 4/2002 |

OTHER PUBLICATIONS

Complaint, SecurityPoint Holdings, L.L.C. b. U.S.A., No. 11-cv-268 (U.S. Ct. Fed. Cl. filed May 2, 2011).

US Court of Federal Claims, "Complaint against United States of America," *SecurityPoint Holdings, Inc v. U.S.*, Case No. 1:11-cv-00268-EGB, May 2, 2011, with Civil Cover sheet.

US Court of Federal Claims, "Amended Complaint against United States of America," *SecurityPoint Holdings, Inc v. U.S.*, Case No. 1:11-cv-00268-EGB, Aug. 30, 2011, with Exhibits A-C.

US Court of Federal Claims, "Answer to Amended Complaint against United States of America," *SecurityPoint Holdings, Inc v. U.S.*, Case No. 1:11-cv-00268-EGB, Aug. 30, 2011.

US Court of Federal Claims, "Joint Status Report, filed by SecurityPoint Holdings, Inc," *SecurityPoint Holdings, Inc v. U.S.*, Case No. 1:11-cv-00268-EGB, Oct. 6, 2011.

US Court of Federal Claims, "Joint Proposed Schedule for Initial Liability Phase of Case, filed by SecurityPoint Holdings, Inc," *SecurityPoint Holdings, Inc v. U.S.*, Case No. 1:11-cv-00268-EGB, Oct. 31, 2011.

US Court of Federal Claims, "Scheduling Order with respect to claim construction statements, expert reports, joinder of parties, motions for summary judgment, and fact discovery on liability," *SecurityPoint Holdings, Inc v. U.S.*, Case No. 1:11-cv-00268-EGB, Nov. 3, 2011.

US Court of Federal Claims, "Joint Claim Construction Statement filed by all parties," *SecurityPoint Holdings, Inc v. U.S.*, Case No. 1:11-cv-00268-EGB, Feb. 6, 2012.

US Court of Federal Claims, "Status Conference Order," *SecurityPoint Holdings, Inc v. U.S.*, Case No. 1:11-cv-00268-EGB, Mar. 5, 2012.

US Court of Federal Claims, "Scheduling Order with respect to fact discovery," *SecurityPoint Holdings, Inc v. U.S.*, Case No. 1:11-cv-00268-EGB, Mar. 27, 2012.

US Court of Federal Claims, "Transcript of Proceedings held on Mar. 8, 2012 before Senior Judge Eric G. Bruggink," *SecurityPoint Holdings, Inc v. U.S.*, Case No. 1:11-cv-00268-EGB, Mar. 29, 2012.

US Court of Federal Claims, "Joint Motion to Amend/Correct Scheduling Order, filed by SecurityPoint Holdings, Inc," *SecurityPoint Holdings, Inc v. U.S.*, Case No. 1:11-cv-00268-EGB, Jun. 1, 2012.

US Court of Federal Claims, "Order granting Motion to Amend/Correct Scheduling Order," *SecurityPoint Holdings, Inc v. U.S.*, Case No. 1:11-cv-00268-EGB, Jun. 7, 2012.

US Court of Federal Claims, "Securitypoint's Opening Markman Claim Construction Brief, filed by SecurityPoint Holdings, Inc," *SecurityPoint Holdings, Inc v. U.S.*, Case No. 1:11-cv-00268-EGB, Jun. 18, 2012, with Exhibits 1-13.

US Court of Federal Claims, "Securitypoint's Supplemental Index of Supplemental Exhibits in support of Plaintiff's opening Markman Claim Construction, filed by SecurityPoint Holdings, Inc," *SecurityPoint Holdings, Inc v. U.S.*, Case No. 1:11-cv-00268-EGB, Jun. 22, 2012, with Supplemental Exhibits 10 and 13.

US Court of Federal Claims, "United States of America's Markman Claim Construction Brief, filed by United States of America," *SecurityPoint Holdings, Inc v. U.S.*, Case No. 1:11-cv-00268-EGB, Aug. 5, 2012, with Exhibits 14-17, 18, and 19-22.

US Court of Federal Claims, "Securitypoint's Reply Markman Claim Construction Brief, filed by SecurityPoint Holdings, Inc," *SecurityPoint Holdings, Inc v. U.S.*, Case No. 1:11-cv-00268-EGB, Sep. 17, 2012.

US Court of Federal Claims, "Joint Pre-Markman Claim Construction Hearing Statement, filed by SecurityPoint Holdings, Inc," *SecurityPoint Holdings, Inc v. U.S.*, Case No. 1:11-cv-00268-EGB, Oct. 1, 2012, with Exhibits 7-10, 11-13, 14-17, 18, and 19-22.

US Court of Federal Claims, "Scheduling Order with respect to exchanging of demonstrative exhibits for Claim Construction Hearing," *SecurityPoint Holdings, Inc v. U.S.*, Case No. 1:11-cv-00268-EGB, Oct. 10, 2012.

US Court of Federal Claims, "Securitypoint's objections to the United States of America's Markman Claim Construction Hearing demonstrative exhibit, filed by SecurityPoint Holdings, Inc," *SecurityPoint Holdings, Inc v. U.S.*, Case No. 1:11-cv-00268-EGB, Nov. 9, 2012, with Exhibits C, C part 2 and D.

(56) References Cited

OTHER PUBLICATIONS

US Court of Federal Claims, "United States of America's objections to Securitypoint's Markman Hearing demonstrative exhibits, filed by All Defendants" *SecurityPoint Holdings, Inc v. U.S.*, Case No. 1:11-cv-00268-EGB, Nov. 9, 2012, with Appendixes 1 and 2.

US Court of Federal Claims, "Securitypoint's responses to United States of America's objections to Securitypoint's Markman Hearing demonstrative exhibits, filed by SecurityPoint Holdings, Inc," *SecurityPoint Holdings, Inc v. U.S.*, Case No. 1:11-cv-00268-EGB, Nov. 13, 2012.

US Court of Federal Claims, "Stipulation Regarding Proof of Liability Under 28 U.S.C. § 1498(a), filed by SecurityPoint Holdings, Inc," *SecurityPoint Holdings, Inc v. U.S.*, Case No. 1:11-cv-00268-EGB, Nov. 16, 2012.

US Court of Federal Claims, "Order accepting Joint Stipulation," *SecurityPoint Holdings, Inc v. U.S.*, Case No. 1:11-cv-00268-EGB, Nov. 28, 2012.

US Court of Federal Claims, "Notice of Filing of Certified Transcript for proceedings held on Nov. 14, 2012 in Washington, DC," *SecurityPoint Holdings, Inc v. U.S.*, Case No. 1:11-cv-00268-EGB, Dec. 4, 2012.

US Court of Federal Claims, "Transcript of Proceedings held on Nov. 14, 2012 before Judge Eric G. Bruggink," *SecurityPoint Holdings, Inc v. U.S.*, Case No. 1:11-cv-00268-EGB, Dec. 4, 2012.

US Court of Federal Claims, "Securitypoint's motion for substitution of parties based on conversion of corporate entity, filed by SecurityPoint Holdings, Inc," *SecurityPoint Holdings, Inc v. U.S.*, Case No. 1:11-cv-00268-EGB, Dec. 19, 2012.

US Court of Federal Claims, "Order granting Securitypoint's motion for substitution of parties," *SecurityPoint Holdings, Inc v. U.S.*, Case No. 1:11-cv-00268-EGB, Jan. 4, 2013.

US Court of Federal Claims, "Published Claim Construction Opinion," *SecurityPoint Holdings, Inc v. U.S.*, Case No. 1:11-cv-00268-EGB, Feb. 20, 2013, with Attachment 1.

US Court of Federal Claims, "Scheduling Order with respect to Motions for Summary Judgment," *SecurityPoint Holdings, Inc v. U.S.*, Case No. 1:11-cv-00268-EGB, Mar. 7, 2013.

US Court of Federal Claims, "Transcript of Proceedings held on Feb. 27, 2013 before Senior Judge Eric G. Bruggink," *SecurityPoint Holdings, Inc v. U.S.*, Case No. 1:11-cv-00268-EGB, Mar. 7, 2013.

US Court of Federal Claims, "Stipulation and [Proposed] Order Regarding Patent Use Under 28 U.S.C. 1498 (a), filed by SecurityPoint Holdings, Inc," *SecurityPoint Holdings, Inc v. U.S.*, Case No. 1:11-cv-00268-EGB, Jun. 6, 2013.

US Court of Federal Claims, "Order granting Stipulation," *SecurityPoint Holdings, Inc v. U.S.*, Case No. 1:11-cv-00268-EGB, Jul. 3, 2013.

US Court of Federal Claims, "Motion for Summary Judgment of Patent Invalidity, filed by United States of America," *SecurityPoint Holdings, Inc v. U.S.*, Case No. 1:11-cv-00268-EGB, Jul. 12, 2013, with Exhibits 1, 2, 3-6, and 7-10.

US Court of Federal Claims, Motion to Strike Motion for Summary Judgment of Patent Invalidity, filed by SecurityPoint Holdings, Inc, *SecurityPoint Holdings, Inc v. U.S.*, Case No. 1:11-cv-00268-EGB, Jul. 16, 2013, with Exhibits 1-6.

US Court of Federal Claims, "Scheduling Order with respect to Securitypoint's filing of opposition to Motion for Summary Judgments," *SecurityPoint Holdings, Inc v. U.S.*, Case No. 1:11-cv-00268-EGB, Jul. 18, 2013.

US Court of Federal Claims, "Response to Motion to Strike Motion for Summary Judgment of Patent Invalidity, filed by United States of America," *SecurityPoint Holdings, Inc v. U.S.*, Case No. 1:11-cv-00268-EGB, Aug. 2, 2012, with Appendix of Exhibits 1-3.

US Court of Federal Claims, "Reply to Response to Motion to Strike Motion for Summary Judgment of Patent Invalidity, filed by SecurityPoint Holdings, Inc," *SecurityPoint Holdings, Inc v. U.S.*, Case No. 1:11-cv-00268-EGB, Aug. 12, 2013, with Exhibit 7.

US Court of Federal Claims, "Order denying SecurityPoint's Motion to Strike," *SecurityPoint Holdings, Inc v. U.S.*, Case No. 1:11-cv-00268-EGB, Aug. 28, 2013.

US Court of Federal Claims, "Notice of Filing of Certified Transcript for proceedings held on Aug. 16, 2013," *SecurityPoint Holdings, Inc v. U.S.*, Case No. 1:11-cv-00268-EGB, Sep. 4, 2013.

US Court of Federal Claims, "Transcript of Proceedings held on Aug. 16, 2013 before Judge Eric G. Bruggink," *SecurityPoint Holdings, Inc v. U.S.*, Case No. 1:11-cv-00268-EGB, Sep. 4, 2013.

US Court of Federal Claims, "Joint Status Report Regarding Summary Judgment Briefing and Related Supplemental Discovery, filed by SecurityPoint Holdings, Inc," *SecurityPoint Holdings, Inc v. U.S.*, Case No. 1:11-cv-00268-EGB, Sep. 6, 2013.

US Court of Federal Claims, "Scheduling Order with respect to Expert Declarations and Motion for Summary Judgement," *SecurityPoint Holdings, Inc v. U.S.*, Case No. 1:11-cv-00268-EGB, Sep. 9, 2013.

US Court of Federal Claims, "SecurityPoint's opposition to United States of America's Motion for Summary Judgment of Patent Invalidity for Anticipation and Obviousness, and Cross-Motion for Summary Judgment of Lack of Invalidity for Anticipation and Obviousness, filed by SecurityPoint Holdings, Inc," *SecurityPoint Holdings, Inc v. U.S.*, Case No. 1:11-cv-00268-EGB, Oct. 1, 2013, with Exhibits A, 1-3, 4-7, 8-11, 15-18, 19-21, 23-24, 25-27, B-D, and 12-14 (added on Oct. 2, 2013).

US Court of Federal Claims, "Reply to Response to Motion re Motion for Summary Judgment of Patent Invalidity and Response to Cross-Motion for Lack of Invalidity, filed by United States," *SecurityPoint Holdings, Inc v. U.S.*, Case No. 1:11-cv-00268-EGB, Nov. 22, 2013, with Exhibits 11-12.

US Court of Federal Claims, "SecurityPoint's Reply in support of its Cross-Motion for Summary Judgment of Lack of Invalidity, filed by SecurityPoint Holdings, Inc," *SecurityPoint Holdings, Inc v. U.S.*, Case No. 1:11-cv-00268-EGB, Dec. 9, 2013, with Exhibits E, F, G, H, I, J-M, N.

US Court of Federal Claims, "United States' Motion to Strike SecurityPoint's Reply Summary Judgement Exhibits, filed by United States," *SecurityPoint Holdings, Inc v. U.S.*, Case No. 1:11-cv-00268-EGB, Dec. 20, 2013.

US Court of Federal Claims, SecurityPoint's Opposition to United States' Motion to Strike SecurityPoint's Reply Summary Judgment Exhibits, filed by SecurityPoint Holdings, Inc, *SecurityPoint Holdings, Inc v. U.S.*, Case No. 1:11-cv-00268-EGB, Jan. 6, 2014.

US Court of Federal Claims, "Order denying United States' Motion to Strike," *SecurityPoint Holdings, Inc v. U.S.*, Case No. 1:11-cv-00268-EGB, Jan. 8, 2014.

US Court of Federal Claims, "Sur-Reply re Motion for Summary Judgment of Patent Invalidity, filed by United States," *SecurityPoint Holdings, Inc v. U.S.*, Case No. 1:11-cv-00268-EGB, Jan. 23, 2014.

US Court of Federal Claims, "Notice of Directly Related Case(s), filed by United States," *SecurityPoint Holdings, Inc v. U.S.*, Case No. 1:11-cv-00268-EGB, Feb. 6, 2014.

US Court of Federal Claims, "Response to Notice of Directly Related Case(s), filed by SecurityPoint Holdings, Inc," *SecurityPoint Holdings, Inc v. U.S.*, Case No. 1:11-cv-00268-EGB, Feb. 11, 2014.

US Court of Federal Claims, "Order denying United States' Motion for Summary Judgment; denying SecurityPoint's Cross Motion for Summary Judgment," *SecurityPoint Holdings, Inc v. U.S.*, Case No. 1:11-cv-00268-EGB, Feb. 24, 2014.

US Court of Federal Claims, "Notice of Filing of Certified Transcript for proceedings held on Feb. 21, 2014 in Washington, DC," *SecurityPoint Holdings, Inc v. U.S.*, Case No. 1:11-cv-00268-EGB, Mar. 5, 2014.

US Court of Federal Claims, "Transcript of Proceedings held on Feb. 21, 2014 before Senior Judge Eric G. Bruggink," *SecurityPoint Holdings, Inc v. U.S.*, Case No. 1:11-cv-00268-EGB, Mar. 5, 2014.

US Court of Federal Claims, "Motion to Stay the case pending Patent Office action in the initiated reexamination, filed by the United States," *SecurityPoint Holdings, Inc v. U.S.*, Case No. 1:11-cv-00268-EGB, Mar. 24, 2014.

US Court of Federal Claims, "Joint Status Report Proposing Pretrial and Trial Schedule of Events, filed by SecurityPoint Holdings, Inc," *SecurityPoint Holdings, Inc v. U.S.*, Case No. 1:11-cv-00268-EGB, Mar. 25, 2014.

(56) References Cited

OTHER PUBLICATIONS

US Court of Federal Claims, "Response to Motion to Stay the case pending Patent Office action in the initiated reexamination, filed by SecurityPoint Holdings, Inc," *SecurityPoint Holdings, Inc v. U.S.*, Case No. 1:11-cv-00268-EGB, Mar. 28, 2014, with Exhibits 1, A, B, 2.
US Court of Federal Claims, "Reply to Response to Motion re Motion to Stay the case pending Patent Office action in the initiated reexamination, filed by United States," *SecurityPoint Holdings, Inc v. U.S.*, Case No. 1:11-cv-00268-EGB, Apr. 7, 2014, with Appendix.
US Court of Federal Claims, "Order denying United States' Motion to Stay," *SecurityPoint Holdings, Inc v. U.S.*, Case No. 1:11-cv-00268-EGB, Apr. 9, 2014.
US Court of Federal Claims, "Joint Status Report Proposing Pretrial Schedule of Events, filed by SecurityPoint Holdings, Inc," *SecurityPoint Holdings, Inc v. U.S.*, Case No. 1:11-cv-00268-EGB, Apr. 18, 2014.
US Court of Federal Claims, "Notice of Filing of Certified Transcript for proceedings held on Apr. 9, 2014 in Washington, DC," *SecurityPoint Holdings, Inc v. U.S.*, Case No. 1:11-cv-00268-EGB, Apr. 29, 2014.
US Court of Federal Claims, "Transcript of Proceedings held on Apr. 9, 2014 before Senior Judge Eric. G. Bruggink," *SecurityPoint Holdings, Inc v. U.S.*, Case No. 1:11-cv-00268-EGB, Apr. 29, 2014.
US Court of Federal Claims, "Scheduling Order with respect to Expert Discovery, Contentions of Fact and Law, and Joint Pretrial Report," *SecurityPoint Holdings, Inc v. U.S.*, Case No. 1:11-cv-00268-EGB, May 12, 2014.
US Court of Federal Claims, "Motion for Extension of Time to Serve Opening Expert Reports until after SecurityPoint Responds to the Patent Office Patentability Rejections, filed by United States," *SecurityPoint Holdings, Inc v. U.S.*, Case No. 1:11-cv-00268-EGB, May 23, 2014.
US Court of Federal Claims, "Response to Motion for Extension of Time to Serve Opening Expert Reports, filed by SecurityPoint Holdings, Inc," *SecurityPoint Holdings, Inc v. U.S.*, Case No. 1:11-cv-00268-EGB, Jun. 4, 2014.
US Court of Federal Claims, "United States' Objections and Responses to SecurityPoint's First Requests for production of documents," *SecurityPoint Holdings, Inc v. U.S.*, Case No. 1:11-cv-00268-EGB, Submitted Mar. 5, 2012.
US Court of Federal Claims, "SecurityPoint's Response to United States' Document request," *SecurityPoint Holdings, Inc v. U.S.*, Case No. 1:11-cv-00268-EGB.
US Court of Federal Claims, "Defendant's Response to Plaintiffs Document Request 38" *SecurityPoint Holdings, Inc v. U.S.*, Case No. 1:11-cv-00268-EGB.
US Court of Federal Claims, "Defendant's Invalidity Contentions," *SecurityPoint Holdings, Inc v. U.S.*, Case No. 1:11-cv-00268-EGB, Submitted May 14, 2012.
Federal Aviation Administration, Recommended Security Guidelines for Airport Planning, Design and Construction, DOT/FAA/AR-00/52, Jun. 2001.
Transportation Security Administration, Strategic Airport Security Rollout: Security Checkpoint Layout Design DTSA59-02-D-00403, Sep. 5, 2003.
Transportation Security Administration, Aviation Security: Security Checkpoint Layout Design/Reconfiguration Guide, Nov. 7, 2006.
Transportation Security Administration, Checkpoint Design Guide (CDG) Revision 1, Feb. 11, 2009.
Expert Report of John H. Huey and Appendices A-G, with Plaintiff's Disclosure, *SecurityPoint Holdings, Inc v. United States*, Case No. 1:11-cv-00268-EGB, U.S. Court of Federal Claims, (Mar. 22, 2013).
Initial Expert Report of Sant R. Arora, *SecurityPoint Holdings, Inc v. United States*, Case No. 1:11-cv-00268-EGB, U.S. Court of Federal Claims (Mar. 22, 2013).
Reply Expert Report of Sant R. Arora, *SecurityPoint Holdings, Inc v. United States*, Case No. 1:11-cv-00268-EGB, U.S. Court of Federal Claims (May 15, 2013).
Curriculum Vitae of Sant R. Arora, *SecurityPoint Holdings, Inc v. United States*, Case No. 1:11-cv-00268-EGB, U.S. Court of Federal Claims (May 15, 2013).
Deposition Transcript of Sant R. Arora, *SecurityPoint Holdings, Inc v. United States*, Case No. 1:11-cv00268-EGB, U.S. Court of Federal Claims (Jun. 4, 2013).
Deposition Transcript of Dr. Layek Abdel-Malek, *SecurityPoint Holdings, Inc v. United States*, Case No. 1:11-cv-00268-EGB, U.S. Court of Federal Claims (Jun. 6, 2013).
Deposition Transcript of Dr. Layek Abdel-Malek, *SecurityPoint Holdings, Inc v. United States*, Case No. 1:11-cv-00268-EGB, U.S. Court of Federal Claims (Nov. 15, 2013).
Deposition Transcript of Joe Ambrefe, *SecurityPoint Holdings, Inc v. United States*, Case No. 1:11-cv-00268-EGB, U.S. Court of Federal Claims (Nov. 28, 2012).
Complaint by SecurityPoint, *SecurityPoint Media, LLC v. The Adason Group, LLC et al.*, Case No. 8:07-cv-00444-SCB-TGW, (U.S. Dist. Ct. Middle District of Fla. Filed Mar. 12, 2007).
Answer and affirmative defenses and counterclaim by The Conner Group, Stephen Conner, *SecurityPoint Media, LLC v. The Adason Group, LLC et al.*, Case No. 8:07-cv-00444-SCB-TGW, (U.S. Dist. Ct. Middle District of Fla. Filed Apr. 2, 2007).
Answer and affirmative defenses and counterclaim by The Adason Group, *SecurityPoint Media, LLC v. The Adason Group, LLC et al.*, Case No. 8:07-cv-00444-SCB-TGW, (U.S. Dist. Ct. Middle District of Fla. Filed Apr. 4, 2007).
Motion to dismiss Third Counterclaim of Defendants the Conner Group and Stephen Conner by SecurityPoint, *SecurityPoint Media, LLC v. The Adason Group, LLC et al.*, Case No. 8:07-cv-00444-SCB-TGW, (U.S. Dist. Ct. Middle District of Fla. Filed Apr. 23, 2007).
Motion to dismiss Third Counterclaim of Defendants the Adason Group by SecurityPoint, *SecurityPoint Media, LLC v. The Adason Group, LLC et al.*, Case No. 8:07-cv-00444-SCB-TGW, (U.S. Dist. Ct. Middle District of Fla. Filed Apr. 24, 2007).
Response to Motion to dismiss Third Counterclaim of Defendants the Conner Group and Stephen Conner by SecurityPoint, *SecufityPoint Media, LLC v. The Adason Group, LLC et al.*, Case No. 8:07-cv-00444-SCB-TGW, (U.S. Dist. Ct. Middle District of Fla. Filed May 7, 2007).
Response to Motion to dismiss Third Counterclaim of Defendants the Adason Group by SecurityPoint, *SecurityPoint Media, LLC v. The Adason Group, LLC et al.*, Case No. 8:07-cv-00444-SCB-TGW, (U.S. Dist. Ct. Middle District of Fla. Filed May 8, 2007).
Order directing defendants to file amended counterclaims, *SecurityPoint Media, LLC v. The Adason Group, LLC et al.*, Case No. 8:07-cv-00444-SCB-TGW, (U.S. Dist. Ct. Middle District of Fla. Filed May 8, 2007).
First Amended Counterclaim by the Conner Group, Stephen Conner, *SecurityPoint Media, LLC v. The Adason Group, LLC et al.*, Case No. 8:07-cv-00444-SCB-TGW, (U.S. Dist. Ct. Middle District of Fla. Filed May 21, 2007).
First Amended Counterclaim by The Adason Group, *SecurityPoint Media, LLC v. The Adason Group, LLC et al.*, Case No. 8:07-cv-00444-SCB-TGW, (U.S. Dist. Ct. Middle District of Fla. Filed May 21, 2007).
Order denying motion to dismiss as moot, *SecurityPoint Media, LLC v. The Adason Group, LLC et al.*, Case No. 8:07-cv-00444-SCB-TGW, (U.S. Dist. Ct. Middle District of Fla. Filed May 22, 2007).
Motion to dismiss Third and Fourth Counterclaims, *SecurityPoint Media, LLC v. The Adason Group, LLC et al.*, Case No. 8:07-cv-00444-SCB-TGW, (U.S. Dist. Ct. Middle District of Fla. Filed Jun. 11, 2007).
Response to Motion to dismiss Third and Fourth Counterclaims, *SecurityPoint Media, LLC v. The Adason Group, LLC et al.*, Case No. 8:07-cv-00444-SCB-TGW, (U.S. Dist. Ct. Middle District of Fla. Filed Jun. 28, 2007).
Reply to Motion to dismiss Third and Fourth Counterclaims, *SecurityPoint Media, LLC v. The Adason Group, LLC et al.*, Case No. 8:07-cv-00444-SCB-TGW, (U.S. Dist. Ct. Middle District of Fla. Filed Jul. 23, 2007).

(56) References Cited

OTHER PUBLICATIONS

Order denying motion to dismiss, *SecurityPoint Media, LLC* v. *The Adason Group, LLC et al.*, Case No. 8:07-cv-00444-SCB-TGW, (U.S. Dist. Ct. Middle District of Fla. Filed Aug. 7, 2007).
Order for patent infringement case, *SecurityPoint Media, LLC* v. *The Adason Group, LLC et al.*, Case No. 8:07-cv-00444-SCB-TGW, (U.S. Dist. Ct. Middle District of Fla. Filed Aug. 9, 2007).
Reply to counterclaim, *SecurityPoint Media, LLC* v. *The Adason Group, LLC et al.*, Case No. 8:07-cv-00444-SCB-TGW, (U.S. Dist. Ct. Middle District of Fla. Filed Aug. 21, 2007).
Joint Motion for Protective Order, *SecurityPoint Media, LLC* v. *The Adason Group, LLC et al.*, Case No. 8:07-cv-00444-SCB-TGW, (U.S. Dist. Ct. Middle District of Fla. Filed Aug. 28, 2007).
Order granting motion protective order, *SecurityPoint Media, LLC* v. *The Adason Group, LLC et al.*, Case No. 8:07-cv-00444-SCB-TGW, (U.S. Dist. Ct. Middle District of Fla. Filed Sep. 5, 2007).
Motion to compel by SecurityPoint and Exhibits A-Q, *SecurityPoint Media, LLC* v. *The Adason Group, LLC et al.*, Case No. 8:07-cv-00444-SCB-TGW, (U.S. Dist. Ct. Middle District of Fla. Filed Oct. 11, 2007).
Motion to compel by Defendants and Exhibits A-G, *SecurityPoint Media, LLC* v. *The Adason Group, LLC et al.*, Case No. 8:07-cv-00444-SCB-TGW, (U.S. Dist. Ct. Middle District of Fla. Filed Oct. 16, 2007).
Response to motion to compel by SecurityPoint and Exhibits A-C, *SecurityPoint Media, LLC* v. *The Adason Group, LLC et al.*, Case No. 8:07-cv-00444-SCB-TGW, (U.S. Dist. Ct. Middle District of Fla. Filed Oct. 29, 2007).
Notice of Compliance by SecurityPoint, *SecurityPoint Media, LLC* v. *The Adason Group, LLC et al.*, Case No. 8:07-cv-00444-SCB-TGW, (U.S. Dist. Ct. Middle District of Fla. Filed Nov. 9, 2007).
Supplemental motion to compel by SecurityPoint and Exhibits 1-9, *SecurityPoint Media, LLC* v. *The Adason Group, LLC et al.*, Case No. 8:07-cv-00444-SCB-TGW, (U.S. Dist. Ct. Middle District of Fla. Filed Nov. 13, 2007).
Order granting motion to compel by SecurityPoint, *SecurityPoint Media, LLC* v. *The Adason Group, LLC et al.*, Case No. 8:07-cv-00444-SCB-TGW, (U.S. Dist. Ct. Middle District of Fla. Filed Nov. 16, 2007).
Order that cause dismissed without prejudice based upon telephonic notice of settlement, *SecurityPoint Media, LLC* v. *The Adason Group, LLC et al.*, Case No. 8:07-cv-00444-SCB-TGW, (U.S. Dist. Ct. Middle District of Fla. Filed Nov. 20, 2007).
Motion to reopen case and enforce interim settlement agreement by SecurityPoint and Exhibits 1-3, *SecurityPoint Media, LLC* v. *The Adason Group, LLC et al.*, Case No. 8:07-cv-00444-SCB-TGW, (U.S. Dist. Ct. Middle District of Fla. Filed Jan. 18, 2008).
Proposed consent judgment, *SecurityPoint Media, LLC* v. *The Adason Group, LLC et al.*, Case No. 8:07-cv-00444-SCB-TGW, (U.S. Dist. Ct. Middle District of Fla. Filed Jan. 23, 2008).
Order of Permanent Injunction and Final Judgment, *SecurityPoint Media, LLC* v. *The Adason Group, LLC et al.*, Case No. 8:07-cv-00444-SCB-TGW, (U.S. Dist. Ct. Middle District of Fla. Filed Jan. 24, 2008).
Motion Enforcement of Settlement Agreement by SecurityPoint, *SecurityPoint Media, LLC* v. *The Adason Group, LLC et al.*, Case No. 8:07-cv-00444-SCB-TGW, (U.S. Dist. Ct. Middle District of Fla. Filed Feb. 5, 2008).
Response to Motion Enforcement of Settlement Agreement by SecurityPoint, *SecurityPoint Media, LLC* v. *The Adason Group, LLC et al.*, Case No. 8:07-cv-00444-SCB-TGW, (U.S. Dist. Ct. Middle District of Fla. Filed Feb. 25, 2008).
Order granting Motion Enforcement of Settlement Agreement by SecurityPoint, *SecurityPoint Media, LLC* v. *The Adason Group, LLC et al.*, Case No. 8:07-cv-00444-SCB-TGW, (U.S. Dist. Ct. Middle District of Fla. Filed Apr. 11, 2008).
Judgment in favor of SecurityPoint, *SecurityPoint Media, LLC* v. *The Adason Group, LLC et al.*, Case No. 8:07-cv-00444-SCB-TGW, (U.S. Dist. Ct. Middle District of Fla. Filed Apr. 11, 2008).

Complaint by SecurityPoint and Exhibit A, *SecurityPoint Media, LLC* v. *The Adason Group, LLC*, Case No. 8:07-cv-00100-SCB-EAJ, (U.S Dist. Ct. Middle District of Fla. Filed Jan. 16, 2007).
Motion to dismiss Complaint by The Adason Group and Attachment, *SecurityPoint Media, LLC* v. *The Adason Group, LLC*, Case No. 8:07-cv-00100-SCB-EAJ, (U.S Dist. Ct. Middle District of Fla. Filed Feb. 22, 2007).
Notice of Voluntary Dismissal by SecurityPoint, *SecurityPoint Media, LLC* v. *The Adason Group, LLC*, Case No. 8:07-cv-00100-SCB-EAJ, (U.S Dist. Ct. Middle District of Fla. Filed Mar. 12, 2007).
Order, *SecurityPoint Media, LLC* v. *The Adason Group, LLC*, Case No. 8:07-cv-00100-SCB-EAJ, (U.S Dist. Ct. Middle District of Fla. Filed Mar. 14, 2007).
Defendant's Initial Disclosure of Prior Art and Production, *SecurityPoint Media, LLC* v. *The Adason Group LLC et al*. Case No. 8:07-cv-00444-SCB-TGW (U.S. Dist. Ct. Middle District of Fla. Served Sep. 13, 2007).
Plaintiff's Claim Chart, *SecurityPoint Media, LLC* v. *The Adason Group LLC et al*. Case No. 8:07-cv-00444-SCB-TGW (U.S. Dist. Ct. Middle District of Fla. Served Oct. 18, 2007).
Expert Witness Report of Robert Cammaroto in support of Defendant, *SecurityPoint Holdings, Inc* v. *United States*, Case No. 1:11-cv-00268-EGB, U.S. Court of Federal Claims (Jul. 24, 2014).
Ex. 1 (Resume) to Expert Witness Report of Robert Cammaroto in support of Defendant, *SecurityPoint Holdings, Inc* v. *United States*, Case No. 1:11-cv-00268-EGB, U.S. Court of Federal Claims (Jul. 24, 2014).
Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 1 (Resume) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 3 (Excerpts from Handbook of Industrial Engineering) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 12 (TSA's Passenger Security Field Guide) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 14 (The Apron and Terminal Building Planning Manual) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Ex. 15 (Airport Development Reference Manual by Int'l Air Transport Ass'n) to Expert Witness Report of Gloria Bender in support of Defendant, *SecurityPoint Holdings, Inc* v. *United States*, Case No. 1:11-cv-00268-EGB, U.S. Court of Federal Claims (Jul. 24, 2014).
Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Ex. 12 (Photos of Herman Miller carts) to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Ex. 13 (Emails discussing TSA engineering duties) to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).
Ex. 14 (Diagram of three-cart rotation at DFW and explanation) to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).

(56) References Cited

OTHER PUBLICATIONS

Expert testimony in accordance with Rule of the Court of Federal Claims 26(a)(2)(C) of James Spriggs, *SecurityPoint Holdings, Inc* v. *United States*, Case No. 1:11-cv-00268-EGB, U.S. Court of Federal Claims (Jul. 24, 2014).

Ex. 12 (Article "Passengers Get Double the Room at New Metro Airport Security Screening Checkpoint") to Expert testimony in accordance with Rule of the Court of Federal Claims 26(a)(2)(C) of Robert Gentry, *SecurityPoint Holdings, Inc* v. *United States*, Case No. 1:11-cv-00268-EGB, U.S. Court of Federal Claims (Jul. 24, 2014).

* cited by examiner

SYSTEMS AND METHODS FOR SECURITY CHECKPOINT CONDITION INFORMATION AND SHARING

CROSS-REFERENCE TO RELATED APPLICATIONS

This application claims the benefit, under 35 U.S.C. §120, of nonprovisional U.S. application Ser. No. 12/411,991, filed Mar. 26, 2009, entitled "Methods and Systems for Efficient Security Screening," which in turn claims the benefit, under 35 U.S.C. §119, of provisional U.S. Application Ser. No. 61/040,425, filed Mar. 28, 2008. This application also claims the benefit, under 35 U.S.C. §119, of provisional U.S. Application Ser. No. 61/630,547, filed Dec. 13, 2011, entitled "Systems and Methods for an Improved Checkpoint." The entire contents and substance of U.S. application Ser. Nos. 12/411,991, 61/040,425, and 61/630,547 are hereby incorporated by reference.

TECHNICAL FIELD

The technical field relates to mobile application systems and methods. More particularly, the technical field relates to systems and methods to provide real and estimated conditions of security checkpoints (e.g., airport security checkpoints).

BACKGROUND

In recent years, security at points of entry such as sports venues, public and private facilities, and international ports has rapidly become an important national security priority. There is a need for security personnel to process and screen individuals at numerous locations worldwide. For example, in the United States alone, there are greater than 400 airports, each one of which has one or more security checkpoint areas that are manned by security guards. The ability to secure points of entry is particularly important for commerce, government, and entertainment endeavors which attract large numbers of people to a single location.

As security increases at points of entry, the process of passing through the points of entry slows. A common problem at secure entry points is the backup of people waiting to pass. For example, venue operators at large sports venues are challenged with making sure that people entering a venue are authorized (ticketed) to gain access to the venue, but with increasing concern over threats to the attendees, venue operators are also having to be concerned that potential entrants are not bringing weapons, explosives, or harmful chemical/biological agents. Currently, general observation or searches are conducted of venue attendees. Subsequently, attendees may also present a ticket or season pass to gain entry into a sports venue. Any additional security measures than what is already being provided would likely further slow down the process of providing venue attendees with access to the venue.

Many people also pass through points of entry on a regular basis. As a result, it is difficult for point of entry personnel to recognize hundreds or thousands of people that are authorized to pass through a point of entry and manage security. Such is the case at the international border crossing between El Paso, Tex. and Ciudad Juarez, Mexico where tens of thousands of people cross daily from home to work and back. In other examples, sports venues, season pass holders, and venue employees gain regular access to sports venues. Secure facilities, such as government buildings and manufacturing plants, also have many employees accessing a facility on a regular basis.

Providing security services for potential entrants who have limited information may lead to many inefficiencies. For example, in a facility with multiple security checkpoints, travelers may swarm to one security checkpoint but underutilize another. Environmental issues, such as the cleanliness of a security checkpoint, may demoralize travelers and may tarnish the image of the administrators of the security checkpoint. Administrative issues, such as whether security checkpoint staff is understaffed, or is acting inefficiently, rudely, or inappropriately, may also complicate travel and damage the reputation of the administrators. These and other issues may undermine the experiences of travelers and the efficiency of checkpoint administration.

SUMMARY

In various embodiments, security checkpoint condition estimation systems and methods accurately and efficiently measure security checkpoint conditions based on observations of people passing through a given security checkpoint. In some embodiments, a system comprises a user location engine, a checkpoint identification engine, a checkpoint identification engine, a presence notification engine, a checkpoint information engine, a condition crowdsourcing engine, and an interuser connection engine. The user location engine may determine an initial location when a user enters a given distance of a security checkpoint. The checkpoint identification engine may provide a checkpoint identifier of the security checkpoint when the user is at the initial location. The presence notification engine may receive a selection of the checkpoint identifier. The checkpoint information engine may receive user-generated information about the security checkpoint. The condition crowdsourcing engine may integrate the user-generated information into crowdsourced condition data associated with the security checkpoint. The interuser connection engine may be configured to provide the crowdsourced condition data to another user.

The user-generated information may help provide an accurate estimate of security checkpoint conditions. The user-generated information of the system may comprise an estimate of a wait time for the user to pass through the security checkpoint. The user-generated information may also comprise a user-generated description of security checkpoint wait times. For instance, the user-generated information may include a numerical estimate of wait times, a timed passage through the security checkpoint (using, e.g., a timer or information from a geography-based transmitter like a GPS transmitter), information about the length of the line in a queuing area, and the type and nature of travelers in the line leading up to a security checkpoint.

The user-generated information may also comprise an account of the environmental conditions such as, but not limited to: whether trash is on the ground at the security checkpoint, general condition of furnishings at the security checkpoint, whether there is sufficient garbage or recycling receptacles, whether lanes separating streams of people in the queuing area are adequate, are maintained, or rather are in states of decay and dilapidation, whether the queuing area is safe from hazardous conditions such as leaks, structural issues with the building, or other hazardous conditions, and whether the lines and/or other parts of the security screening environment are safe for children, the elderly, the handicapped, or others with special needs. The user-generated information may also comprise an account of how security personnel are administering a secure screening environment, and may provide information such as: whether security personnel are efficient, inefficient, timely, not timely, understaffed, overstaffed, behaving appropriately, or are engaging in acts such as speaking rudely, or harassing travelers.

In some embodiments, the user location engine may determine the initial location of a user based a geography-based transmitter on a mobile device associated with the user and/or an indication that the user is located at an end of a queue beginning at or near the security checkpoint. The geography-based transmitter may comprise a global positioning system (GPS) transmitter. In various embodiments, the user location engine determines the initial location based on a measurable or substantial decrease in a velocity and/or movement of the user.

The checkpoint identification engine may provide the checkpoint identifier based on a comparison of the initial location of the user to a list of checkpoint locations on an airport map. The checkpoint identification engine may, in some embodiments, provide the checkpoint identifier from a list of checkpoint locations from a security agency or a government agency.

The system may include a user information rating engine providing a quality rating of the user-generated information. The condition crowdsourcing engine may adapt the crowdsourced condition data based on the quality rating of the user-generated information. The security checkpoint may comprise a secure screening environment incorporated into an airport. In some embodiments, the user-generated information comprises a timed passage through the security checkpoint.

An exemplary method comprises determining an initial location when a user enters a given distance of a security checkpoint, providing a checkpoint identifier of the security checkpoint when the user is at the initial location, receiving a selection of the checkpoint identifier, receiving user-generated information about the security checkpoint, integrating the user-generated information into crowdsourced condition data associated with the security checkpoint, and providing the crowdsourced condition data to another user.

In various embodiments, the user-generated information may help provide an accurate estimate or "snapshot" of security checkpoint conditions. The user-generated information of the method may comprise an estimate of a wait time for the user to pass through the security checkpoint. The user-generated information may comprise a user-generated description of one or more of: a physical condition of the security checkpoint, a quality of security service of the security checkpoint, a security concern, and information about another passenger passing through the security checkpoint. The user-generated information may comprise a selection of a description of one or more of: a physical condition of the security checkpoint, a quality of security service of the security checkpoint, a security concern, and information about another passenger passing through the security checkpoint.

The system may further comprise a security checkpoint gameplay engine configured to provide the user points for interaction and/or providing information. For example, the security checkpoint gameplay engine may provide the user points for checking in and/or providing profile information. Information provided by a plurality of users (e.g., checking in information and profile information) may be provided to any number of airports and/or security personnel. In various embodiments, airports and security personnel may be offered an opportunity to take advantage of an "off the shelf" loyalty program that includes rich customer information in real time.

In some embodiments, the user location engine may determine the initial location based on one or more of: a geography-based transmitter on a mobile device associated with the user and an indication that the user is located at an end of a queue beginning at or near the security checkpoint. The geography-based transmitter may comprise a global positioning system (GPS) transmitter. Determining the initial location of the user may comprise determining a substantial decrease in velocity of the user. Providing the checkpoint identifier of the security checkpoint may comprise comparing the initial location to a list of checkpoint locations on an airport map. In some embodiments, providing the checkpoint identifier of the security checkpoint may comprise providing the checkpoint identifier from a list of checkpoint locations from a security agency or a government agency. The method may include providing a quality-rating of the user-generated information. The method may include adapting the crowdsourced condition data based on the quality rating of the user-generated information.

An exemplary non-transitory computer-readable medium may comprise an executable program or instructions. The executable program or instructions may be executable by a processor to perform a method. The method may comprise determining an initial location when a user enters a given distance of a security checkpoint, providing a checkpoint identifier of the security checkpoint when the user is at the initial location, receiving a selection of the checkpoint identifier, receiving user-generated information about the security checkpoint, integrating the user-generated information into crowdsourced condition data associated with the security checkpoint, and providing the crowdsourced condition data to another user.

In some embodiments, observation data is gathered from a variety of decentralized sources that, in the aggregate, may provide an increasingly accurate description of security checkpoint conditions. The observation data is then crowdsourced into accurate condition data and provided to other users. Resulting systems and methods provide people such as travelers with a readily available way to learn the conditions of a security checkpoint, both in real-time or historically, before entering a checkpoint or choosing a carrier or terminal, in the case of air travel.

DETAILED DESCRIPTION OF EMBODIMENTS

Figure 1:
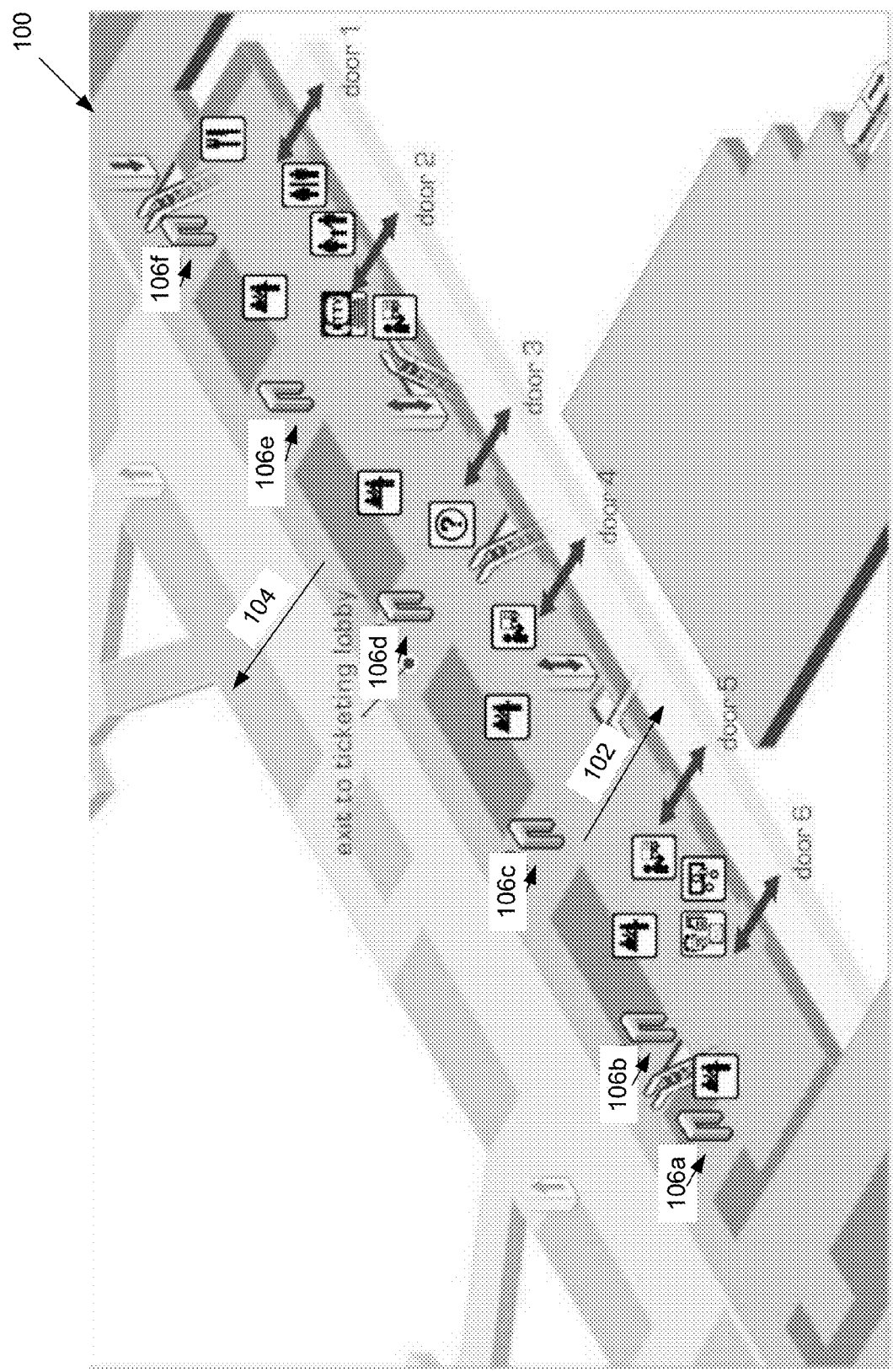
FIG. 1 depicts an exemplary secure facility according to some embodiments.

A facility, such as a building, an airport, an event venue, or other facility, where a large group of people gather may represent different things to different people. To a potential terrorist, the facility may represent an opportunity for attack. To a potential smuggler, the facility may represent an entryway to a widespread distribution network to transport contraband. To a person with a more mundane routine, such as a business or pleasure traveler, the facility merely represents one of a long series of hassles occurring during a journey to a destination, whether the destination is as close as a concert occurring inside a building or as distant as another country connected by airline.

In various embodiments described herein, a traveler (or other person who is to appear at a security checkpoint) may utilize a mobile application to receive information regarding current or expected security checkpoint conditions, length of lines, speed of lines, and other information associated with a security checkpoint. The received information may be based on the experiences of people who are currently at the security checkpoint, people who have been at the security checkpoint, and/or others who have been at the security checkpoint at a time or date that is similar to current or expected conditions when the traveler may traverse the same security checkpoint. Utilizing this information, the traveler may prepare and/or select the most efficient available security checkpoint. The application may be used, for example, for at any airport. For example, the traveler may utilize the mobile application to receive information regarding current or expected security checkpoint conditions at multiple checkpoints at different airports.

In some embodiments, the traveler may use the current or expected information about the security checkpoint to select a security checkpoint that best meets the needs of the traveler. Travel needs are desired attributes of a traveler's passage to a destination or a portion of such a passage. Travel needs may include, but are not limited to: a specific time a traveler needs to be at a departure gate or be on the secure side of a secure facility; a maximum, optimal, or desired duration of a line a traveler is willing to wait in; whether a traveler has requirements related to traveling with an infant, an elderly person, a handicapped person, or a person with special needs; whether a traveler requires safety features to ensure the line is safe for people such as infants, the elderly, handicapped people, or people with special needs; whether a traveler wishes to pass through specific equipment (e.g., a millimeter scanner); whether a traveler wishes to pass through a security checkpoint where screening personnel have a particularly high reputation for professionalism; and/or other desired attributes.

In some embodiments, the traveler may use the current or expected information about the security checkpoint. For example, the traveler may arrive early or late depending on the current or expected conditions of a security checkpoint. Further, the traveler may choose a preferred checkpoint that meets the traveler's desires (e.g., a security checkpoint with short, fast lines). The traveler may also choose to avoid security checkpoints that are known to be rude, unprofessional, dirty, noisy, and/or congested.

The current or expected information may also include information regarding travel requirements, fluids, restricted items, and the like. The information may include information regarding the number and/or type of screening devices (e.g., body scanners or metal detectors) as well as health information related to the device (e.g., the information may indicate that pregnant women or women who may be pregnant should be directed through the metal detectors as opposed to the body scanners).

In some embodiments, in order for a user to have access to the current or expected information, the user may be required to enroll. As described herein, the user has the prerogative to provide varying levels of detail as part of an enrollment and/or subsequent modification processes. Any information not initially included may later be added to, updated, or deleted from a profile.

The user may provide some identification information for the profile, (e.g., at least to the level of the minimum-mandatory information). Minimum-mandatory information is the minimum level of information that may qualify a user as a member. The amount of information that constitutes "a minimum level of information" may be adjusted over time (e.g., by the administrators of the central server). In some embodiments, member may elect to submit to additional security scrutiny and testing in order to obtain a higher gradation level. Qualifying for a higher gradation level may qualify a user for enhanced services and/or allow the user special permissions to be screened through security at a faster pace (e.g., access to a less restrictive line at an airport). Qualifying for a higher gradation level may result in the user enjoying a more seamless travel experience. Enrollment also includes providing the system with personal data used to facilitate travel management.

The profile includes, for example, such information as name, address, telephone number, email, credit card and/or debit card information, desired class of air travel (e.g., coach, business, or first class), airline carrier preference, seating preferences, travel time preferences, meal preferences, self park or valet parking, hotel preferences, rental car preferences, hologram animation of the applicant's face, full face profile. In some embodiments, the profile includes a five second 360 degree facial video which over time may be extended to show prominent distinguishable features, retinal scan, fingerprints, facial scan, distinguishing marks, DNA, and/or the like, all of which may be encrypted. A record of the user's profile may be stored in a central memory of the system as discussed below. In some embodiments, the user may receive a PIN number or other secure password for access to the system.

Some embodiments manage personal information for multiple purposes to expedite and facilitate the travel experience. For example, personal information such as travel preferences, credit card, and/or debit card account information may be stored to facilitate expedited reservation services that may otherwise require the member to provide large amounts of data for each transaction. Other personal information may be stored and usable by security personnel to expedite security clearances. Some of the personal data that may be stored may include but is not limited to: name, addresses, phone numbers and emails, travel preferences, class of service preference, desired class of air travel (e.g., coach, business, or first class), desired fare information (e.g., lowest fare with restrictions or least restrictive fares), typical departure airport preference, travel criteria information (e.g., scheduled airline preference, nonstop only, equipment type preferences, or airport gradation/level preferences), priorities for travel recommendations and automatic booking, gradation/level of participating travel companies, method of travel (e.g., air, sea, car, or bus), number of stops, company preferences (e.g., American Airlines or Amtrak, etc.), travel time preferences, meal preferences, car preferences, and/or hotel preferences. Also, the system may store frequent flyer data organized by airline and/or frequent traveler data for other travel providers (e.g., car or hotel), frequency of travel (also beneficial for sharing with airport parking facilities), a preferred method of travel to or from the airport (e.g., self drive via private car or travel via bus, train, or taxi). This information may be used to forecast needs for auxiliary services such as parking facilities).

In various embodiments, the system may also store self park or valet parking, rental car preferences, other means of travel (e.g., train, short hop via car, and/or limo), a user's special needs and emergency needs, or emergency contact information (e.g., Doctor, Lawyer, Wife, Husband, or Father). Further, the system may store special needs such as wheelchair, seasickness, underwater pressure, diet, etc. In some embodiments, the system may capture any ADA supported needs honored by the airlines.

A user's updateable contact information may include contact information that may vary based on traveler's current travels. For example, the name, phone, and email of the person who the traveler is meeting may be input and updated as needed. The updateable contact information may play a key role in ensuring that the appropriate people impacted by modifications to the traveler's travel plans may be notified via the reliable messaging process that is provided by the system. Various embodiments may store biometric information, hologram animation of face, retinal scan, fingerprints, facial scan, distinguishing marks, and/or DNA.

The data that a member provides may be private and may not be shared in its pure state with anyone without express permission by the user. In some embodiments, there may be an aggregation/demographic layer which may disclose anonymized information for the purposes of gathering overall statistics of the utilization. For example, a member's passport number may not be shared but the fact that this member is a U.S. male citizen between the ages of 40 and 50 may be useful to gain a better idea of the behavior patterns of the membership and also to provide a means for future targeted promotions of potential members. Travel preferences may also be beneficial in terms of gathering an understanding of areas that could be of greater value to the member. General information from one or more users may provide support of "light" Customer Relationship Management ("CRM"). Various embodiments may preserve a respect for privacy while enabling information gathering for statistical purposes. The data to be collected about each member may be controlled based on a member-owned basis. The member application may request many data elements. The data elements may be mandatory or optional. To attain a certain level of certification or gradation, each member may be encouraged to complete as much information as possible.

In some embodiments, a byproduct of the system may be the collection of data related to passenger travel habits. This data may be useful to member airports, airlines, as well as other travel providers for planning purposes. Further, the data may be useful to airlines, travel providers, and/or travel agencies to gain greater understanding of ways to improve the passenger experience. For example, the data may be available in an XML type interface record to enable transferring and merging to existing CRM or data warehouse applications. In some embodiments, each data element that may be collected may be scrutinized in terms of privacy so that there is assurance that personal data may not be directly available for use but may indirectly be used. For example, the interface record may be defined to not transfer passport number data but could transfer age data to provide demographic information.

A central computer or server system may provide access to web pages and other data stored in the memory of the system. A computer system or server system comprises any number of digital devices (e.g., any device with a processor and memory).

In some embodiments, secure information may be protected for the privacy of the members. In one example, such information may be available only by way of reference to matching data but not to directly access the secured information itself. To verify the identity of a member, the system may be accessed to confirm that the presented information matches the identification information in the central database and that the member remains in good standing. The central server, however, may not release identification information during this process. The physical identification exercise at the gate may make a three-way match. In some embodiments, if the security worker is not at the gate, a security worker may view the process remotely through multiple cameras mounted on the cart as the passenger goes through the security check and as the carry-on is scanned. This security check may be fast because the member may have trip pin information, radio transmitted information, bar code, and/or ticket number.

Additional identification information may make the matching of a member bag to the member an easier, faster process. This feature may contribute to a faster boarding process for the member and may require less lead-time at the airport. The match may be quickly made between the member, the seat on the aircraft, and the bag in the hold.

For added security, all of the communication between the system central server, kiosks, smart cards, and the web-site may be encrypted such as by means of a two-way SSL (Secured Socket Layer). Using two-way SSL, for example, may allow the central server and the various clients to authenticate each other to make sure the clients are in fact communicating with the authentic system central server and the central server is in fact communicating with the specified client. In addition, all or some data sent back and forth between client and server may be encrypted so that devices not meant to view the data cannot understand or alter the data. Furthermore, the system may store member passwords in an encrypted form. In some embodiments, the system may check a password for a match by encrypting the password with the same key that encrypted the stored password. The system may compare the two encrypted passwords for a match. The user's device contains audio/visual capabilities may communicate with other members and other devices communicating with compatible protocols via audio and video.

The system may be of a flexible design that permits operation at a number of levels of personal information. These levels may apply both to individual members and to travel facilities that integrate with the system. Examples of such travel facilities include, but are not limited to, airports, airlines, ports, terminals, security agencies, hotels, car rental agencies, charter companies, railroads, stations, taxi services, limousine services, bus lines, depots, ferries, and other travel provider facilities. Members may provide more or less information and in turn may meet the requirements of higher or lower compliance levels. The actual set of gradations may vary and is system configurable. As discussed herein, the member may be able to display the gradation or security level that the member has obtained. The members may receive benefits based on their level of compliance.

In some embodiments, a traveler may be encouraged to input information within a mobile application regarding their experiences with a security checkpoint. For example, the traveler may be motivated to input the length of line, types of other travelers, speed of the line, professionalism and/or efficiency of the TSA agents, conditions of equipment, compliments, and/or complains when encouraged. In some embodiments, a traveler is encouraged by receiving a participation value, such a gameplay participation value, for the quality and quantity of information provided. All provided information may be aggregated with other travelers to provide accurate and potentially real-time information to other travelers to make the experience more smooth and pleasant. As participation values increase, the traveler may qualify for increasing rewards and premium offers.

In some embodiments, the traveler may be identified as an experienced traveler whose ratings, compliments, or complaints should be highly respected. That experience may be localized (e.g., at a particular checkpoint at a particular concourse in a particular airport). For example, a traveler may have passed through a particular security checkpoint at Los Angeles International Airport (LAX) in the traveler's journeys to various destinations on the eastern seaboard of the United States. Such a traveler may have experienced the conditions of the particular security checkpoint at LAX many times, even though the traveler had only traveled to the checkpoints on the eastern seaboard less frequently. As such, the traveler may have substantial experience with the nuances of the particular security checkpoint at the traveler's home airport. Information that the traveler provides about the particular security checkpoint may be backed by years of experience on conditions that occur, for instance, on Monday mornings. A traveler's ratings, compliments, or complaints about the particular security checkpoint may therefore be highly accurate and have an indicia of reliability that approaches an expert account of the particular security checkpoint's conditions. This may be so even though the traveler may not have much experience with the other security checkpoints (e.g., a security checkpoint on the eastern seaboard that the traveler may have visited only a few times).

In some embodiments, the traveler's information about the particular security checkpoint's conditions may be particularly respected while the traveler's accounts of the other security checkpoints need not be particularly respected. Similarly, a traveler may be identified to be an experienced traveler at a particular concourse in a particular airport, or an experienced traveler in a particular airport itself. In some embodiments, a traveler may be identified to be an experienced traveler with respect to a particular set of security checkpoints (inside the same airport or across a set of airports), a particular set of concourses, or a particular set of airports. For instance, a traveler may be identified as an experienced traveler between LAX and John F. Kennedy (JFK) airport in New York City. Accordingly, in various embodiments, the respect given a traveler's account of security checkpoints may be localized. In some embodiments, a traveler who is very experienced at traveling through a single security checkpoint may be deemed as being very respected regarding the travelers expectations, desires, or rating of other security checkpoints.

In some embodiments, a traveler may be identified as a traveler whose experience with security checkpoints is generalized. For instance, a traveler may be identified as a person who has taken a number of flights (e.g., hundreds or thousands), or has traveled vast distances (e.g., taken numerous transcontinental or pan-Pacific flights) in recent times. Such a traveler may have experienced the conditions at numerous domestic and international security checkpoints across the United States and may have intimate knowledge with security checkpoint conditions generally. Such a traveler's ratings, compliments, or complaints about a given security checkpoint may reflect his or her experience with security checkpoint procedures in a more general sense. Thus, in various embodiments, the respect given a traveler's account of security checkpoints may be generalized.

In light of competing interests and values, government agencies and private security firms have implemented security checkpoints with often complex screening procedures. FIG. 1 depicts an exemplary secure facility 100 according to some embodiments. The secure facility 100 includes or abuts an airport terminal. The secure facility 100 may include an unrestricted area 102, a restricted area 104, and security checkpoints, 106a-106f. The unrestricted area 102 is a portion of the secure facility 100 open to the general public. Though security personnel may monitor the unrestricted area 102, the general public may more or less move freely without significant security-related restrictions or regulations in the unrestricted area 102. The unrestricted area 102 may include stores, information booths, restaurants, computer terminals, and other conveniences, all of which the general public may access. The unrestricted area 102 may also provide links to public transportation (such as a light rail shown in FIG. 1), parking structures, taxis, drop-off zones, and pick-up zones.

The restricted area 104 is a portion of the secure facility 100 that the general public cannot access on an unrestricted basis. Typically, the restricted area 104 is limited to those having a reason to be within a secure area. For instance, the restricted area 104 may be limited to security personnel, employees of the secure facility 100, travelers preparing to board a departing flight, and travelers who recently disembarked from an arriving flight. Travelers who access the restricted area 104 may more or less move freely. The restricted area 104 may include stores, information booths, restaurants, computer terminals, and other conveniences. The restricted area 104 includes departure gates and arrival gates linking travelers to departing and arriving flights.

The security checkpoints 106a-106f separate the unrestricted area 102 from the restricted area 104 by keeping the general public outside of the restricted area 104. Any or all of the security checkpoints 106a-106f may employ body scanners that scan people passing into the restricted area 104. The security checkpoints 106a-106f may also include object scanners to scan personal items, and pat-down stations to administer manual pat-downs. The security checkpoints 106a-106f may further include secondary screening areas that facilitate electronic, chemical or other means of screening people passing through. In some embodiments, one or more of the security checkpoints 106a-f may not include pat-down stations, rather, the pat-down stations may be replaced by electronic (e.g., active or passive scans), chemical (e.g., detection of suspect chemicals through contact or local atmosphere), or other means of secondary screening.

One or more of the security checkpoints 106a-106f may impede the free flow of people in the secure facility 100 and typically have lines of people leading up to them. The lines of each of the security checkpoints 106a-106f may be distinct or may be shared with another security checkpoint. Any of the security checkpoints 106a-106f may have a secure screening environment associated with it.

Though FIG. 1 depicts the secure facility 100 as an airport, those skilled in the art will appreciate that a secure facility at any location may have many similarities to secure facility 100. For instance, in various embodiments, a secure facility may be located at other travel facilities, other buildings that require security screening, event venues such as concert venues, sports venues, or other places where groups of people gather. Also, although FIG. 1 depicts a single unrestricted area 102 and single restricted area 104 to which the security checkpoints 106a-106f lead, those skilled in the art will appreciate that, in some embodiments, the security checkpoints 106a-106f need not lead to shared restricted and/or unrestricted areas. Thus, in various embodiments, the security checkpoints 106a-106f may lead to multiple restricted areas and/or multiple unrestricted areas.

In another example, the secure facility 100 may comprise a sports facility such as a sports coliseum or arena. Such a sports facility may include a playing field and a spectator area. The playing field may occupy a central location of the sports facility. The playing field may contain a playing arrangement for a specific game. For instance, the playing field may contain a football field with two end zones and markers indicating various yard ranges (e.g., 1, 5 and 10 yard lines). In another example, the playing field may contain a baseball diamond. A spectator area may contain seats, booths, vendors, and sections. In this example, the spectator area of the secure facility 100 may be divided into regions. Each of the regions may correspond to an angular range around an epicenter of the playing field and/or a distance from the epicenter of the playing field. For instance, a region may include all seats located within 50 feet of the playing field and falling within zero to five degrees of the home plate of a baseball field.

The sports facility may contain an unrestricted area connected to parking and/or public transportation, and may contain a restricted area where fans having tickets to the spectator area may be allowed. The restricted area in such a sports facility may therefore cover the spectator area. Spectators may have tickets to specific seats or a specific region of a sports facility, and the sports facility may employ ushers to help spectators find their seats once the spectators are inside the restricted area. Once a spectator has access (e.g., a ticket) to the restricted area of the sports facility, the spectator may or may not be able to move freely as long as the spectator is not occupying a seat/region of another spectator. In this arrangement, the centralized nature of the playing field and the desire to allow free movement in the restricted area may prompt the presence of security checkpoints at multiple areas around the restricted area. For instance, a sports facility may have a set of security checkpoints arranged at equidistant angles (e.g., every 15 degrees) around the playing field. Each security checkpoint may have its own queue. Thus, in some embodiments, multiple security checkpoints may lead to one or more common restricted areas of a sports facility. Each of these security checkpoints may have a secure screening environment.

Figure 2:
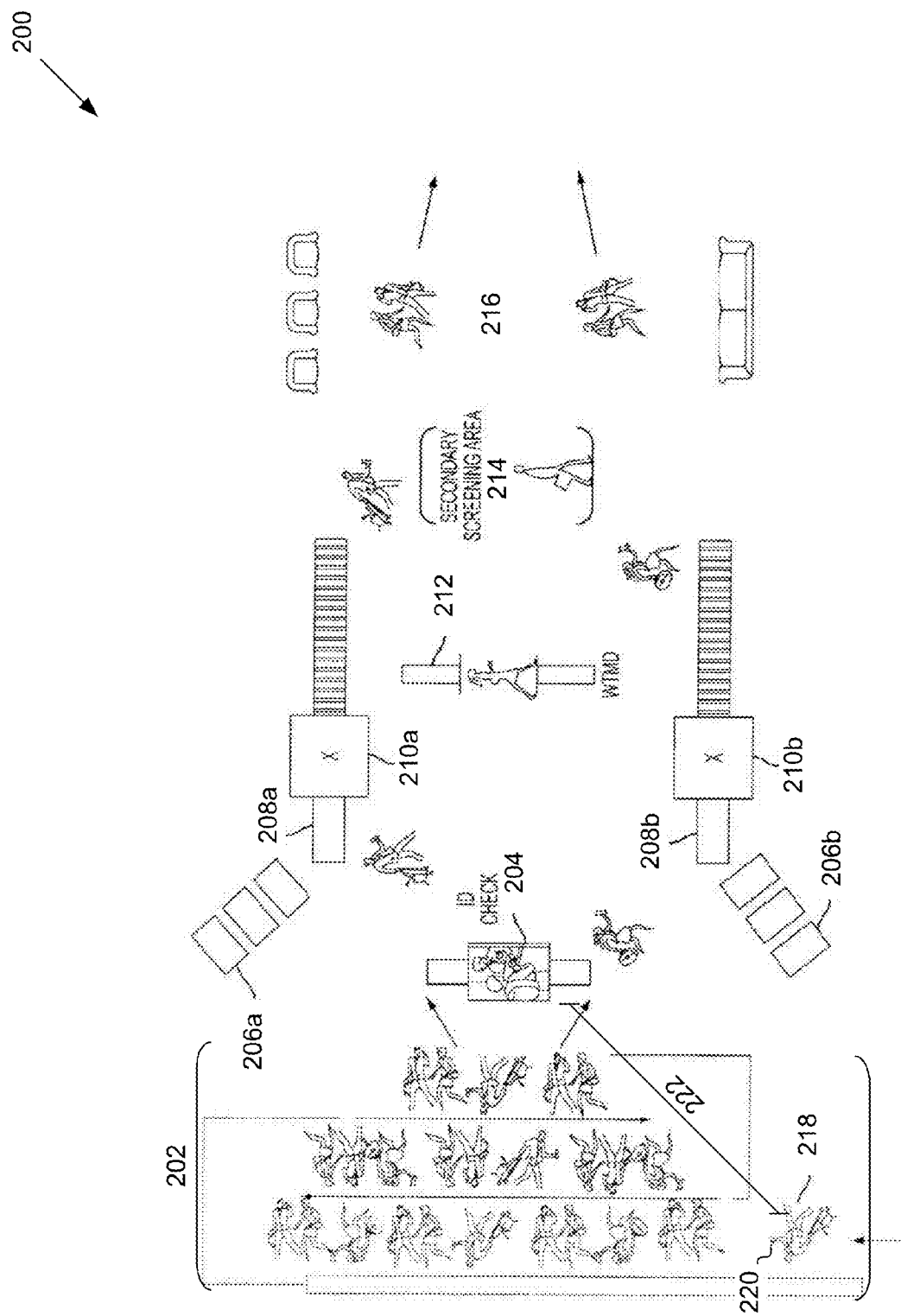
FIG. 2 depicts an exemplary secure screening environment according to some embodiments.

FIG. 2 depicts an exemplary secure screening environment 200 according to some embodiments. The secure screening environment 200 may comprise a queuing area 202, an identification checkpoint 204, object trays 206a and 206b, object conveyors 208a and 208b, object scanners 210a and 210b, a body scanner 212, a secondary screening area 214, a recomposure area 216, a traveler 218, a mobile device 220, and one or more recomposure stations 222. The queuing area 202 may comprise an area holding a line of travelers wishing to pass to the restricted area on the other side of the secure screening environment 200. The line of travelers may wrap around, and fabric or other dividers may separate subsets of the line of travelers.

The identification checkpoint 204 may comprise a station where security personnel verify the identity of those wishing to pass through the secure screening environment 200. The identification checkpoint 204 may comprise a desk or other article, as known by those of ordinary skill in the art, manned by one or more security individuals who implement identification check procedures. In the airport context, the security individuals typically verify that each traveler passing through the secure screening environment 200 has valid government-issued identification as well as a boarding pass to board a flight that is soon to depart. Security individuals may also verify the identity of secure facility employees or other security personnel seeking to enter the restricted area on the other side of the secure screening environment 200.

The object trays 206a and 206b may be stackable, and may hold personal items, such as jewelry, electronics, laptop computers, mobile phones, and other items, so that security personnel may scan the personal items. Personal items may also include shoes, boots having metal parts, and jackets. Mobile or other tray carts may house the object trays 206a and 206b and facilitate efficient distribution of the object trays 206a and 206b. In some embodiments, the object trays 206a and 206b may be located on one or more carts at proximal and distal ends of the object conveyors 208a and 208b. The carts holding the object trays 206a and 206b may move between the proximal and distal ends of the object conveyors 208a and 208b over transportation assemblies such as wheels, skids, or the like.

In various embodiments, the object conveyors 208a and 208b receive luggage, personal items, and the object trays 206a and 206b. The object conveyors 208a and 208b may include one or more conveyor systems to pass items on them to the object scanners 210a and 210b for scanning. The object conveyors 208a and 208b may have manual overrides allowing security personnel to manually speed up, slow down, or stop the object conveyors 208a and 208b when an object needs to be rescanned, closely inspected, or the scanning flow needs to be adjusted.

The object scanners 210a and 210b allow security personnel to inspect the luggage and personal items passing through. Using technologies such as x-ray scanning technology, for example, security personnel using the object scanners 210a and 210b may evaluate whether a specific person has placed a dangerous item or contraband on the object conveyors 208a and 208b, inside an article of luggage, or inside the object trays 206a and 206b. The object conveyors 208a and 208b may control the rate objects flow through the object scanners 210a and 210b.

In some embodiments, the body scanner 212 may perform a body scan of a person passing through the secure screening environment 200. Using the body scanner 212, security personnel may closely inspect whether someone has concealed a dangerous item or contraband on their person. The body scanner 212 may employ millimeter scanning technology or other scanning technology. Security personnel may use the body scanner 212 to exclude people from the restricted area. In various examples, if the body scanner 212 indicates a traveler may have an item resembling a dangerous item or contraband, security personnel may direct the person to the secondary screening area 214 for a manual pat down for a discussion or for further investigation. A person seeking to avoid the body scanner 212 may request to be patted down in the secondary screening area 214.

In the secondary screening area 214, security personnel may manually pat down people passing through the secure screening environment 200. The secondary screening area 214 may be strategically located outside the sight of travelers to preserve the privacy of people being patted down. The secondary screening area 214 may also be located within the sight of other travelers to provide a degree of transparency and accountability to security personnel.

The optional recomposure station 216 includes an area where a person passing through the secure screening environment 200 may gather or organize his or her personal objects and enter the restricted area. The recomposure station 216 typically includes benches other fixed or movable articles of furniture so that the person may perform such tasks as placing personal objects back into luggage, putting shoes and jackets on, and getting organized. The recomposure station 216 may be located within the view of security personnel to facilitate monitoring of suspicious activity after passage through the body scanner 212 and the secondary screening area 214.

In some embodiments, the recomposure station 216 may include barstools so that passengers may sit down and recompose their belongings at a more convenient height. Tables of appropriate height may accompany the barstools in the recomposure station 216. In various embodiments, the height of the tables helps travelers recompose their belongings over a flat table surface, which may speed the security screening process. For example, the recomposure station 216 may have tables that are one meter (39 inches) high. The recomposure station 216 may also have hooks under the tables which may help travelers temporarily hang items, such as luggage with straps or purses, for recomposure. The recomposure station 216 may be located near advertisements, such as digital displays or billboards, that provide advertisements, directions, flight information, security information or otherwise may monetize the passenger stream. In various embodiments, the recomposure station 216 may be located to facilitate a social environment where travelers may recompose their belongings in the presence of other travelers.

In some embodiments, the recomposure station 216 may carry, transmit, present, or display advertisements. For example, the recomposure station 216 may include displays and/or speakers configured to provide information, advertisements, safety information, flight information, or any kind of electronic media. The displays and/or speakers may be coupled to a server over a network (e.g., the Internet, LAN, WAN, or other network). In various embodiments, the recomposure station 216 allows interaction via near field communication (NFC) technologies thereby allowing a user to access information and/or make purchases via a smart phone or other NFC enabled device. The recomposure station 216 may also provide electronic tagging.

Typically, a traveler 218 may stand in line for the identification checkpoint 204. As a person potentially requesting or desiring access to the restricted area on the other side of the secure screening environment 200, the traveler 218 may be positioned to provide honest, accurate, and real-time user-generated information about the secure screening environment 200. The information may be user-generated in that the information may be generated, directly or indirectly, by the traveler 218 via a digital device such as, for example, a smart phone. The traveler may provide an account of security checkpoint wait times, environmental conditions, administrative conditions, and/or security screening devices, among other information.

In some embodiments, the traveler 218 may provide an account of security checkpoint wait times. For instance, the traveler 218 may provide an estimate of a wait time leading up to the identification checkpoint 204. The estimate may comprise a numerical estimate. The traveler 218 may further initiate a timer that measures the time the traveler 218 takes to get to the identification checkpoint 204. The traveler 218 may also provide non-numerical information (e.g., a qualitative measure) regarding security checkpoint wait times. For example, the traveler 218 may provide information related to how long the line is in the queuing area 202, whether the line contains infants or elderly people, pushy or aggressive travelers (such as business travelers moving along the line quickly or aggressively), groups of travelers, or other conditions.

In some embodiments, an account of the security checkpoint wait time may be obtained from a timer coupled to a geography-based transmitter (e.g., a GPS transmitter) associated with the traveler 218. In such an example, a timer may initiate a timing sequence when a geography-based transmitter associated with the traveler 218 indicates that the traveler 218 reached the beginning of a line leading up to the identification checkpoint 204. As discussed, the geography-based transmitter may determine the traveler 218's position and/or orientation in line using a position, a velocity, a decrease in velocity, or other parameters of the physical presence of the traveler 218. The timer may end the timing sequence once the geography-based transmitter indicates that the traveler 218 is at the identification checkpoint 204. Accordingly, the traveler 218 may provide (e.g., either by estimate, experienced time, or using a timer) the extent of time the traveler 218 took to pass through the line leading through the secure screening environment 200 and the subsequent passage through the body scanner 212.

In various embodiments, the traveler 218 may also provide an account of environmental conditions. Such an account of environmental conditions may include, but is not limited to, whether trash is on the ground, general condition of furnishings, whether security personnel have placed enough garbage or recycling receptacles, whether the lanes separating streams of people in the queuing area 202 are adequate, are maintained, or rather are in states of decay and dilapidation, and whether the queuing area 202 is safe from hazardous conditions such as leaks, structural issues with the building, or other hazardous conditions. The account of environmental conditions may include whether the lines and/or other parts of the security screening environment 200 are safe for children, the elderly, the handicapped, or others with special needs.

In some embodiments, the traveler 218 may also provide an account of how security personnel are administering the secure screening environment 200. As discussed herein, "administration" of a security checkpoint may refer to procedures governing the operation of the security checkpoint by security personnel, the compliance of security personnel with such procedures, and the conduct of security personnel. For example, the traveler 218 may provide whether security personnel are efficient, inefficient, timely, not timely, understaffed, overstaffed, behaving appropriately, or are engaging in acts such as speaking rudely, or harassing travelers.

One set of security personnel of interest may be security personnel at the identification checkpoint 204. In some embodiments, the traveler 218 may provide the speed of a specific set of security personnel at the identification checkpoint 204. The traveler 218 may also indicate whether the identification checkpoint 204 appears understaffed, overstaffed, or is operating efficiently. The traveler 218 may also indicate whether security personnel at the identification checkpoint 204 are speaking rudely or appear to be harassing or unfairly profiling specific travelers.

In various embodiments, the traveler 218 may provide an account of specific security screening devices in the secure screening environment 200. As a result, the traveler 218 may view whether the secure screening environment 200 is employing a millimeter scanner or other specific scanning technology that health-conscious people or other groups of people would prefer to avoid.

In some embodiments, the traveler 218 may view whether the pat down procedures in the secondary screening area 214 are inappropriate or excessively aggressive to everyone or to specific groups of people. Accordingly, the traveler 218 may be, in effect, a "secret shopper" that may provide an honest account of the conditions of the secure screening environment 200.

In various embodiments, the traveler 218 may input the user-generated information of the secure screening environment 200 into the mobile device 220. The mobile application on the mobile device 220 may also provide the traveler 218 with crowdsourced condition data associated with the security checkpoint (i.e., a portion of the secure screening environment 200). In some embodiments, the mobile application on the mobile device 220 may include interactive and social gameplay elements. For example, the mobile application may provide a travel-directed value to encourage and incentivize the traveler 218 to play with the mobile application and provide the observations of the traveler 218. The mobile application may also assist with the recruitment of travelers for private or federal government programs such as global entry programs, nexus programs, pre-check programs, and/or other recruiting/marketing programs. These processes are further described herein.

Although element 218 is designated as a "traveler," those skilled in the art will appreciate that the element 218 may designate people passing through the secure screening environment 200 in a more general sense. In some embodiments, the element 218 may designate employees passing through the secure screening environment 200 or even security personnel who may pass through the secure screening environment 200 at the beginning of a work shift. In various embodiments, the element 218 may designate an attendee at a concert or an event. As such, in various embodiments, the element 218, through referred to as the "traveler 218," need not refer to a person traveling. For example, as further discussed above, the element 218 may be a spectator at a sports facility.

Figure 3:
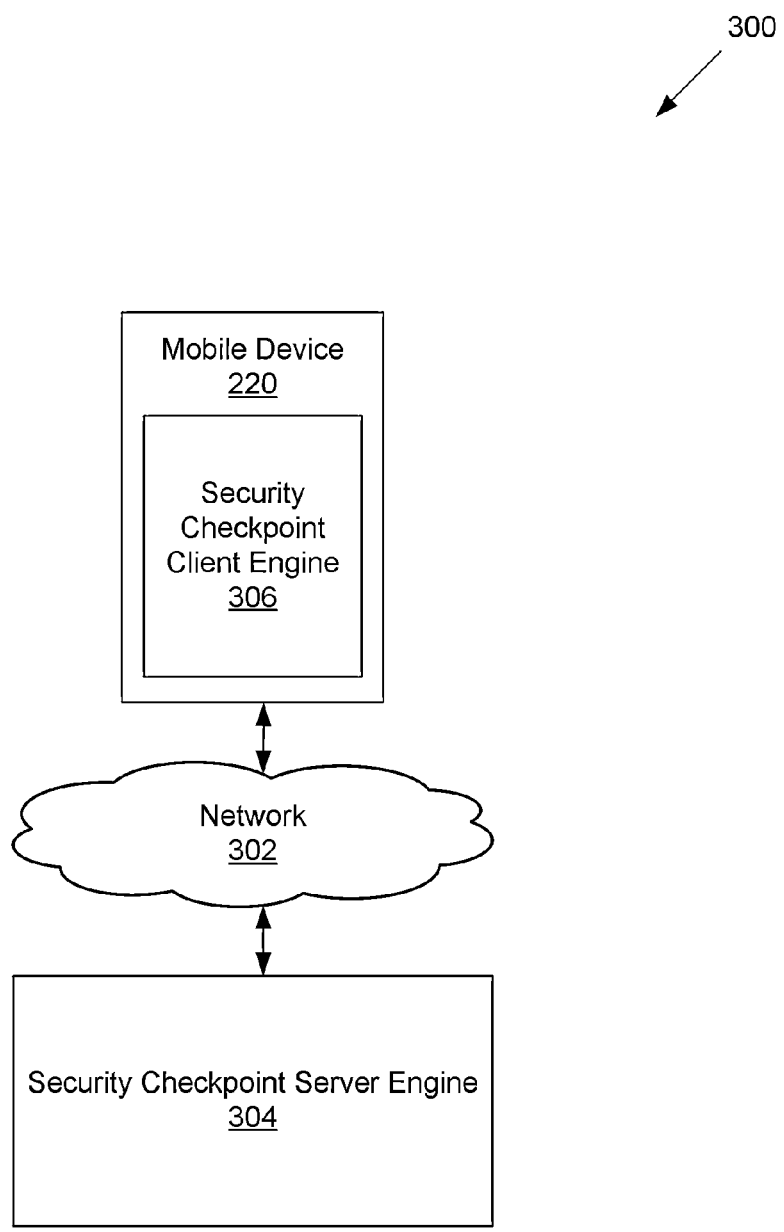
FIG. 3 depicts an exemplary security checkpoint information system according to some embodiments.

FIG. 3 depicts an exemplary security checkpoint information system 300 according to some embodiments. The security checkpoint information system 300 may facilitate a mobile application that provides users with security checkpoint condition data based on crowdsourced data. In various embodiments, the mobile application may incorporate interactive gameplay, travel object tracking, interuser security checkpoint condition sharing, and other features. The security checkpoint information system 300 may comprise a mobile device 220, a network 302, and a security checkpoint server engine 304.

Figure 11:
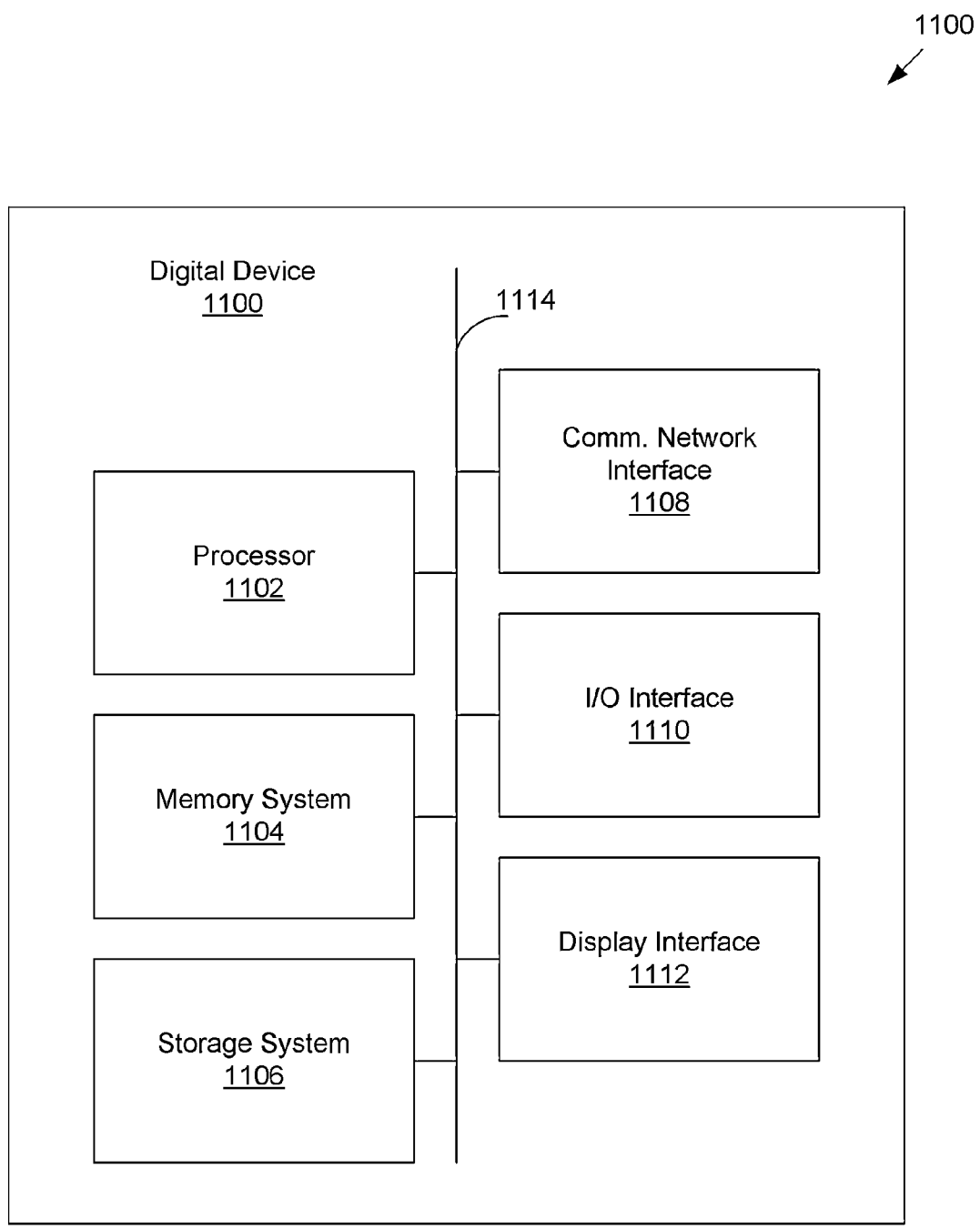
FIG. 11 depicts an exemplary digital device according to some embodiments.

The mobile device 220 may be a digital device. A digital device is any device with memory and a processor. In various examples, the mobile device 220 may be a cellular phone, a smartphone, a computing tablet, a laptop, or other digital or electronic device. The mobile device 220 may incorporate some or all of the elements of a digital device, an example of which is shown in FIG. 11. The mobile device 220 may incorporate an operating system and may support a connection to the network 302 (which in various embodiments may be a wireless data network).

In some embodiments, the mobile device 220 includes a security checkpoint client engine 306. The security checkpoint client engine 306 serves as a computing client that facilitates the display and execution of the mobile security checkpoint application. In various embodiments, the security checkpoint client engine 306 may receive user-generated information about a security checkpoint proximate to the traveler and/or the mobile device 220. The security checkpoint client engine 306 may also display travel-directed values to the traveler of the mobile device 220.

In various embodiments, the security checkpoint client engine 306 determines whether the mobile device 220 is within a given distance of a security checkpoint. For example, the security checkpoint client engine 316 may use a geography-based transceiver, such as a Global Positioning System (GPS) transceiver, to determine whether the mobile device 220 is sufficiently proximate to a security checkpoint. In another example, the mobile device 220 may identify one or more network devices (e.g., wireless routers) or servers that identify a security checkpoint. In yet another example, the security checkpoint client engine 306 may receive the location of the mobile device 220 from user input, such as a textual field that allows a user to provide a user location, or a menu that allows a user to select a given location from a set of locations. Various embodiments may include using information from a geography-based transmitter to verify the information received as a product of user input and/or identification of the one or more network devices. Thus, various embodiments may employ fraud or error checking mechanisms that verify a user who says he or she is near a security checkpoint is actually near that security checkpoint.

In various embodiments, the position and/or identify may be verified by visual conformation by security personnel, comparing to other data bases, camera feeds, access points, information from ticketing agents, airline computers, or the like. This process may assist agents at a security checkpoint to confirm or verify the identity and/or position of one or more travelers thereby easing the burden of security. This process may also improve the efficiency and/or effectiveness of security agents, the security process, and other aspects of the security of the secure facility. Further, the process of confirming or verifying the identity and/or position of a user may assist agents at a security checkpoint to identify potentially passengers that require additional scrutiny. Those skilled in the art will readily appreciate that the security checkpoint client engine 306 may use other geography-based devices and/or modules to approximate the location of the mobile device 220 with reference to a security checkpoint.

The security checkpoint client engine 306 may receive a checkpoint identifier of the proximate security checkpoint. In various embodiments, the security checkpoint client engine 306 allows the traveler using the mobile application to select a security checkpoint from a list of checkpoint identifiers. For instance, the security checkpoint client engine 306 may present the traveler with a list of nearby security checkpoints and allow the user to select the security checkpoint from the list. In some embodiments, the security checkpoint client engine 306 may automatically select or sort a list based on the nearest security checkpoint to the traveler.

In some embodiments, the mobile application may be downloaded and installed to the security checkpoint client engine 306. For instance, downloading may involve transferring an installation file to the mobile device 220 using the network 302. Installation may involve executing the installation file, locally storing files on the mobile device 220, and locally executing processes on the mobile device 220.

Figure 5:
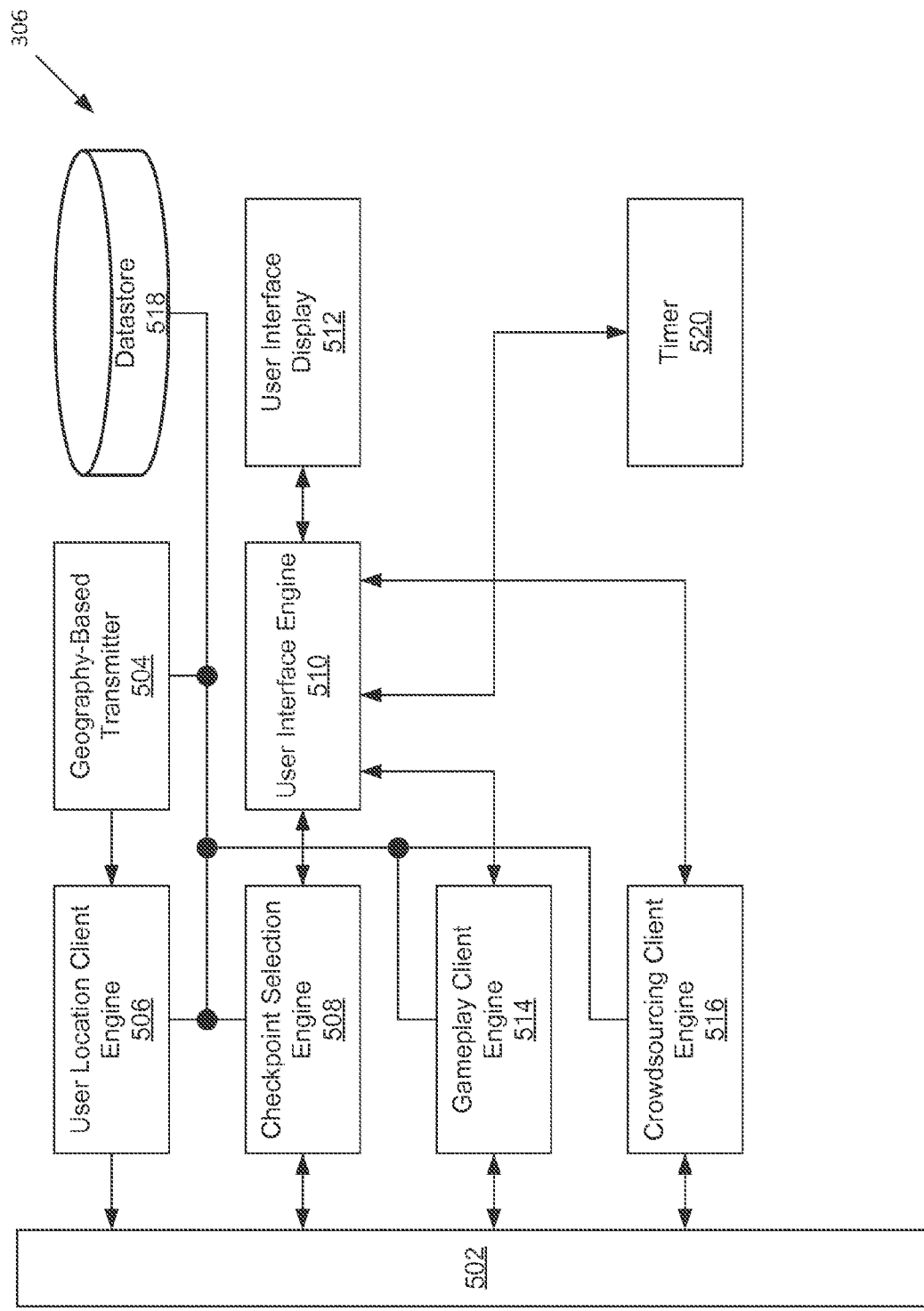
FIG. 5 depicts an exemplary security checkpoint client engine according to some embodiments.
Figure 10:
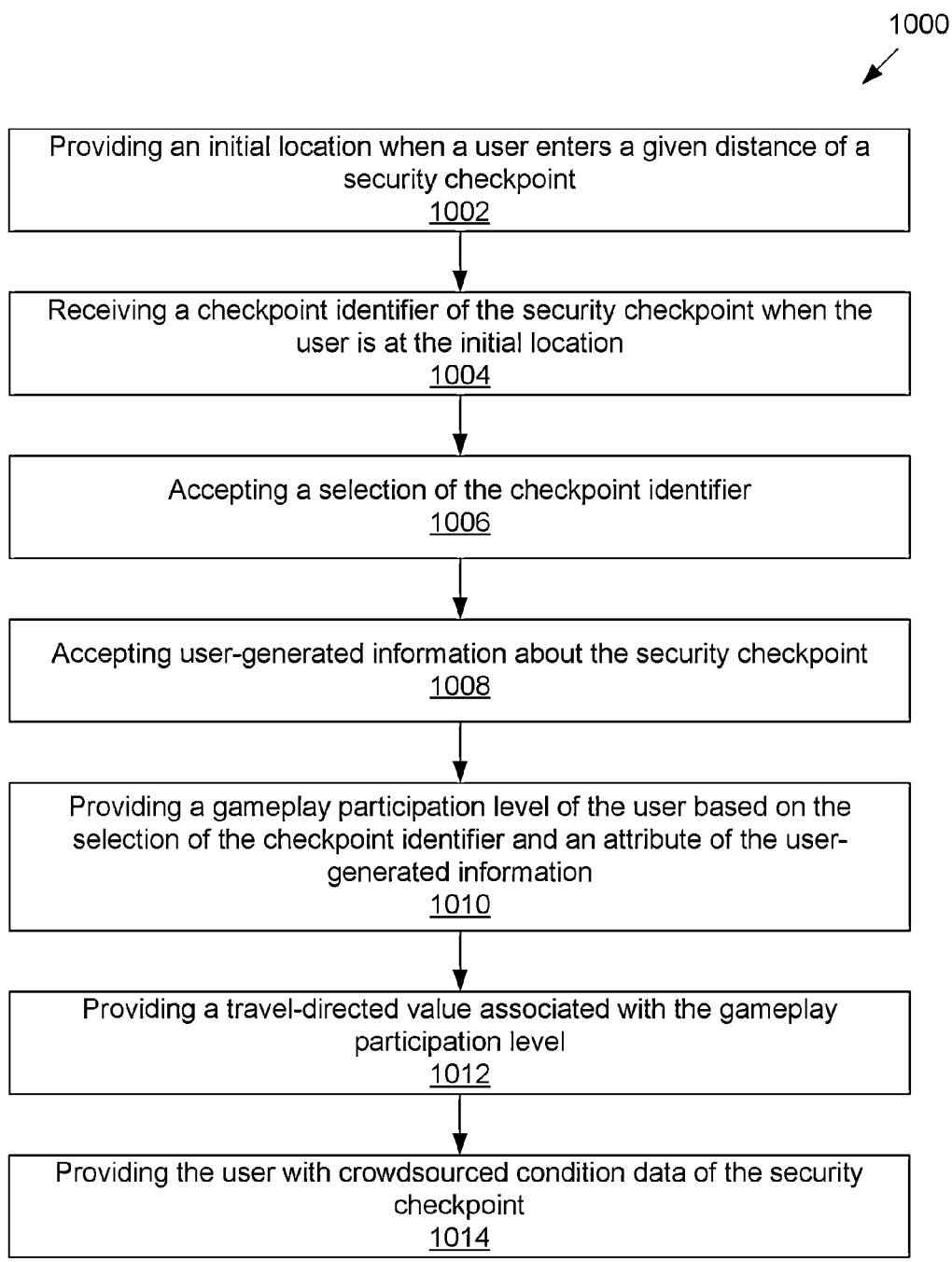
FIG. 10 depicts an exemplary method for obtaining crowdsourced security checkpoint condition data according to some embodiments.

In various embodiments, the mobile application may be a streaming mobile application that is executed on the security checkpoint server engine 304. In such a case, the security checkpoint client engine 306 may provide a user interface (such as a web browser or a container application) for the traveler to interact with the mobile application. FIGS. 5 and 10 further explore examples of the security checkpoint client engine 306. Those skilled in the art will appreciate that any portion of the functionality of the mobile application may be resident on the mobile device 220, on a server such as the security checkpoint server engine 304, and/or in the cloud.

The network 302 facilitates communication between the mobile device 220 and security checkpoint server engine 304. The network 302 may include a computer network. The network 302 may be implemented as a personal area network (PAN), a local area network (LAN), a home network, a storage area network (SAN), a metropolitan area network (MAN), an enterprise network such as an enterprise private network, a virtual network such as a virtual private network (VPN), and/or other network. Portions of the network 302 may be secure and other portions of the network 302 may be unsecured.

The network 302 may also use some combination of wireless technologies. Wireless networks may typically include an internetworking unit (IWU) that interconnects wireless devices on the relevant one of the wireless networks with another network, such as a wired LAN. The IWU is sometimes referred to as a wireless access point (WAP). In the IEEE 802.33 standard, a WAP is also defined as a station. Thus, a station may be a non-WAP station or a WAP station. In a cellular network, the WAP is often referred to as a base station. Wireless networks may be implemented using any applicable technology, which may differ by network type or in other ways. The wireless networks may be of any appropriate size (e.g., metropolitan area network (MAN) or personal area network (PAN)). Broadband wireless MANs may or may not be compliant with IEEE 802.36, which is incorporated by reference. Wireless PANs may or may not be compliant with IEEE 802.35. The wireless networks 2404 may be identifiable by network type (e.g., 2G, 3G, Wi-Fi), service provider, WAP/base station identifier (e.g., Wi-Fi SSID, base station and sector ID), geographic location, or other identification criteria. The wireless networks may or may not be coupled together via an intermediate network. The intermediate network may include practically any type of communications network, such as, by way of example but not limitation, the Internet, a public switched telephone network (PSTN), or an infrastructure network (e.g., private LAN). The term "Internet" as used herein refers to a network of networks which uses some protocols, such as the TCP/IP protocol, and possibly other protocols such as the hypertext transfer protocol (HTTP) for hypertext markup language (HTML) documents that make up the World Wide Web (the web). Those skilled in the art will appreciate that the network 302 may include other elements.

In some embodiments, the security checkpoint server 304 includes a computing server that facilitates operation of the mobile security checkpoint application. As such, the security checkpoint server 304 may include engines, datastores, and other modules to perform computational tasks and provide services on behalf of the mobile security checkpoint application. In some embodiments, the security checkpoint server engine 304 may receive user-generated security checkpoint condition data from any number of travelers and/or provide the user with crowdsourced security checkpoint condition data. For instance, the security checkpoint server engine 304 may provide the user a list of checkpoint identifiers associated with security checkpoints, receive a selected checkpoint identifier, and receive user-generated information about the security checkpoint. In various embodiments, the security checkpoint server engine 304 may integrate the user-generated information into crowdsourced condition data associated with the security checkpoint. The security checkpoint server engine 304 may also provide the crowdsourced condition data to a user other than the person associated with the mobile device 220. The discussion accompanying FIGS. 4A and 4B further explores aspects of the operation of the mobile security checkpoint application.

Consistent with maintaining aspects of interactive and social gameplay, the security checkpoint client engine 306 may display gameplay attributes, such as scores, points, and the user's gameplay participation level. Maintaining interactive gameplay may be used to encourage a user to utilize the application, provide information regarding one or more checkpoints, receive information from one or more checkpoints, or provide any other information regarding the venue (e.g., airport), service providers (e.g., restaurants, ticket agents, airlines, TSA agents, airline crew, flight attendants), or services (e.g., food, restrooms, lounges, bars, office equipment rental, wireless data services, or elite services).

In one example, gameplay may include the way in which travelers interact with thematic, narrative, or other elements of a game serviced by the security checkpoint server engine 304. Gameplay typically falls within patterns defined through game rules, challenges, plot, and the way that travelers connect with these patterns. In various embodiments, the security checkpoint server engine 304 may provide gameplay participation values for actions such as selecting a security checkpoint, initiating gameplay, providing security checkpoint condition information, and/or other actions. In various embodiments, the security checkpoint server engine 304 may link the gameplay to the quality of a traveler's provided information.

As the user provides or consumes information, the user may achieve points, awards, or obtain various levels. Progression through the game may allow the user to receive special offers (e.g., discounts), directions to places with specials for those who qualify, or meet with other similarly situated travelers (e.g., elite business travelers with similar interests).

In various embodiments, the security checkpoint server engine 304 may provide one or more travel-directed values to the user. A travel-directed value is has worth in the real world or in gameplay, and is related to a user's experience passing through the security checkpoint or his or her subsequent travel. In various embodiments, the travel-directed value may include any of: a crowdsourced wait time, a crowdsourced security checkpoint condition, a gameplay participation status, a gameplay participation item, a sponsor-related value, a partnership-related value, and a sponsored event. The discussion accompanying FIGS. 4A and 4B further explores aspects of interactive gameplay.

In various embodiments, the security checkpoint server engine 304 may track travel objects. The discussion accompanying FIGS. 4A and 4B also further explores aspects of travel object tracking according to some embodiments.

In some embodiments, the security checkpoint server engine 304 may provide, based on an attribute of the user-generated information, a travel-related attribute of another traveler. A travel-related attribute is a property related to the travel needs or desires of another traveler. For instance, a travel-related attribute may include an indication that another traveler desires to travel through the security checkpoint at an unusually fast pace or that the other traveler has special needs (like family travel or elderly travel). The travel-related attribute is further described herein.

Though various embodiments describe the security checkpoint server engine 304 as performing one or more of: receiving user-generated security checkpoint condition data, providing crowdsourced security checkpoint condition data, maintaining interactive gameplay, tracking travel objects, and/or providing travel-related attributes of other travelers, those of ordinary skill in the art will appreciate that variations are possible. For example, the security checkpoint client engine 306 may perform one or more of the aforementioned functions.

In various embodiments, the mobile application provides one or more travelers with a universal customer loyalty program. For example, a traveler may gain points (e.g., gameplay points further described herein) for check-ins at airports, providing information regarding security points, and/or interacting with the mobile application. The mobile application may provide a loyalty program to a traveler for providing information and/or interacting with the mobile application at any number of airports and/or facilities thereby not requiring multiple applications for multiple airports and/or multiple other facilities.

Figure 4A:
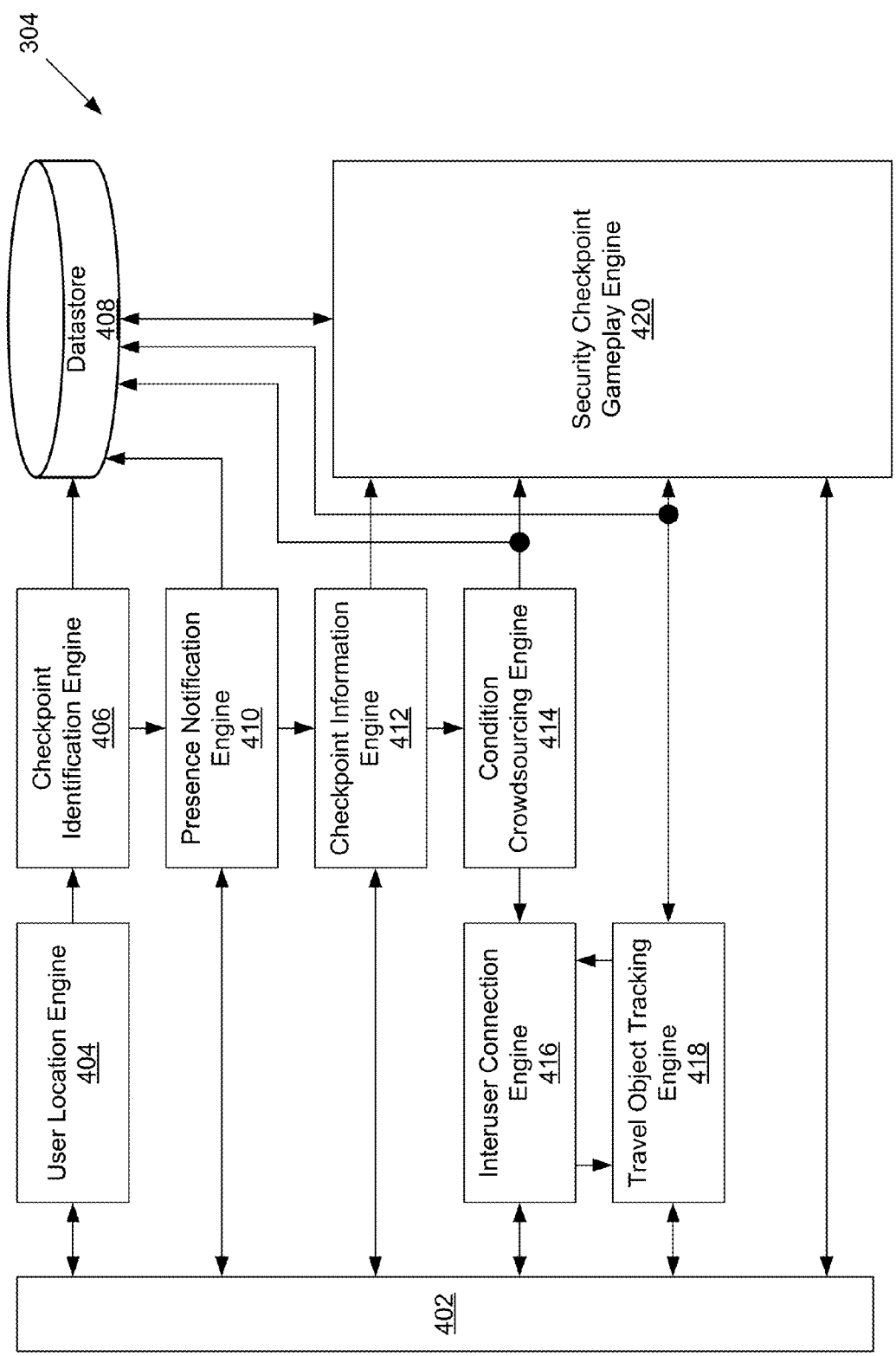
FIG. 4A depicts an exemplary security checkpoint server engine according to some embodiments.

FIG. 4A depicts an exemplary security checkpoint server engine 304 according to some embodiments. The security checkpoint server engine 304 may comprise a communication engine 402, a user location engine 404, a checkpoint identification engine 406, a datastore 408, a presence notification engine 410, a checkpoint information engine 412, a condition crowdsourcing engine 414, an interuser connection engine 416, a travel object tracking engine 418, and a security checkpoint gameplay engine 420.

In some embodiments, the user location engine 404 may connect to the communication engine 402, and the checkpoint identification engine 406 may connect to the user location engine 404 and the datastore 408. The presence notification engine 410 may connect to the communication engine 402, the checkpoint identification engine 406, and the datastore 408. The checkpoint information engine 412 may connect to the communication engine 402, the presence notification engine 410, and the security checkpoint gameplay engine 420. The condition crowdsourcing engine 414 may connect to the datastore 408, the checkpoint information engine 412, and the security checkpoint gameplay engine 420. The interuser connection engine 416 may connect to the communication interface 402, and the condition crowdsourcing engine 414. The travel object tracking engine 418 may connect to the communication engine 402, the datastore 408, the interuser connection engine 416, and the security checkpoint gameplay engine 420.

One or more of the communication engine 402, the user location engine 404, the checkpoint identification engine 406, the presence notification engine 410, the checkpoint information engine 412, the condition crowdsourcing engine 414, the interuser connection engine 416, the travel object tracking engine 418, and the security checkpoint gameplay engine 420 may be connected to or integrated into one or more digital devices.

In some embodiments, the communication engine 402 may comprise hardware and/or software to facilitate communication between a network and the security checkpoint server engine 304. For instance, the communication engine 402 may interface between a network and one or more of the user location engine 404, the presence notification engine 410, the checkpoint information engine 412, the interuser connection engine 416, the travel object tracking engine 418, and the security checkpoint gameplay engine 420. The communication engine 402 in operation, may encode data from the user location engine 404, the presence notification engine 410, the checkpoint information engine 412, the interuser connection engine 416, the travel object tracking engine 418, and the security checkpoint gameplay engine 420 into a format suitable for transmission over a network. The format of communication may include a destination identifier, such as the Internet Protocol (IP) address or the media access control (MAC) address, of the mobile device receiving the data packet. The communication engine 402 may employ other device identifiers without departing from the scope of the inventive concepts disclosed herein.

The communication engine 402 may also decode data received over the network into a format suitable for the security checkpoint server engine 304 to process. The communication engine 402 may receive data packets over the network. The data packets may include a source identifier such as an IP address or a MAC address of a mobile device. The data packets may include location-based information. In some embodiments, the location-based information may take the form of the GPS location taken from a geography based transmitter (such as a GPS transmitter) of a mobile device. The location-based information may also take the form of a point on a map of a specific airport, terminal, or secure screening environment. The location-based information may also include a distance (such as a radial distance) from a secure screening environment.

In various embodiments, the user location engine 404 may comprise hardware and/or software to provide user locations to the checkpoint identification engine 406 based on information received from the communication engine 402. The user location engine 404, in operation, may determine an initial location when a user enters a given distance of a security checkpoint. In some embodiments, the user location engine 404 receives information from the communication engine 402. The user location engine 404 may then extract the location-based information from the information received from the communication engine 402. For instance, if the information includes the GPS address or location of a specific mobile device, the user location engine 404 may extract the GPS address/location taken from the geography based transmitter (e.g., the GPS transmitter) of the mobile device. Moreover, if the information from a mobile device indicates that the mobile device is at a point on a map of a specific airport, terminal, or secure screening environment, the user location engine 404 may extract that location-based information from the information that the communication engine 402 received.

Once the user location engine 404 determines a location of the mobile device, the user location engine 404 may compare the location of the mobile device to a set of predetermined locations (e.g., locational points) relative to one or more security checkpoints to determine whether the mobile device is within a given distance of the security checkpoint. The given distance may be a fixed (e.g., 100 feet) or varying distance associated with security checkpoints in an area or just a given airport.

In some embodiments, the given distance may be adapted to vary based on an estimate of the length of the line in the queuing area of a secure screening environment. For example, the given distance may comprise a larger value to signify a larger line in the queuing area associated with the times a specific security checkpoint is estimated to be busy. The given distance may also comprise a smaller value to signify a smaller line in the queuing area associated with the times a specific security checkpoint is estimated to be quieter. The user location engine 404 may therefore determine the initial location of the mobile device based on an indication that a user associated with the mobile device is located at the end of a queue beginning at or near a security checkpoint.

In some embodiments, the user location engine 404 may obtain a location of a user based on a substantial decrease in velocity of the user. For instance, the mobile device may be programmed to continually identify and/or broadcast the location of a user. From such information, the user location engine 404 may calculate a velocity of the user. Once the velocity indicates a substantial decrease, signifying that a user has crossed an airport's unrestricted area and has entered a queue at a secure screening environment, the user location engine 404 may record the initial location of the user. In some embodiments, determining a decrease in user velocity may help determine the beginning of a queue where this information is not otherwise available.

In various embodiments, the checkpoint identification engine 406 may comprise hardware and/or software to identify a checkpoint based on locational information from the user location engine 404 and data from the datastore 408. The checkpoint identification engine 406, in operation, may provide a checkpoint identifier of the security checkpoint when the user is at the initial location or within a predetermined range of the security checkpoint. The checkpoint identification engine 406 may receive a location of the user from the user location engine 404. The checkpoint identification engine 406 may then compare the obtained user location to a list of potentially proximate security checkpoint locations. In some embodiments, the checkpoint identification engine 406 may query the datastore 408 for a list of potentially proximate security checkpoints along with the locations of the proximate security checkpoints. If the initial location of the user is sufficiently close to a specific security checkpoint, the checkpoint identification engine 406 may provide the user with a checkpoint identifier of the security checkpoint.

In some embodiments, the checkpoint identifier may include a character string corresponding to a name or a location of the security checkpoint. The checkpoint identifier may also comprise the terminal name associated with the security checkpoint. In various embodiments, the checkpoint identifier is consistent with the way a secure facility or security personnel may identify a given security checkpoint. For instance, the checkpoint identification engine 406 could use the Transportation Security Administration (TSA) security checkpoint name as the checkpoint identifier.

In various embodiments, the datastore 408 may include hardware and/or software to store information relating to a list of security checkpoints (e.g., the locations of security checkpoints, information relating to the area proximate to the security checkpoints, or information about the conditions of the security checkpoints) in a given region or nationally. The datastore 408 may also store travel objects associated with users passing through the security checkpoints, and gameplay data. The datastore 408, in operation, may store information relating to a list of security checkpoints in a given region or nationally, such as the locations of security checkpoints in a given region, information relating to the area proximate to the security checkpoints in the given region, information about the conditions of the security checkpoints in the given region, travel objects associated with users passing through the security checkpoints, and gameplay data.

In some embodiments, the datastore 408 may store crowdsourced condition data associated with one or more security checkpoints. Crowdsourced data is data gathered from a plurality of observations about a given event, location, or occurrence. When aggregated over time, a relatively large number of people are likely to pass through the secure screening environment. Many of the observers may be laypeople, with no connection to airport security or airport employment. Though individuals in the group may provide inaccurate accounts of security checkpoint conditions, the larger group, may have little motivation to inaccurately state the conditions of the secure screening environment. As the size of the group increases, the group's statistical outliers are likely to have lesser effect on the group's conclusions, and the group's observations are likely to converge toward a true account of the conditions of the secure screening environment.

In various embodiments, crowdsourced condition data is data relating to the conditions of the secure screening environment, where the data is obtained from a plurality of observations. The crowdsourced condition data may include, for example, crowdsourced data relating to wait times, the speed of a line passing through a secure screening environment, the nature of the travelers in the line, the environmental conditions of the secure screening environment, how security personnel are administering the secure screening environment, specific security screening devices in the secure screening environment, and other information.

In various embodiments, the datastore 408 may index items of crowdsourced condition data by specific security checkpoint and by conditions. For example, the datastore 408 may maintain a category of crowdsourced wait times at a specific checkpoint of LAX. The crowdsourced condition data may also have a temporal component, such as the actual crowdsourced wait times at a specific security checkpoint at any particular day, or day and time, or range of days and times, such as 7 a.m. on a Monday morning, or typical wait times at the specific security checkpoint at that time and date (e.g., based on previously received crowdsourced data). The data store 408 may index the crowdsourced data condition data in other ways as well.

In some embodiments, the presence notification engine 410 may comprise hardware and/or software to transmit a checkpoint identifier to a user based on checkpoint information from the checkpoint identification engine 406 and/or the datastore 408. In some embodiments, the presence notification engine 410 may provide a graphical menu of choices to a client device associated with the user. Each item on the graphical menu may be a security checkpoint that the user is likely proximate to. The graphical menu may only comprise a single security checkpoint, and the graphical menu may therefore consist of a radio button asking the user to select that single security checkpoint. The presence notification engine 410 may populate the graphical menu based on an airport map, data stored in the datastore 408, or from data obtained from a geography-based transmitter (e.g., a GPS transmitter) associated with the user's client device.

In addition to transmitting the checkpoint identifier, the presence notification engine 410 may also transmit a request for the user to enroll in services used to facilitate travel management for the user. In various embodiments, the presence notification engine 410 may request that the user provide some identification information to create a profile, at least to the level of minimum-mandatory information. A minimum-mandatory level of information is an amount of information sufficient to distinguish the user from another user. The minimum-mandatory information may include one or more of a username, a first and last name, a unique email address, digits of an identification number (e.g., a driver's license number or a social security number), and other identification information. A minimum-mandatory level of information may also include an access parameter like a password that allows a user to exclude others from accessing his or her personal information. The minimum-mandatory information may be the minimum level of information that may qualify a member for services. The amount of information that constitutes a minimum-mandatory may be adjusted over time by administrators, such as the entities administering the presence notification engine 410.

In addition to requesting the minimum-mandatory level of information, the presence notification engine 410 may also request the user to provide additional personal information in order to submit to additional security scrutiny and testing in order to obtain a higher gradation level resulting in a more seamless travel experience. Additional personal information may include but not be limited to: name, address, telephone number, email, credit card and/or debit card information, desired class of air travel (e.g., coach, business, or first class), airline carrier preference, seating preferences, travel time preferences, meal preferences, self park or valet parking, hotel preferences, rental car preferences, hologram animation of the applicant's face, full face profile, five second 360 degree facial video which over time may be extended to show prominent distinguishable features, retinal scan, fingerprints, facial scan, distinguishing marks, DNA, and so forth, all of which may be encrypted. Though the minimum-mandatory level may be sufficient to create a profile and enroll in the basic level of services, providing the additional personal information may help the user enroll in additional services related to the system and improve the user's travel experience. In various embodiments, the presence notification engine 410 may store the user's profile (which may include information such as the minimum-mandatory information and/or the additional personal information) in the datastore 408 or other storage location. It is noted that the system may request the additional identification information at a later stage and that only the minimum-mandatory information may be required for enrollment in services.

Additional personal information may also include information about travel-related attributes of the user. As discussed, a travel-related attribute is a property related to the travel needs or desires of another traveler. For example, the presence notification engine 410 may request the user to provide information such as travel preferences and credit card and/or debit card account information to facilitate expedited reservation services that would otherwise require the user to provide large amounts of data for each transaction. The presence notification engine 410 may also request from the user information usable by security personnel to expedite security clearances. Thus, in various embodiments, the presence notification engine 410 may request information such as: name, addresses, phone numbers and emails, travel preferences, class of service preference, desired class of air travel (e.g., coach, business, or first class), desired fare information (e.g., lowest fare with restrictions or least restrictive fares), typical departure airport preference, travel criteria information (e.g., scheduled airline preference, non-stop only, equipment type, or airport gradation/level), priorities for travel recommendations and automatic booking, gradation/level of participating travel companies, method of travel (e.g., air, sea, car, or bus), number of stops, company preferences (e.g., American Airlines or Amtrak), travel time preferences, meal preferences, car preferences, and/or hotel preferences. The presence notification engine 410 may also request frequent flyer data organized by Airline, frequent traveler data for other travel providers (e.g., car or hotel), frequency of travel (also beneficial for sharing with airport parking facilities), a preferred method of travel to or from the airport (self drive via private car or travel via bus, train, taxi; this information is useful to help forecast needs for auxiliary services such as parking facilities). In some embodiments, the presence notification engine 410 may request self park or valet parking, request rental car preferences, request preferences for other means of travel (e.g., train, short hop via car, or limo), request a user's special needs and emergency needs, and/or request emergency contact information (e.g., Doctor, Lawyer, Wife, Husband, or Father).

The presence notification engine 410 may also request special needs such as wheelchair, seasickness, underwater pressure, diet, etc. The system may capture any ADA supported needs honored by the airlines. In various embodiments, a user's updateable contact information may include contact information that may vary based on traveler's current travels. For example, the name and phone and email of the person who the traveler is meeting may be input and updated as needed. The updateable contact information may play a key role in ensuring that the appropriate people impacted by modifications to the traveler's travel plans may be notified via the reliable messaging process that is provided by the system, Biometric information, Hologram animation of face, Retinal scan, Fingerprints, Facial scan, Distinguishing marks, and/or DNA. It is noted that the system may request the information about the user's travel-related attributes at a later stage and that only the minimum-mandatory information may be required for enrollment in services.

As discussed herein, the obtained user information may be related to travel habits of users. This data may be useful to the member airports and airlines as well as other travel providers for planning purposes or to the airlines, travel providers and travel agencies to gain greater understanding of ways to improve the passenger experience. In one example, the data may be available in an XML type interface record to enable transferring and merging to existing CRM or data warehouse applications. Each data element that may be collected may be scrutinized in terms of privacy so that there is assurance that personal data may not be directly available for use but may indirectly be used. For example, the interface record could be defined to not transfer passport number data but could transfer age data to provide demographic information.

In some embodiments, the presence notification engine 410 may provide the user with PIN number or access code to access the user's profile. The PIN number or access code may be based on the password that the user provided in creating the profile.

In various embodiments, the presence notification engine 410, in operation, may receive a selection of the checkpoint identifier. For example, the mobile device may prompt the user to select the checkpoint identifier on the graphical menu presented to the user. The selection typically indicates that the user has identified and/or confirmed that he or she is within the given distance of the security checkpoint or the secure screening environment.

In various embodiments, the selection may be part of a visual "check-in" process. The communication engine 402 may transmit the selection of the checkpoint identifier to the presence notification engine 410. The presence notification engine 410 may transmit the selection of the checkpoint identifier to the checkpoint information engine 412. Those skilled in the art may appreciate that other sequences are possible for the presence notification engine 410 to receive a selection of the checkpoint identifier.

In various embodiments, the checkpoint information engine 412 may contain hardware and/or software to request checkpoint condition information from travelers. The checkpoint information engine 412 may also receive user-generated information about a security checkpoint and transmit the user-generated information to the condition crowdsourcing engine 414. For example, the checkpoint information engine 412, in operation, may request the communication engine 402 to ask a traveler associated with the mobile device for user-generated information about the security checkpoint. In some embodiments, the request uses the checkpoint identifier as a query parameter. The specificity of the request may vary. For instance, the checkpoint information engine 412 may request general information about the security checkpoint or may request information regarding specific conditions, equipment, or the screening process.

The checkpoint information engine 412 may focus the request on specific conditions relevant to a given traveler, group of travelers, a business seeking to monetize a specific secure screening environment, security agency seeking to regulate a specific secure screening environment, or other person or entity. For example, the checkpoint information engine 412 may request that the person associated with the mobile device provide an estimated wait time of the time he or she anticipates may wait in the queue leading up to the security checkpoint or to get through to a given recomposure area. The checkpoint information engine 412 may also focus the request on other conditions of the secure screening environment, such as: the speed of the line (e.g., the speed at which a traveler may enter the line and proceed to and through the security checkpoint), the nature of the travelers in the line, the environmental conditions of the secure screening environment, how security personnel are administering the secure screening environment, specific security screening devices in the secure screening environment, and other information.

In some embodiments, the user-generated information may also comprise a timed passage through the security checkpoint. For instance, the user-generated information may comprise information from a timer that measures the time taken to pass through the secure screening environment. The timer may begin when the user is near the security checkpoint and may end when the user has passed through the secure screening environment. For example, the timer may begin and end based on GPS signals of the mobile device, location information received from one or more network elements (e.g., wireless access points), or input from the user to indicate a start of a line to an end of the screening process.

In various embodiments, the timed passage may be inferred from the velocity of the user. For instance, the checkpoint information engine 412 may obtain a user's velocity from the user location engine 404. The checkpoint information engine 412 may also obtain the distance required to pass through the secure screening environment. To obtain the distance required to pass through the secure screening environment, the checkpoint information engine 412 may query the datastore 408 for data relating to the specific security checkpoint or the airport terminal containing the security checkpoint. The checkpoint information engine 412 may also query a map of the airport terminal stored in the datastore 408 or an Internet-accessible location (such as a publicly available map).

The checkpoint information engine 412 may also verify the time a user takes to pass through the secure screening environment by comparing multiple measures. For instance, in various embodiments, the checkpoint information engine 412 may use a timer to obtain a first measure (e.g., the value of the timer) of the time a user takes to pass through a secure screening environment. The checkpoint information engine 412 may also query modules like the user location engine 404 and the datastore 408 to obtain a second measure (e.g., the user's velocity divided by the distance required to pass through the secure screening environment) of the time the user takes to pass through the secure screening environment. In this example, the checkpoint information engine 412 may compare the first and second measures of time. The checkpoint information engine 412 may also correct, reject, or discount one or more of the measures if the first and second measures of time do not match one another. Those of ordinary skill in the art will appreciate that other measures of time are possible without departing from the scope and the substance of the inventive concepts described herein.

In some embodiments, the communication engine 402, in response to the request from the checkpoint information engine 412, may generate a request for user-generated information about the security checkpoint. The communication engine 412 may send the request over the network to the mobile device.

The checkpoint information engine 412, in operation, may receive user-generated information about the security checkpoint. In some embodiments, the user-generated information may include a general description and/or specific information regarding the secure screening environment. For instance, the user-generated information may comprise a user's unstructured opinion about the security checkpoint. In various embodiments, the user-generated information is more focused or is based on specific conditions relevant to a given traveler, group of travelers, a business seeking to monetize a specific secure screening environment, security agency seeking to regulate a specific secure screening environment, or other person or entity. For example, the user-generated information may comprise an estimated wait time. The user-generated information may also include a user-generated description of other conditions of the secure screening environment, such as: the speed of the line, the nature of the travelers in the line, the environmental conditions of the secure screening environment, how security personnel are administering the secure screening environment, specific security screening devices in the secure screening environment, and other information. The checkpoint information engine 412 may then transmit the user-generated information to the condition crowdsourcing engine 414.

In some embodiments, the condition crowdsourcing engine 414 may contain hardware and/or software to integrate the user-generated information into crowdsourced condition data associated with the security checkpoint. As discussed, crowdsourced data is data gathered from a plurality of observations associated with a given event, location, or occurrence. Crowdsourced condition data may be data relating to the conditions of the secure screening environment, where the data is obtained from a plurality of observations. Therefore, the condition crowdsourcing engine 414, in operation, may integrate the user-generated information into crowdsourced condition data associated with the security checkpoint. In some embodiments, the condition crowdsourcing engine 414 may parse the user-generated information to determine whether the user-generated information is linked to an existing condition category (e.g., a wait time).

In various embodiments, the user-generated information may not be linked to an existing condition category. If the condition crowdsourcing engine 414 determines that the user-generated information does not fit into an existing condition category, the condition crowdsourcing engine 414 may ignore or delete the user-generated information as irrelevant. The condition crowdsourcing engine 414 may also create a new category of crowdsourced condition data, if desired. For instance, the condition crowdsourcing engine 414 may create a new category of crowdsourced condition data in the datastore 408. The new category may include the user-generated information as a starting item. As a result, the condition crowdsourcing engine 414 may use the user-generated information to seed the crowdsourced condition data. If desired, the condition crowdsourcing engine 414 may also seed the crowdsourced condition data in other ways, such as using a predictive model from security personnel or businesses.

In some embodiments, the user-generated information may be linked to an existing condition category. If the condition crowdsourcing engine 414 determines that the user-generated information matches with an existing category, the condition crowdsourcing engine 414 may compare the values of the user-generated information with the corresponding values of the crowdsourced condition data.

For example, the user-generated information may indicate an actual wait time of 44 minutes at a given security checkpoint at LAX at 7 a.m. on a Monday. In this example, the datastore 408 could contain crowdsourced condition data indicating a wait time of 45 minutes for that given security checkpoint at 7 a.m. on a Monday morning. The crowdsourced condition data could be based, for instance, on the input of fifty-nine people. In this example, the condition crowdsourcing engine 414 could take the difference of the wait times (one minute) and divide the difference by the total number of information inputs (sixty) to deduct one second from the estimate. Thus, in this example, the condition crowdsourcing engine 414 may integrate the user-generated information into the crowdsourced condition data by deducing a second from the crowdsourced condition data. Alternatively, the condition crowdsourcing engine 414 may also overwrite the crowdsourced condition data to reflect an actual wait time of 44 minutes.

Those skilled in the art will appreciate that the condition crowdsourcing engine 414 may use other statistical, stochastic, or other methods without departing from the scope of integrating the user-generated information into the crowdsourced condition data. For example, the condition crowdsourcing engine 414 may use input from other modules within the security checkpoint server engine 302 to integrate the user-generated information into the crowdsourced condition data. In some embodiments, the data from some users may be considered more valuable than others. For example, a heavy user of the system may be seen as generally more accurate while another user's data, if at variance with the recently received collected data for the same checkpoint, may be weighted or disregarded as necessary. The condition crowdsourcing engine 414 may also use predictive models to integrate the user-generated information into the crowdsourced condition data. As a result of the rapid integration of the user-generated information into the crowdsourced condition data, the crowdsourced condition data converges toward true condition data and provides information unavailable through predictive models, such as predictive staffing models.

In some embodiments, the interuser connection engine 416 may contain hardware and/or software to provide data, such as crowdsourced condition data to other users. In this respect, the interuser connection engine 416 may obtain crowdsourced condition data from the condition crowdsourcing engine 414 and transmit the crowdsourced condition data to the communication engine 402. More specifically, the interuser connection engine 416, in operation, may provide the crowdsourced condition data to another user. In various embodiments, the interuser connection engine 416 may attach a user identifier to associate the crowdsourced condition data with the user providing the user-generated information. The interuser connection engine 416 may also allow the provider of the user-generated information to remain anonymous by not attaching the identity of the provider to the crowdsourced condition data.

The interuser connection engine 416 may provide the crowdsourced condition data to the communication engine 402, which may distribute the crowdsourced data (potentially reflecting the updates from the user-generated information) to another user. The communication engine 402 may format the crowdsourced data so that the crowdsourced data may be centrally stored (e.g., on a central server or database) and accessed by other users and/or devices. The other users may access the centrally stored information when they log onto a mobile application, from a browser, or otherwise.

The communication engine 402 may also format the crowdsourced data to be directly pushed to the mobile devices of others. For instance, the communication engine 402 may format the crowdsourced data so that the crowdsourced data forms a part of an automatic update to other digital devices connected to the system. In one example, crowdsourced data associated with commonly used airports and/or security checkpoints may be pushed to a mobile device. In another example, crowdsourced data associated with airports and/or security checkpoints proximate to a location of the mobile device may be uploaded. Those skilled in the art will appreciate that any amount of crowdsourced data may be uploaded to any mobile device at any time.

In some embodiments, the travel object tracking engine 418 may contain hardware and/or software to track travel objects associated with a user. For instance, the travel object tracking engine 418, in operation, may receive an identifier of a travel object associated with the user. A travel object may be an item of luggage, one or more personal items, one or more laptops, an item of jewelry, one or more electronic goods, or other items that a user seeks to pass through the secure screening environment either on his or her person or through an object scanner. In various embodiments, the communication engine 402 provides the identifier of the travel object to the travel object tracking engine 418. The travel object identifier may have a geography-based component taken from a geography-based transmitter located on or near the travel object. In some embodiments, the transmitter may be tethered to the mobile device of the associated user. The travel object identifier may come from a variety of sources. For instance, the travel object identifier may come from a radio frequency identification (RFID) device associated with the travel object. The travel object identifier may also come from a Bluetooth device associated with the travel object.

In various embodiments, the travel object tracking engine 418, in operation, may maintain an object location of the travel object. For instance, the travel object tracking engine 418 may store the object location of the travel object in the datastore 408. In some embodiments, the travel object tracking engine 418 may compare the object location with the location of the user. For example, the travel object tracking engine 418 may obtain the geographical coordinates of the travel object and may compare the travel object's geographical coordinates with the geographical coordinates of the user (as obtained from the user location engine). The travel object tracking engine 418 may issue an alert if the travel object's geographical coordinates differ from the user's geographical coordinates by a given distance. Accordingly, the travel object tracking engine 418 may securely and dependably ensure that a travel object does not stray too far from a traveler (or that a traveler does not lose his or her belongings) during travel. In some embodiments, the travel object tracking engine 418 may also provide the user with the object's location as the user travels. The travel object tracking engine 418 may therefore ameliorate anxiety and confusion associated with travel.

In some embodiments, the security checkpoint gameplay engine 420 may contain hardware and/or software to maintain a system of location-based interactive gameplay. For example, the security checkpoint gameplay engine 420 may maintain an interactive, social, and/or location-based game centered around the lifestyle of air travel. In eras past, air travel was luxurious. Airlines and other common carriers induced air travel and maintained passenger loyalties with perks such as sponsored cocktail hours. Travelers saw each other as members of an exclusive club and looked forward to getting away to explore places and seize business opportunities.

In various embodiments, the air travel gameplay of the security checkpoint gameplay engine 420 may mimic the look and feel of eras past and give travelers a reason to engage with each other, to travel, and/or engage with the mobile application. In some embodiments, the security checkpoint gameplay engine 420 may maintain gameplay that is interactive. The gameplay may accept input from a user and may create a system of points, credits, and other items that the user may integrate into his or her experiences. For instance, the gameplay may accept a user's selection of a security checkpoint (referred to as "checking in" in gameplay). A user in gameplay may check-in to announce to the gameplay system (and other users as discussed below) that he or she has arrived at the security checkpoint. Gameplay may also award points based on a user's checking into a security checkpoint multiple times over a predetermined range of dates—indicating multiple visits to the security checkpoint—or to checking in to a remote or exotic security checkpoint. Gameplay may award points based on traveling on a milestone date such as Christmas, Thanksgiving, New Year's Eve, or a person's birthday or a couple's wedding anniversary. Gameplay may rank users and given them virtual "badges" for frequent travel.

In various embodiments, the security checkpoint gameplay engine 420 may maintain gameplay that is location-based. For example, the security checkpoint gameplay engine 420 may maintain gameplay based on the location of the user, as obtained from the checkpoint information engine 412. In some embodiments, the location-based aspects of gameplay may simply include a wait time guessing game that compares a user's guess of a security checkpoint wait time with the actual wait time it took him or her to pass through the security checkpoint. In other embodiments, the wait time guessing game could compare a user's guess of a security checkpoint wait time with a crowdsourced wait time taken from the condition crowdsourcing engine 414. In various embodiments, the security checkpoint gameplay engine 420 may also support a guessing game based on a user's guesses of other security checkpoint conditions, such as environmental conditions, administrative conditions, or other conditions.

In some embodiments, the security checkpoint gameplay engine 420 may maintain gameplay with a social component. For instance, the security checkpoint gameplay engine 420 may maintain gameplay that allows the user to interact with other users and members of a gameplay community. The gameplay may compare the statistics of users and rank users based on attributes such as check-ins and points. The gameplay may also involve connecting air travelers to form a virtual air travel community, where members may network, meet up for activities, and coordinate going to or from common destinations. The gameplay may facilitate connecting different users based on common interests or common patterns of behavior, such as the security checkpoints they are most likely to check into. In various embodiments, the gameplay may facilitate competition between members to see who, for instance, may pass a secure screening area first and arrive at a cocktail lounge or coffee shop in the airport.

In various embodiments, security checkpoint gameplay engine 420 may maintain gameplay that is monetized. For instance, the gameplay may involve sponsored items. A sponsored item is an item in gameplay that is connected to a sponsor such as a government agency or a business. The sponsored item may include, for instance, an advertisement from a business partner or a government entity. The sponsored item may also include an airport concession for food, drinks, or services (e.g., a one-day gym membership or a massage) at an airport. The sponsored item may further include government sponsored safety information or privately sponsored safety information that provides a warning or safety information within the gameplay. In various embodiments, the sponsored item may include a travel perk that makes it easier to travel. In some embodiments, the sponsored item may include an expedited front of the line pass or an expedited security benefit. As used herein, a security benefit is an advantage or a profit that is related to airport security and is earned as a result of participation in the gameplay and/or other interaction with the application. Examples of security benefits may include specialized and/or accommodated screening, access to shorter and more efficient lines, and/or operational considerations that more easily facilitate passage through the secure facility. The gameplay may recreate the perks and luxuries of air travel of days past. The discussion accompanying FIG. 4B further discusses aspects of the security checkpoint gameplay engine 420.

Figure 4B:
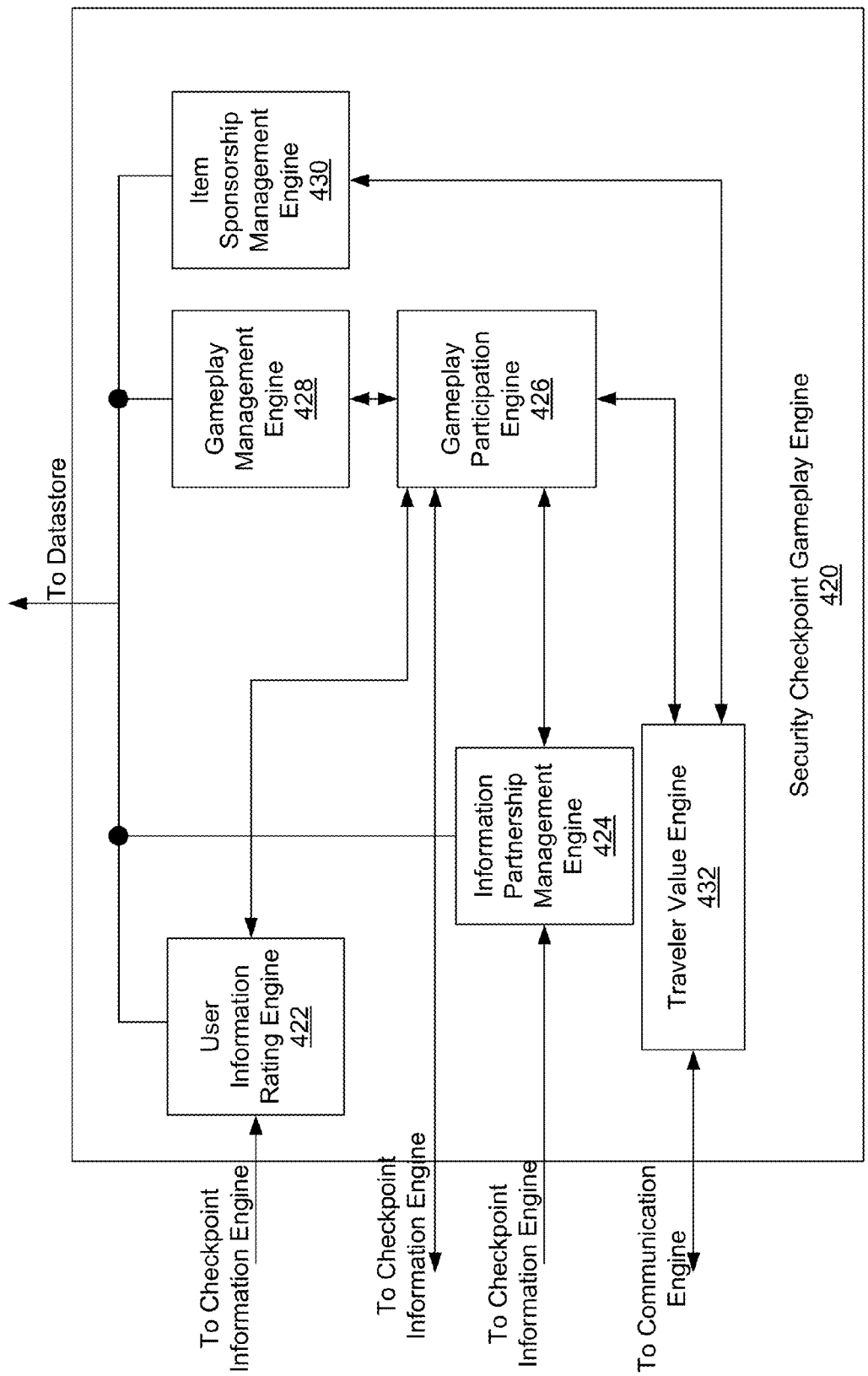
FIG. 4B depicts an exemplary security checkpoint gameplay engine according to some embodiments.

FIG. 4B depicts an exemplary security checkpoint gameplay engine 420 according to some embodiments. The security checkpoint gameplay engine 420 may include a user information rating engine 422, an information partnership management engine 424, a gameplay management engine 428, a gameplay participation engine 426, an item sponsorship management engine 430, and a traveler value engine 432.

The user information rating engine 422 may connect to a checkpoint information engine and a datastore. The information partnership management engine 424 may connect to a checkpoint information engine, a datastore, and the gameplay participation engine 426. The gameplay management engine 428 may connect to the checkpoint information engine, the datastore, and the gameplay participation engine 426. The gameplay participation engine 426 may connect to the user information rating engine 422, the gameplay management engine 428, the information partnership management engine 424, and the traveler value engine 432. The item sponsorship engine 430 may connect to the datastore and the traveler value engine 432. The traveler value engine 432 may connect to a communication engine and the gameplay participation engine 426.

Each of the user information rating engine 422, the information partnership management engine 424, the gameplay management engine 428, the gameplay participation engine 426, the item sponsorship management engine 430, and the traveler value engine 432 may comprise hardware and/or software coupled with a processor and a memory.

In some embodiments user information rating engine 422 may comprise hardware and/or software to provide a quality rating of user-generated information. For example, the user information rating engine 422 may obtain user-generated information of a security checkpoint condition from a module such as a checkpoint information engine. The user information rating engine 422 may use statistical, stochastic, and other filters to rate the quality of the user-generated information. In various embodiments, the user information rating engine 422 may employ an accuracy filter that rates the likely accuracy of the user-generated information compared to crowdsourced information about the same topic or information about the same topic stored in the datastore.

In some embodiments, the user information rating engine 422 may use a reliability filter to rate the reliability of the source of the user-generated information based on the background of the user providing the information. For example, the user information rating engine 422 may account for the assumption that a business traveler who primarily travels on Monday mornings may be considered a highly reliable source of security checkpoint condition information. In another example, the user information rating engine 422 may discount or reduce the weight of a sporadic traveler's information when that information significantly different from many other travelers at the same checkpoint. In yet another example, the information rating engine 422 may reduce the weight of a traveler who consistently rates all checkpoints as low as possible regardless of actual conditions.

The user information rating engine 422 may implement statistically based filters to determine whether user-generated information constitutes an outlier within a category and should therefore be discounted or disregarded. In various embodiments, the user information rating engine 422 may implement an insightfulness filter for security checkpoint conditions that are particularly insightful for a given topic. For instance, the user information rating engine 422 may flag security tips as particularly important. In some embodiments, the user information rating engine 422 may provide the user-generated information with a numerical rating to indicate the quality of the user-generated information.

In various embodiments, the user information rating engine 422, in operation, may provide rated user information to the gameplay participation engine 426. Thus, the user information engine 422 may transmit rated information to the gameplay participation engine 426.

In some embodiments, the information partnership engine 424 may contain hardware and/or software to associate an information partner with the user-generated information. For instance, the information partnership management engine 424 may obtain user-generated information from a checkpoint information engine and may transmit partnered information to the gameplay participation engine 426. Further, the information partnership management engine 424, in operation, may associate an information partner with the user-generated information.

In some embodiments, the information partnership management engine 424 may associate the information partner with travel-related attributes of the user. An information partner is a government agency or business that integrates the user-generated information (or the user's travel-related attributes) into an information stream. The information partner may be one or more of a national or a location-based advertiser that generates revenue based on the user-generated information about the checkpoint or the locational information of the user, a security firm that maintains security procedures based on the user-generated information about the checkpoint or the locational information of the user, or a governmental agency that may use the user-generated information about the checkpoint or the locational information of the user for security or informational procedures.

In various embodiments, the information partnership management engine 424 may include an aggregation/demographic layer that rolls up information provided for the purpose of gathering overall statistics of the utilization of the system, and other purposes. The aggregation/demographic layer may prevent sharing of a specific member's passport information, for instance, but may share the fact that the specific member is a U.S. male citizen between the ages of 40 and 50. The aggregation/demographic layer may be useful to gain a better idea of the behavior patterns of the membership and also to provide a means for future targeted promotions of potential members. The travel preferences may also be beneficial in terms of gathering an understanding of areas that could be of greater value to the member. This provides the basis of the data that may be required in support of a "light" CRM. The aggregation/demographic layer of the information partnership management engine 424 may preserve a respect for privacy while enabling information gathering for statistical purposes. The data to be collected about each member may be controlled on a member-owned basis. The member application requests many data elements. The data elements are either mandatory or optional. To attain a certain level of certification or gradation, each member is encouraged to complete as much information as possible.

In some embodiments, the information partnership management engine 424 may adapt the user-generated information or the travel-related attributes of the user to be compatible with a passenger stream monitor. A passenger stream monitor is a monitor that evaluates a number of people passing through a specific security checkpoint. A passenger stream monitor may also monitor other attributes of a security checkpoint queue, such as a rate of people passing through, a rate of security incidents, a complaint rate, and a condition of the security checkpoint. In various embodiments, the information partnership management engine 424 adapts the user-generated information or the travel-related attributes of the user to comport with a numerical score or an array that is compatible with a passenger stream monitor.

In some embodiments, the user-generated information may include the rate the user passes through a checkpoint, a rate that the user estimates that other people are passing through the checkpoint, a user's identification of security incidents, a user's complains, and a user's assessments of the conditions of the security checkpoint. The user may input the user-generated information utilizing the mobile application (e.g., to identify a rate of travelers passing through the line, any security incidents witnessed or complaints that may be viewed by others). In various embodiments, the passenger stream monitor may receive information outside the user-generated information including, but not limited to, official complaints or information provided by TSA such as the quality of the checkpoint, quality of TSA agent training, or reported security incidents.

In various embodiments, the information partnership management engine 424 may adapt the user-generated information or the travel-related attributes of the user to be linked to another user with interests compatible with the user-generated information or the travel-related attributes of the user. The information partnership management engine 424 may mine the datastore for other users with interests compatible with the user-generated information or the travel-related attributes of the user. Comparing the information, the information partnership management engine 424 may link the user (e.g., provide introductions, allow users to share information, indicate when similar users are proximate to each other at a travel facility) with the other users.

The gameplay participation engine 426 may comprise hardware and/or software to maintain gameplay participation values in the system of interactive, social, and location-based gameplay. In some embodiments, the gameplay participation engine 426, in operation, may transmit, receive, and/or maintain gameplay participation information. A gameplay participation value is a measure of gameplay points given for a user's extent of participation in the gameplay.

In some embodiments, the gameplay participation engine 426 may, in operation, provide a first gameplay participation value based on the selection of the checkpoint identifier. The gameplay participation engine 426 may receive the selection of the checkpoint identifier directly from a checkpoint information engine.

In various embodiments, the user's selection of a security checkpoint may comprise "checking in" to the security checkpoint. A user in gameplay may check-in to announce to the gameplay system (and other users as discussed below) that he or she has arrived at the security checkpoint. The first participation value may include points or credits in gameplay. The gameplay participation engine 416 may base the first participation value on a user's checking into a security checkpoint multiple times—indicating multiple visits to the security checkpoint—or to checking in to a remote or exotic security checkpoint. The gameplay participation engine 416 may base the first participation value on traveling on a milestone date such as Christmas, Thanksgiving, New Year's Eve, or a person's birthday or a couple's wedding anniversary.

The gameplay participation engine 426, in operation, may provide a second gameplay value based on an attribute of the user-generated information. The second gameplay participation value need not be related to the first gameplay participation value. The gameplay participation engine 426 may receive the user-generated information directly from a checkpoint information engine.

In some embodiments, the gameplay participation engine 426 may parse the user-generated information for relevant attributes. For example, the gameplay participation engine 426 may evaluate whether the user generated information contains an estimated wait time, and if so, may base the second gameplay participation value on the fact that the user provided such an estimate. The gameplay participation engine 426 may similarly base the second gameplay participation value on whether the user generated information contains other indicators of the conditions of the secure screening environment, such as environmental conditions and/or administrative issues relating to the secure screening environment.

The gameplay participation engine 426 may vary the amount of the second gameplay participation value on the nature of the data contained in the user generated information. For instance, the gameplay participation engine 426 may award one set of points or credits for an estimated time to pass through the secure screening environment may, and another set of points or credits for information about environmental conditions of the secure screening environment. The gameplay participation engine 426 may also vary the amount of the second gameplay participation value based on the level of detail of the user-generated information. Accordingly, the gameplay participation engine 426 may induce users to provide critical information about the secure screening environment.

In some embodiments, the gameplay participation engine 426, in operation, may provide a third gameplay participation value based on the quality rating of the user generated information. The quality rating of the user generated information may come from the rated information provided through the user information rating engine 422. In one example, the quality of the information may be rated for quality, consistency, similarity to other travelers, quantity and third-party rating. In some embodiments, users may view an aggregate crowdsourced score representing conditions, wait times, and the like for a given checkpoint. The users may also see one or more individual user's ratings. The individual user's rating may be randomly selected, based on participation values, or perceived accuracy. Each user, in some embodiments, may rate other user's ratings for usefulness. The act of rating another user may increase the rater's gameplay participation value. Similarly, the user that receives positive ratings from others may also receive a positive gameplay participation value.

The third gameplay participation value need not be related to the first gameplay participation value or the second gameplay participation value. In various embodiments, the third gameplay participation value comprises a deduction from the second gameplay participation value to indicate that the quality of the user-generated information should not be afforded one hundred percent confidence. Those skilled in the art will appreciate that there may be any number of gameplay participation values.

In some embodiments, the gameplay participation engine 426, in operation may calculate a gameplay participation level of the user based on some combination of the first gameplay participation value, the second gameplay participation value, and the third gameplay participation level. In various embodiments, the gameplay participation level simply comprises a set of points or credits based on an aggregate of the first gameplay participation level, the second gameplay participation level, and the third gameplay participation level. However, the gameplay participation engine 426 may also calculate the gameplay participation level in other ways.

The gameplay management engine 428 may include hardware and/or software to manage interactive, social, and location-based gameplay. The gameplay management engine 428, in operation, may manage aspects of gameplay by interfacing between the gameplay participation engine 426 and a datastore. For instance, the gameplay management engine 428 may maintain interactive, social, and location-based gaming elements. In various embodiments, the gameplay management engine 428 may utilize gaming graphics engines. The gameplay management engine 428 may also manage gameplay participation levels, points, credits, and other items existing in the gameplay, such as where, when, and whether a user has checked in as well as the user's check in history. The gameplay management engine 428 may further support location-based attributes of gameplay and social components (such as friendship circles and connections) of gameplay. In some embodiments, the gameplay management engine 428 may support monetary aspects of gameplay, including connections between partners and the user, as well as the user's financial information. The gameplay management engine 428 may therefore manage the ecosystem of a user's gameplay experiences.

The item sponsorship management engine 430 may include hardware and/or software to connect a sponsored item to user-generated information. For instance, the item sponsorship management engine 430, in operation may provide a sponsored item to the traveler value engine 432. A sponsored item is an item in gameplay that is connected to a sponsor such as a government agency or a business. The sponsored item may include, for instance, an advertisement from a business partner or a government entity. The sponsored item may also include an airport concession for food, drinks, or services (e.g., a one-day gym membership or a massage) at an airport. The sponsored item may further include government sponsored safety information or privately sponsored safety information that provides a warning or safety information within the gameplay. In various embodiments, the sponsored item may include a travel perk that makes it easier to travel.

The traveler-value engine 432 may include hardware and/or software to provide a user a travel-directed value associated with the gameplay participation level of the user. In some embodiments, the traveler value engine 432, in operation, may provide a travel-directed value associated with the gameplay participation level of the user. A travel-directed value is something that has a worth in the real world or in gameplay, and is related to a user's experience passing through the security checkpoint or his or her subsequent travel. In various embodiments, the travel-directed value may include any of: a crowdsourced wait time, a crowdsourced security checkpoint condition, a gameplay participation status, a gameplay participation item, a sponsor-related value, a partnership-related value, and a sponsored event. The traveler value engine 432 could base some or all of the travel-directed value on the sponsored item from the item sponsorship management engine 430. In various embodiments, the traveler value engine 432 may connect to a communication engine, the gameplay participation engine 426, and the item sponsorship management engine 430.

In various embodiments, the traveler-value engine 432 may also provide rewards or travel related information to the user. Rewards may include hotel offers, car rental offer, taxi information, limousine services, restaurant information, or the like. If a user is identified as a periodic traveler, specific offers of goods and/or service may be made to the user through the mobile application, email, text, browser advertisements, mailings, or the like. If a user is identified as a frequent business or first class traveler, different offers for premium goods and services may be offered to the user. For example, offers for four or five star hotels, premium services, airport lounges, club memberships and the like may be offered to premium travelers. The higher quality offerings may act as an encouragement for users to travel more often and/or use the mobile application. In some embodiments, a user may obtain higher and more valuable offers and information for interacting with the application and/or obtaining a high gameplay participation value.

The traveler-value engine 432 may also provide travel related information to the user. In some embodiments, the user may utilize the application to receive specific information regarding an airport (e.g., view maps, identify restaurants, or find family-oriented restrooms) or a destination. For example, the traveler-value engine 432 may include a list of quality hotels, potentially rated by other travelers using the mobile application, as well as prices, vacancies, quality, and safety. The traveler-value engine 432 may provide information regarding a general destination, such as frequently asked questions, safe areas, unsafe areas, customs, currency, language, accepted power converters, or the like. Further, the traveler-value engine 432 may provide a list of commonly forgotten items so that the user does not forget important necessities and, if such things are forgotten, the traveler-value engine 432 may provide the user with locations proximate to the user to obtain replacements clothes, toiletries, chargers, or the like.

The discussion has focused on the structures and operation of the security checkpoint server engine 304, as shown in FIGS. 3, 4A, and 4B. The discussion proceeds to embodiments of a related client (introduced as the mobile security checkpoint client engine 306 in FIG. 3), shown in FIG. 5.

FIG. 5 depicts an exemplary security checkpoint client engine 306 according to some embodiments. The security checkpoint client engine 306 may comprise a communication engine 502, a geography-based transmitter 504, a user location client engine 506, a checkpoint selection engine 508, a user interface engine 510, a user interface display 512, a gameplay client engine 514, a crowdsourced client engine 516, a datastore 518, and a timer 520.

The communication engine 502 may connect to the user location client engine 506, which in turn may connect to the geography-based transmitter 504. The communication engine 502 also may connect to the checkpoint selection engine 508, which may connect to the user interface engine 510, which in turn may connect to the user interface display 512. The communication engine 502 further may connect to the gameplay display engine 514, which may connect to the user interface engine 510. Moreover, the communication engine 502 may connect to the crowdsourced client engine 516, which may connect to the user interface engine 510. The datastore 518 may connect to the geography-based transmitter 504, the user location client engine 506, the checkpoint selection engine 508, gameplay client engine 514, and the crowdsourced client engine 516. In this example, the timer 520 may connect to the user interface engine 510.

In some embodiments, communication engine 502 may comprise hardware and/or software to facilitate communication between a network and the components inside the security checkpoint client engine 306. Thus, in some embodiments, the communication engine 502 may interface between a network and one or more of the user location client engine 506, the checkpoint selection engine 508, the gameplay client engine 514, and the crowdsourced client engine 516.

In various embodiments, the communication engine 502, in operation, may interface between a network and each of the user location client engine 506, the checkpoint selection engine 508, and the gameplay display engine 514. For instance, the communication engine 502 may encode data from the engines in the security checkpoint client engine 306 into a format suitable for a security checkpoint server engine to process. The communication engine 502 may send data packets over the network. The data packets may include a source identifier such as an Internet Protocol (IP) address or a media access control (MAC) address of a mobile device containing the security checkpoint client engine 306. The data packets may include location-based information. In various embodiments, the location-based information may take the form of a GPS location taken from the geography based transmitter 504. The location-based information may also take the form of a point on a map of a specific airport, terminal, or secure screening environment. The location-based information may also include a distance (such as a radial distance) from a secure screening environment.

The communication engine 502 may also decode data from a security checkpoint server engine. The received data may have a destination identifier, such as the IP address or the MAC address of the mobile device containing the security checkpoint client engine 306. Those skilled in the art will appreciate that the communication engine 502 may employ other device identifiers as well.

In some embodiments, the geography-based transmitter 504 may include hardware and/or software to obtain a user location based on a connection to a navigational system, such as a satellite navigational system. The geography-based transmitter 504, in operation, may include a module that provides the user's location. In some embodiments, the geography-based transmitter 504 may include a GPS device that provides locational information based on a satellite navigation system. The geography-based transmitter 504 may provide the user's location in the form of a point on a map, a point inside a terminal, or in the form of a distance (such as a radial distance) from a secure screening environment. In various embodiments, the geography-based transmitter 504 may store one or more user locations in the datastore 518. For instance, the geography-based transmitter 504 may store in the datastore 518 an historical list of user locations.

In some embodiments, the user location client engine 506 may include hardware and/or software to monitor the geography-based transmitter 504 and provide an indicator when a user enters a given distance of a security checkpoint. In various embodiments, the user location client engine 506, in operation, may provide an initial location when a user enters a given distance of a security checkpoint. In some embodiments, the user location client engine 506 may monitor the geography-based transmitter 504 for an indication that the user has entered the given distance of the security checkpoint. In various embodiments, the user location client engine 506 may continuously or periodically monitor a state of the geography-based transmitter 504. The user location client engine 506 may also provide the geography-based transmitter 504 with periodic requests for the user location. In some embodiments, the geography-based transmitter 504 periodically pushes the user's location out to the user location client engine 506. In various embodiments, the user location client engine 506 queries the datastore 518 for the most recently stored user location. The queries may be periodic or at predefined intervals. In some embodiments, the user location client engine 506 pushes the location of the geography-based transmitter 504 to the communication engine 502 periodically or at predefined intervals. The initial location data may comprise a location on a map or a point in a security terminal or a radial distance away from a point in a secure screening area.

In various embodiments, the user location client engine 506 may send the initial location to the communication engine 502. The communication engine 502 may encode the user's initial location into data packets for processing by a security checkpoint server engine. The communication engine 502 may also send the initial location to the security checkpoint server engine. In various embodiments, the security checkpoint server engine compares the initial location to determine whether the user is within a given distance of the security checkpoint. The communication engine 502 may receive from the security checkpoint server engine an affirmation that the user is within the given distance of the security checkpoint. The affirmation may take the form of tokens, one or more bits, or a number corresponding to the distance that the user is away from the security checkpoint. The checkpoint selection engine 508 may then receive the affirmation that the user is within the given distance of the security checkpoint from the communication engine 502. In various embodiments, the affirmation simply comprises a security checkpoint identifier of a security checkpoint. In some embodiments, the checkpoint identifier comprises a character string corresponding to a name or a location of the security checkpoint. The checkpoint identifier could also provide the terminal associated with the security checkpoint. In various embodiments, the checkpoint identifier is consistent with the way a secure facility or security personnel identify the airport. For instance, the checkpoint identification engine 406 could use the TSA security checkpoint name as the checkpoint identifier.

In some embodiments, the checkpoint selection engine 508 may include hardware and/or software to allow a user to select a security checkpoint and "check in" to the security checkpoint. Thus, the checkpoint selection engine 508, in operation, may receive the checkpoint identifier of the security checkpoint when the user is at the initial location. A request to select the security checkpoint may accompany the checkpoint identifier. The request to select the security checkpoint may comprise a request for the user to accept that he or she is within the given distance of the security checkpoint or within the given distance of a point in a secure screening environment. In various embodiments, the checkpoint selection engine 508 may transmit the selection request to the user interface engine 510.

The user interface engine 510, in operation, formats the selection request into a GUI format for display on the user interface display 512. The selection request may be part of a visual "check-in" process associated with interactive gameplay elements of the mobile application. The user interface engine 510 may include hardware and/or software to provide data to the user interface display 512 for a user to view. The user interface engine 510 may also include hardware and/or software to process user input into the user interface display engine 512 and to process information from the timer 520.

In some embodiments, the user interface engine 510 may provide user-generated information comprising a timed passage through the security checkpoint. For instance, when the checkpoint selection engine 508 has received the selection of the checkpoint identifier, the checkpoint selection engine 508 may activate the timer 520. Once the user has passed through the security checkpoint, the user interface engine 520 may terminate the time 520. The timed passage may therefore form a part of the user-generated information.

In some embodiments, the user interface engine 510 may be configured to provide to the user interface display 512 a travel-directed value associated with the gameplay participation level. As discussed herein, travel-directed value is something that has a worth in the real world or in gameplay, and is related to a user's experience passing through the security checkpoint or his or her subsequent travel. For example, the travel-directed value may include a crowdsourced wait time, a crowdsourced security checkpoint condition, a gameplay participation status, a gameplay participation item, a sponsor-related value, a partnership-related value, and/or a sponsored event.

The user interface display 512 may contain hardware and/or software to display information to a user. In some embodiments, the user interface engine 512, in operation, may display the selection request to the user. In these embodiments, user interface engine 512, and the user interface engine 510 in turn, may accept a selection of the checkpoint identifier from the user. Thus, the user interface display 512 may provide the selection of the checkpoint identifier to the user interface engine 510.

In various embodiments, the user interface display 512 may allow the user to provide user-generated information about the security checkpoint. For instance, the user interface engine 510 may be configured to accept user-generated information in one or more formats. For instance, the user interface engine 510 may accept user-generated information comprising general information about the security checkpoint (e.g., a text string about the general information of the security checkpoint). The user-generated information may also comprise specific conditions relevant to a given traveler, group of travelers, a business seeking to monetize a specific secure screening environment, security agency seeking to regulate a specific secure screening environment, or other person or entity. For example, the user-generated information may comprise an anticipated wait time, or on other conditions of the secure screening environment, such as: the speed of the line, the nature of the travelers in the line, the environmental conditions of the secure screening environment, how security personnel are administering the secure screening environment, specific security screening devices in the secure screening environment and other information.

In some embodiments, the gameplay client engine 514 may include hardware and/or software to present aspects of interactive, social, and location-based gameplay to the user interface engine 510 for display. The gameplay display engine 514, in operation, may provide a gameplay participation level of the user based on the selection of the checkpoint identifier and an attribute of the user-generated information. A gameplay participation value is a measure of gameplay points given for a user's extent of participation in the gameplay. In various embodiments, the gameplay participation level simply comprises a set of points or credits based on an aggregate of a first gameplay participation level provided for checking in, a second gameplay participation level provided for giving user-generated information about the security checkpoint, and a third gameplay participation level based on a quality of the user-generated information about the security checkpoint. The gameplay participation value may also be calculated in other ways.

In various embodiments, the crowdsourced client engine 516 may include hardware and/or software to present crowdsourced condition data to the user interface engine 510 for display. For example, the crowdsourced condition data may include a crowdsourced wait time, environmental condition, or administrative condition related to the security checkpoint. The crowdsourcing content engine 516 may provide the crowdsourced condition data to the user interface engine 510, which in turn, may configure the user interface display 512 to display the crowdsourced condition data.

In some embodiments, the datastore 518 may include hardware and/or software to locally store information relating to a list of security checkpoints (e.g., the locations of security checkpoints, information relating to the area proximate to the security checkpoints, information about the conditions of the security checkpoints) in a given region or nationally. The datastore 518 may also locally store travel objects associated with users passing through the security checkpoints, and gameplay data. The datastore 518, in operation, may locally store information relating to a list of security checkpoints in a given region or nationally, such as the locations of security checkpoints in a given region, information relating to the area proximate to the security checkpoints in the given region, information about the conditions of the security checkpoints in the given region, travel objects associated with users passing through the security checkpoints, and gameplay data.

In some embodiments, the datastore 518 may locally store crowdsourced condition data associated with one or more security checkpoints. Crowdsourced data is data gathered from a plurality of observations about a given event, location, or occurrence. When aggregated over time, a relatively large number of people are likely to pass through the secure screening environment. Many of them are laypeople, with no connection to airport security or airport employment. Though individuals in the group may provide inaccurate accounts of security checkpoint conditions, the larger group, due to its lay-nature, has little motivation to inaccurately state the conditions of the secure screening environment. As the size of the group increases, the group's statistical outliers are likely to have lesser effect on the group's conclusions, and the group's observations are likely to converge toward a true account of the conditions of the secure screening environment.

In various embodiments, crowdsourced condition data is data relating to the conditions of the secure screening environment, where the data is obtained from a plurality of observations. The crowdsourced condition data may include, for instance, crowdsourced data relating to wait times, the speed of a line passing through a secure screening environment, the nature of the travelers in the line, the environmental conditions of the secure screening environment, how security personnel are administering the secure screening environment, specific security screening devices in the secure screening environment and other information. The condition crowdsourcing engine 414 therefore incorporates the astute observations of a crowd of lay observers passing through a given secure screening environment.

In various embodiments, the datastore 518 may index items of crowdsourced condition data by specific security checkpoint and by conditions. For example, the datastore 518 may maintain a category of crowdsourced wait times at a specific terminal of LAX. The crowdsourced condition data may also have a temporal component, such as the crowdsourced wait times at a specific security checkpoint at 7 a.m. on a Monday morning. The datastore 518 may index the crowdsourced data condition data in other ways as well.

In some embodiments, the timer 520 may include hardware and/or software to measure an interval of time. For instance, the timer 520 may contain a clock or link to a system clock of a digital device.

Figure 6:
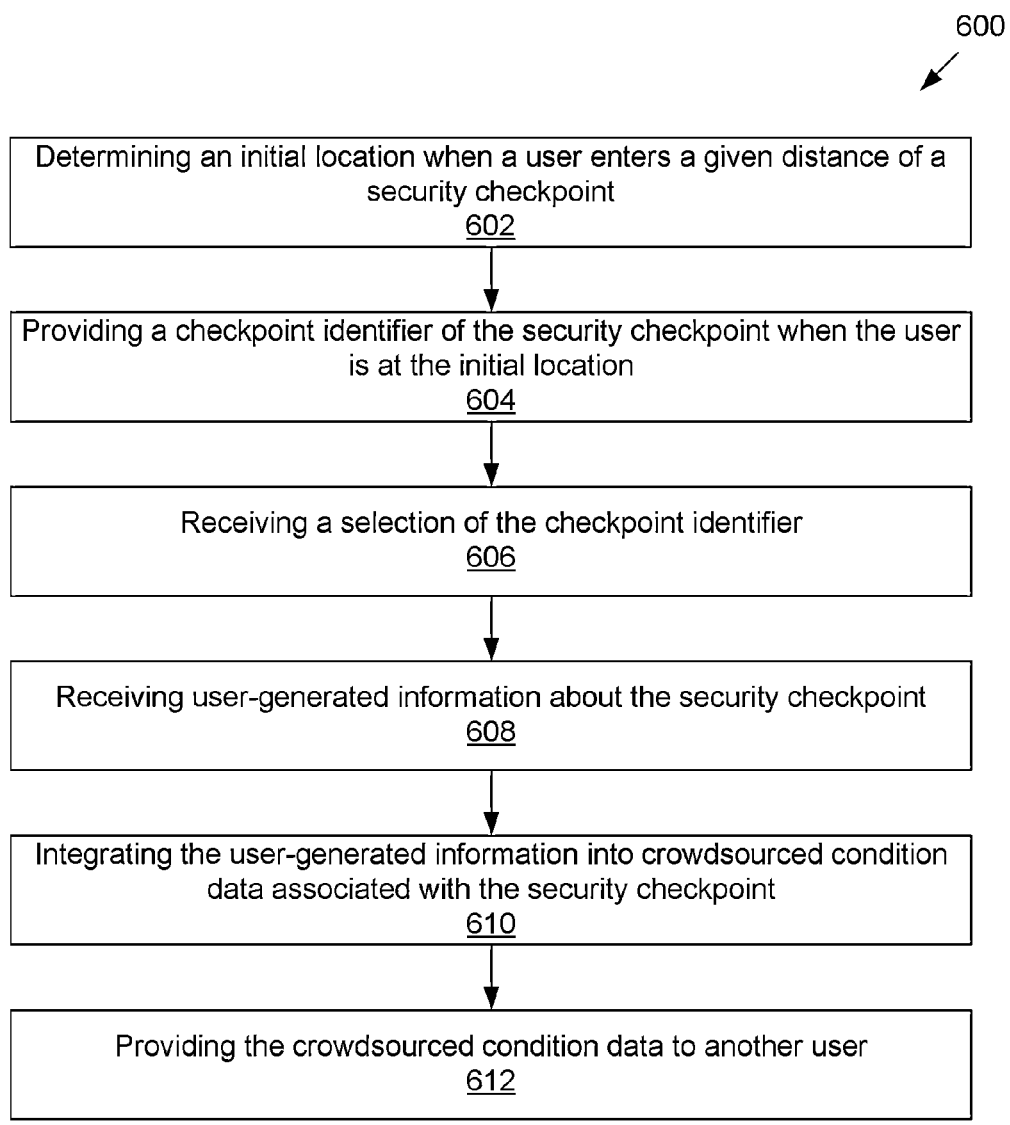
FIG. 6 depicts an exemplary method for providing crowdsourced security checkpoint condition data according to some embodiments.

FIG. 6 depicts an exemplary method 600 for providing crowdsourced security checkpoint condition data according to some embodiments. The structures in the security checkpoint server engine 400 (in FIG. 4A) depict examples of structures that may support the steps of the method 600 as follows. In some embodiments, the method 600 may comprise step 602, determining an initial location when a user enters a given distance of a security checkpoint. In the security checkpoint server engine 400, the user location engine 404 may determine an initial location when a user enters a given distance of a security checkpoint.

In various embodiments, one or more security checkpoint server engines 400 may determine the location of numerous users at and around one or more security checkpoints. General congestion information may be shared with security checkpoint agents as well as other users. Security checkpoint agents may, for example, use the information to request for additional agents at the congested security checkpoint. In some embodiments, the information may be shared with security checkpoint agents as well as other users to identify available security checkpoints that are underutilized. For example, security checkpoint agents may encourage travelers to go to a separate underutilized security checkpoint.

In step 604 a checkpoint identifier of the security checkpoint is provided when the user is at the initial location. In the security checkpoint server engine 400, the checkpoint identification engine 406 may provide a checkpoint identifier of the security checkpoint when the user is at the initial location.

In some embodiments, when any number of users are identified, security personnel at a security checkpoint may utilize the information to allocate resources. For example, user identification and/or other information may be anonymized before providing information to security personnel. Security personnel may identify a high number of families, students, and/or business travelers at any given time. Information regarding the type of users that pass through the checkpoint may be used to predict future travel patterns, add or subtract personnel, add additional metal detection devices (e.g., if there are a high number of pregnant women who pass through the checkpoint), or the like. In another example, security personnel at security checkpoints may learn from the information collected by the security checkpoint server engine 304 that a large number of travelers at a particular checkpoint may be infrequent travelers and may require additional instruction regarding acceptable travel carry-ons, passing through the security checkpoint efficiently, and/or acceptance of behavior in the security checkpoint, at an airline gate, or on a plane.

In step 606, a selection of the checkpoint identifier is received. In the security checkpoint server engine 400, the presence notification engine 410 may receive a selection of the checkpoint identifier. The checkpoint identifier may be received from the user, the mobile application, or any other source confirming the user's presence.

In step 608, user-generated information about the security checkpoint is received. In the security checkpoint server engine 400, the checkpoint information engine 412 may receive user-generated information about the security checkpoint. The user information may include, for example, length of lines, speed of lines, number of children present, quality of the checkpoint, professionalism of the TSA agents, type of screening being performed or the like.

In various embodiments, the user's location, rate of speed through the security checkpoint, and general security checkpoint congestion may be automatically determined. For example, the security checkpoint server engine 304 may determine the position of a user automatically as well as determine the rate at which the user passes through the checkpoint. The security checkpoint server engine 304 may extrapolate the length of line, security checkpoint congestion, and the like based on any number of travelers.

In step 610, the user-generated information may be integrated into crowdsourced condition data associated with the security checkpoint. In the security checkpoint server engine 400, the condition crowdsourcing engine 414 may integrate the user-generated information into crowdsourced condition data associated with the security checkpoint. Any statistical or mathematical model or method may collect, normalize, weigh, accumulate and/or normalize the information to obtain a model or likely expected condition of the checkpoint.

In one example, past conditions at a security checkpoint at times of important events, holidays, and the like may be used to extrapolate likely conditions in the future. This information may be used by travelers to prepare for travelling and encourage the travelers to allow for extra time or plan on passing through an underutilized security checkpoint. Personnel at security checkpoints may utilize the likely conditions to plan on extra personnel, prepare extra signs instructing the travelers on safety and procedures, open additional lines, and/or encourage utilization of other security checkpoints.

In various embodiments, the system may be configured to provide messages to travelers based on expected future conditions. For example, the system may provide email and/or text messages to warn of airport security checkpoint congestion. Security checkpoint personnel may also direct messages to a user based on information from the system (e.g., encouraging the users to be prepared to take off shoes, prepare personal electronics for scanning, identify the size and/or weight requirements of taking liquids onboard, display special instructions regarding infants and/or pregnant women, families, and the like).

In step 612, the crowdsourced condition data is provided to another user. In the security checkpoint server engine 400, the interuser connection engine 416 may provide the crowdsourced condition data to another user through, for example, the other user's mobile application. In some embodiments, this information may be pushed to the user as they approach the checkpoint (e.g., the other user receives a text or email regarding the checkpoint). Alternately, this information, may be available upon request (e.g., through interacting with the mobile application) by the other user.

Figure 7:
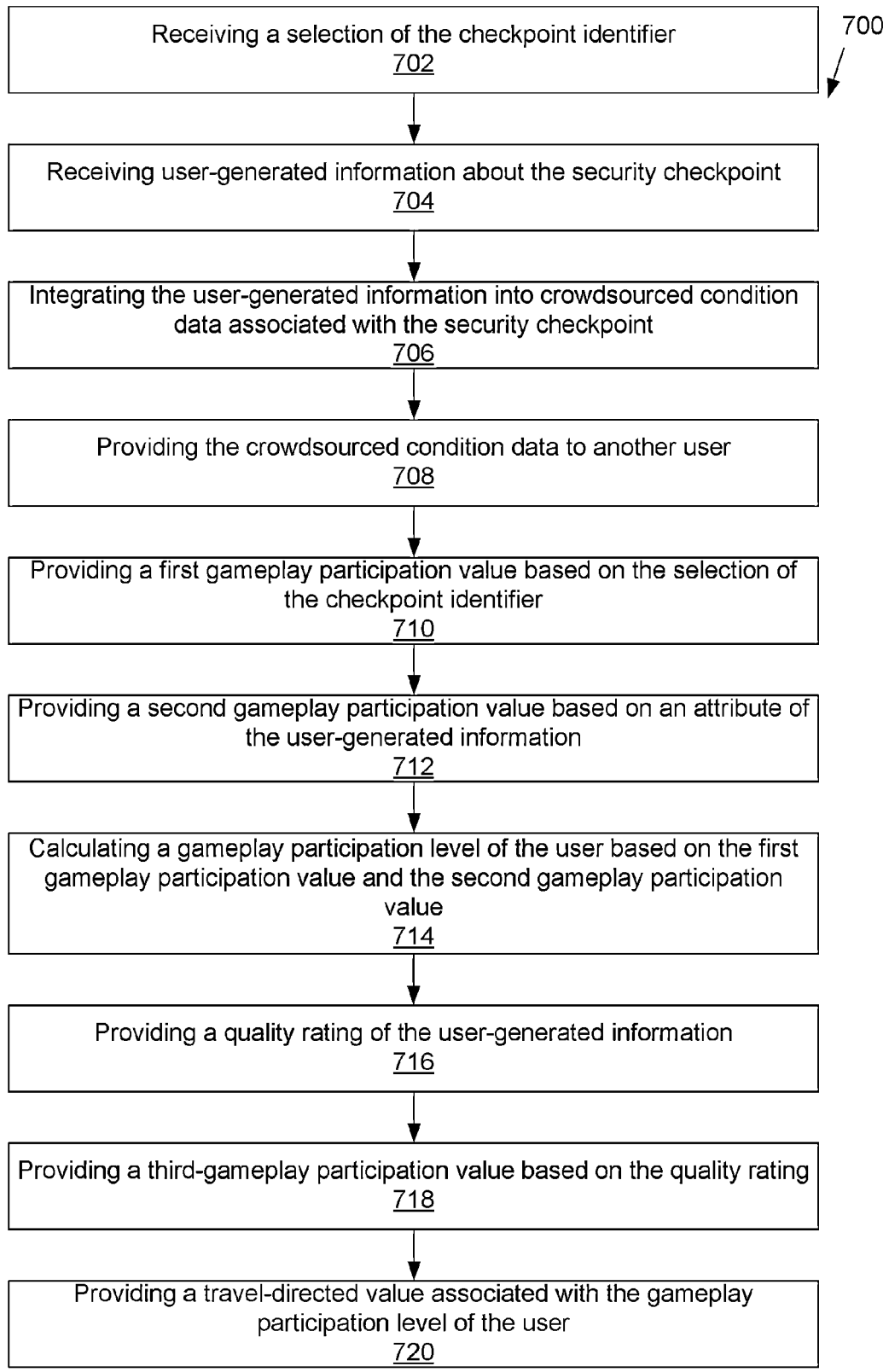
FIG. 7 depicts an exemplary method for providing crowdsourced security checkpoint condition data according to some embodiments.

FIG. 7 depicts an exemplary method 700 for providing crowdsourced security checkpoint condition data according to some embodiments. The structures in the security checkpoint server engine 400 (in FIGS. 4A and 4B) depict examples of structures that may support the steps of the method 700 as follows. In step 702, a selection of the checkpoint identifier is received. In the security checkpoint server engine 400, the presence notification engine 410 may receive a selection of the checkpoint identifier.

In step 704, the user-generated information about the security checkpoint is received. In the security checkpoint server engine 400, the checkpoint information engine 412 may receive user-generated information about the security checkpoint.

In step 706, the user-generated information is integrated into crowdsourced condition data associated with the security checkpoint. In the security checkpoint server engine 400, the condition crowdsourcing engine 414 may integrate the user-generated information into crowdsourced condition data associated with the security checkpoint.

In step 708, the crowdsourced condition data is provided to another user. In the security checkpoint server engine 400, the interuser connection engine 416 may provide the crowdsourced condition data to another user.

In step 710, a first gameplay participation value based on the selection of the checkpoint identifier is provided. In the security checkpoint server engine 400, the gameplay management engine 426 may provide a first gameplay participation value based on the selection of the checkpoint identifier.

In step 712, a second gameplay participation value based on an attribute of the user-generated information is provided. In the security checkpoint server engine 400, the gameplay management engine 426 may provide a second gameplay participation value based on an attribute of the user-generated information.

In step 714, a gameplay participation value of the user based on the first gameplay participation value and the second gameplay participation value is calculated.

In step 716, a quality rating of the user-generated information is provided. In the security checkpoint server engine 400, the user information rating engine 422 may provide a quality rating of the user-generated information.

In step 718, a third-gameplay participation value based on the quality rating is provided. In the security checkpoint server engine 400, the gameplay management engine 426 may provide a third-gameplay participation value based on the quality rating.

In step 720, a travel-directed value associated with the gameplay participation level of the user is provided. In the security checkpoint server engine 400, the traveler value engine 432 may provide a travel-directed value associated with the gameplay participation level of the user.

The process of receiving information about the security checkpoint as well as the user may better identify travelers and traveler habits. As a result, users may qualify for special offers and options based on their status. Third-party venders may receive information regarding important, respected, frequent travelers. Further, the type and concentration of travelers at different security checkpoints may assist a third-party to prepare direct messaging (e.g., advertising) to proximate potential customers as well as target customers.

Figure 8:
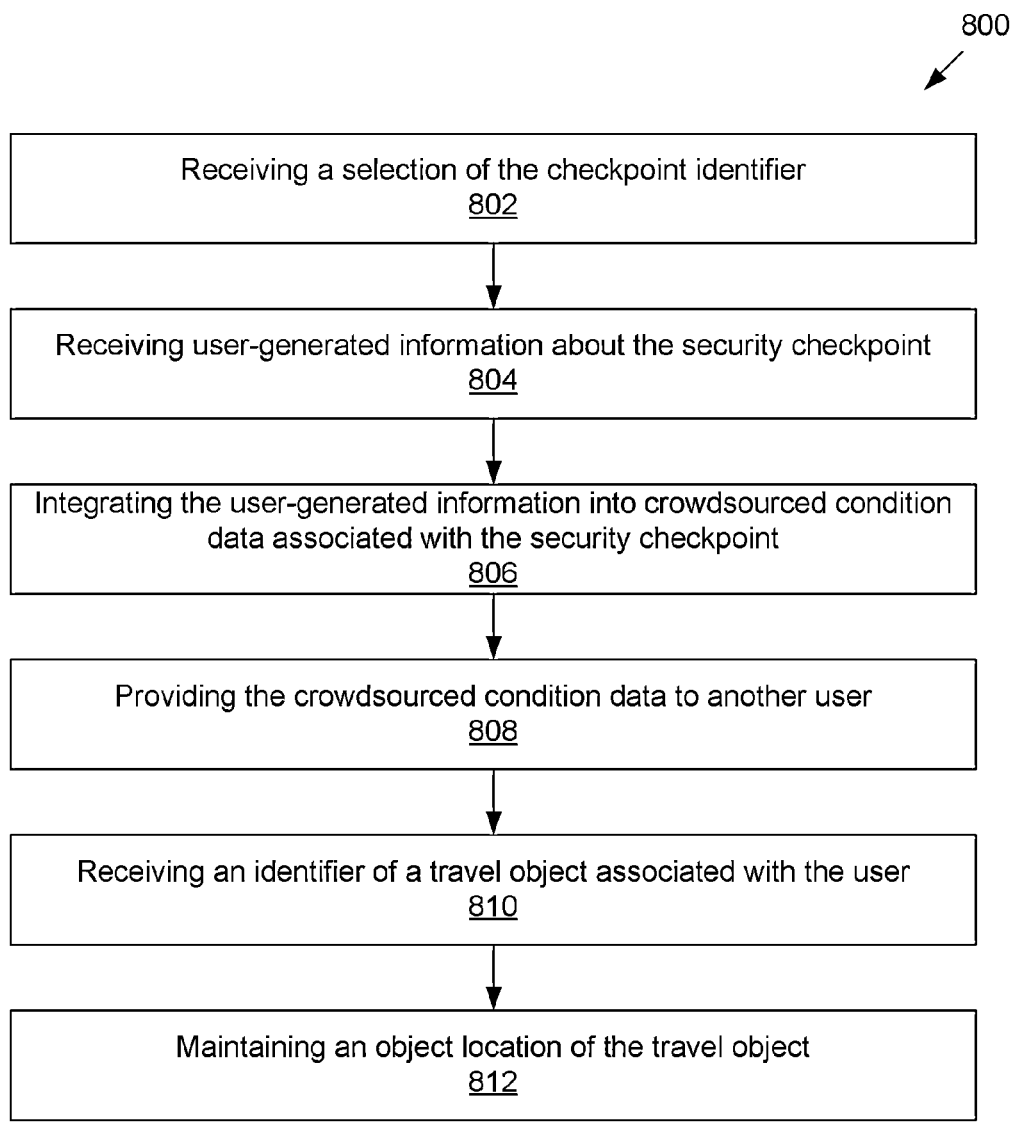
FIG. 8 depicts an exemplary method for providing crowdsourced security checkpoint condition data according to some embodiments.

FIG. 8 depicts an exemplary method 800 for providing crowdsourced security checkpoint condition data according to some embodiments. The structures in the security checkpoint server engine 400 (in FIG. 4A) depict examples of structures that may support the steps of the method 800 as follows. In various embodiments, in step 802, a selection of the checkpoint identifier is received. In the security checkpoint server engine 400, the presence notification engine 410 may receive a selection of the checkpoint identifier.

In step 804, receiving user-generated information about the security checkpoint. In the security checkpoint server engine 400, the checkpoint information engine 412 may receive user-generated information about the security checkpoint.

In step 806, the user-generated information is integrated into crowdsourced condition data associated with the security checkpoint. In the security checkpoint server engine 400, the condition crowdsourcing engine 414 may integrate the user-generated information into crowdsourced condition data associated with the security checkpoint.

In step 808, the crowdsourced condition data is provided to another user. In the security checkpoint server engine 400, the interuser connection engine 416 may provide the crowdsourced condition data to another user.

In step 810, an identifier of a travel object associated with the user is received. In the security checkpoint server engine 400, the travel object tracking engine 418 may receive an identifier of a travel object associated with the user.

In step 812, an object location of the travel object is maintained. In the security checkpoint server engine 400, the travel object tracking engine 418 may maintain an object location of the travel object.

Figure 9:
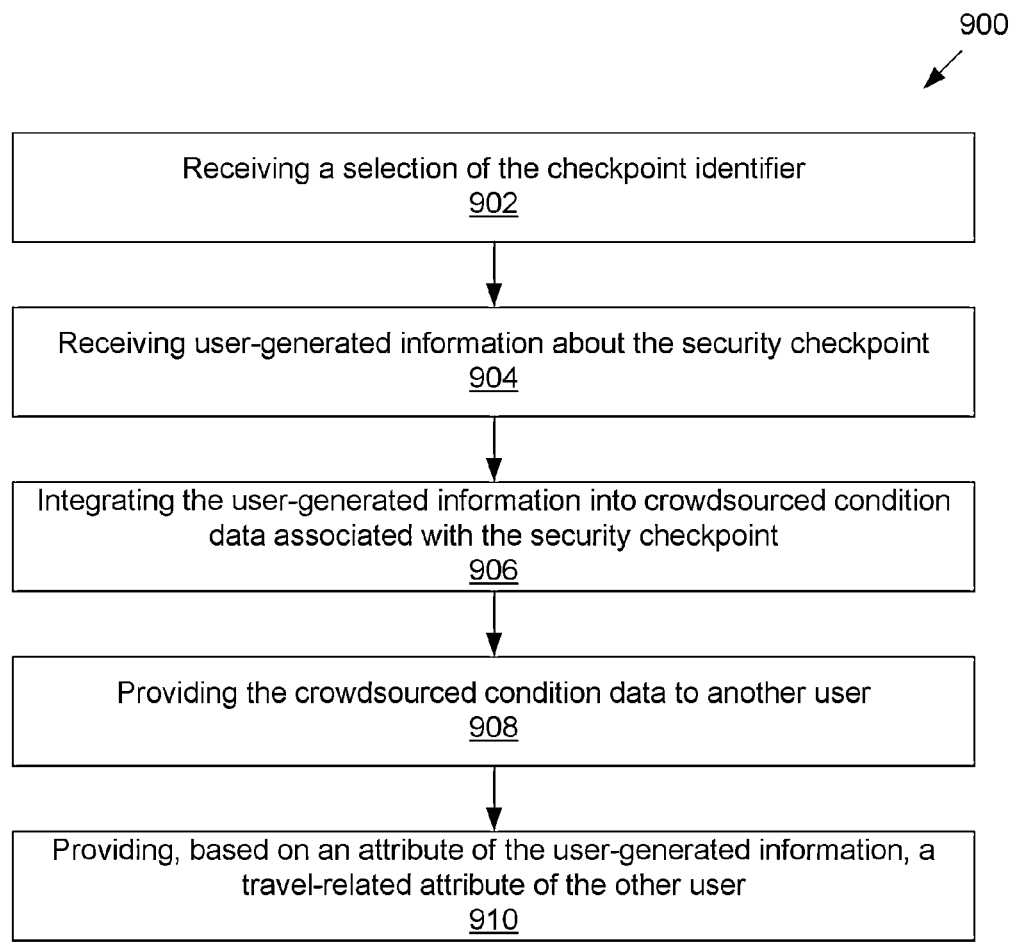
FIG. 9 depicts an exemplary method for providing crowdsourced security checkpoint condition data according to some embodiments.

FIG. 9 depicts an exemplary method 900 for providing crowdsourced security checkpoint condition data according to some embodiments. The structures in the security checkpoint server engine 400 (in FIG. 4A) depict examples of structures that may support the steps of the method 900 as follows. In step 902, a selection of the checkpoint identifier is received. In the security checkpoint server engine 400, the presence notification engine 410 may receive a selection of the checkpoint identifier.

In step 904, user-generated information about the security checkpoint is received. In the security checkpoint server engine 400, the checkpoint information engine 412 may receive user-generated information about the security checkpoint.

In step 906, the user-generated information is integrated into crowdsourced condition data associated with the security checkpoint. In the security checkpoint server engine 400, the condition crowdsourcing engine 414 may integrate the user-generated information into crowdsourced condition data associated with the security checkpoint.

In step 908, the crowdsourced condition data is provided to another user. In the security checkpoint server engine 400, the interuser connection engine 416 may provide the crowdsourced condition data to another user.

In step 910, a travel-related attribute is provided, based on an attribute of the user-generated information, of the other user. In the security checkpoint server engine 400, the interuser engine 416 may provide, based on an attribute of the user-generated information, a travel-related attribute of the other user.

FIG. 10 depicts an exemplary method 1000 for obtaining crowdsourced security checkpoint condition data according to some embodiments. The structures in the security checkpoint client engine 306 (in FIG. 5) depict examples of structures that may support the steps of the method 1000 as follows. In step 1002, an initial location when a user enters a given distance of a security checkpoint is provided. In the security checkpoint client engine 306, the user location client engine 506 may provide an initial location when a user enters a given distance of a security checkpoint.

In step 1004, a checkpoint identifier of the security checkpoint when the user is at the initial location is received. In the security checkpoint client engine 306, the security checkpoint selection engine 508 may receive a checkpoint identifier of the security checkpoint when the user is at the initial location.

In step 1006, a selection of the checkpoint identifier is accepted. In the security checkpoint selection client engine 500, the user interface engine 510 may accept a selection of the checkpoint identifier.

In step 1008, user-generated information about the security checkpoint is accepted. In the security checkpoint selection client engine 500, the user interface engine 510 may accept user-generated information about the security checkpoint. The method 1000 may comprise step 1010, a gameplay participation level of the user based on the selection of the checkpoint identifier and an attribute of the user-generated information is provided. In the security checkpoint client engine 306, the gameplay client engine 514 may provide a gameplay participation level of the user based on the selection of the checkpoint identifier and an attribute of the user-generated information.

In step 1012 a travel-directed value associated with the gameplay participation level is provided. In the security checkpoint client engine 306, the user interface engine 510 may provide to the user interface display 512 providing a travel-directed value associated with the gameplay participation level.

In step 1014, the user with crowdsourced condition data of the security checkpoint is provided. In the security checkpoint client engine 306, the crowdsourced client engine 516 may provide the user with crowdsourced condition data of the security checkpoint.

FIG. 11 depicts an exemplary digital device 1100 according to some embodiments. The digital device 1100 comprises a processor 1102, a memory system 1104, a storage system 1106, a communication network interface 1108, an I/O interface 1110, and a display interface 1112 communicatively coupled to a bus 1114. The processor 1102 may be configured to execute executable instructions (e.g., programs). In some embodiments, the processor 1102 comprises circuitry or any processor capable of processing the executable instructions.

The memory system 1104 is any memory configured to store data. Some examples of the memory system 1104 are storage devices, such as RAM or ROM. The memory system 1104 may comprise the RAM cache. In various embodiments, data is stored within the memory system 1104. The data within the memory system 1104 may be cleared or ultimately transferred to the storage system 1106.

The storage system 1106 is any storage configured to retrieve and store data. Some examples of the storage system 1106 are flash drives, hard drives, optical drives, and/or magnetic tape. In some embodiments, the digital device 1100 includes a memory system 1104 in the form of RAM and a storage system 1106 in the form of flash data. Both the memory system 1104 and the storage system 1106 comprise computer readable media which may store instructions or programs that are executable by a computer processor including the processor 1102.

The communication network interface (com. network interface) 1108 may be coupled to a data network (e.g., data network 1104 or 1114) via the link 1116. The communication network interface 1108 may support communication over an Ethernet connection, a serial connection, a parallel connection, or an ATA connection, for example. The communication network interface 1108 may also support wireless communication (e.g., 802.11a/b/g/n, WiMAX). It will be apparent to those skilled in the art that the communication network interface 1108 may support many wired and wireless standards.

The optional input/output (I/O) interface 1110 may be any device that receives input from the user and output data. The optional display interface 1112 may be any device that may be configured to output graphics and data to a display. In one example, the display interface 1112 may be a graphics adapter.

It will be appreciated by those skilled in the art that the hardware elements of the digital device 1100 are not limited to those depicted in FIG. 11. A digital device 1100 may comprise more or less hardware elements than those depicted. Further, hardware elements may share functionality and still be within various embodiments described herein. In one example, encoding and/or decoding may be performed by the processor 1102 and/or a co-processor located on a GPU.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

We claim:

1. A system, comprising:
a user location engine configured to identify an initial location of a first digital device associated with a first user, the initial location corresponding to an entry point of a queue leading to a scanner in a security checkpoint in a secure screening environment of a secure facility;
a checkpoint identification engine configured to provide, in response to the user location engine identifying the initial location of the first digital device, a checkpoint identifier to a first mobile application providing a first user interface in a first web browser or a first container application executing on the first digital device, the checkpoint identifier identifying the security checkpoint, and the checkpoint identifier being from a list of checkpoint identifiers associated with the secure facility, the checkpoint identifier being provided from a comparison of the initial location of the first user to a list of checkpoint locations on a digital airport map;
a presence notification engine configured to receive a selection of the checkpoint identifier, the selection being based on user-input by the first user into the first mobile application, and the selection indicating the first user confirmed that the first user is at the initial location;
a checkpoint information engine configured to receive user-generated information regarding the security checkpoint, the user-generated information being generated by first user input by the first user into the first mobile application, the user-generated information providing a description of an attribute of the secure screening environment;
a condition crowdsourcing engine configured to integrate the user-generated information into crowdsourced condition data associated with the security checkpoint, the crowdsourced condition data providing a crowdsourced measure of a wait time for passengers to pass through the queue to the scanner in the security checkpoint, and the crowdsourced condition data being based on second user input by a second user who previously passed through the queue to the scanner in the security checkpoint, the second user input being received by a second mobile application providing a second user interface in a second web browser or a second container application executing on a second digital device associated with the second user;
an interuser connection engine configured to provide the crowdsourced condition data to a third mobile application executing on a third digital device associated with a third user, thereby providing to the third mobile application a crowdsourced wait time corresponding to a wait time for passing through the queue to the scanner in the security checkpoint;
a user information rating engine configured to provide to the third mobile application a quality rating of the user-generated information; and
a security checkpoint gameplay engine configured to:
assign a check-in state in the first mobile application corresponding to the first user selecting the checkpoint identifier;
assign the first user points in response to assigning the check-in state, and provide profile information enabling offering some of the profile information to an airport or a security agency.

2. The system of claim 1, wherein the user input comprises an estimate of a wait time for the user to pass through the security checkpoint.

3. The system of claim 1, wherein the user input comprises a timed passage through the security checkpoint.

4. The system of claim 1, wherein the description of the attribute of the secure screening environment comprises a user-generated description of one or more of: a physical condition of the security checkpoint, a quality of security service of the security checkpoint, a security concern, a specific security device, and information about another passenger passing through the security checkpoint.

5. The system of claim 1, wherein the description of the attribute of the secure screening environment comprises a selection of a description of one or more of: a physical condition of the security checkpoint, a quality of security service of the security checkpoint, a security concern, and information about another passenger passing through the security checkpoint.

6. The system of claim 5, further comprising a geography-based transmitter coupled to the user location engine, the geography-based transmitter being configured to receive global positioning system (GPS) coordinates corresponding to a position of the system, and to provide the GPS coordinates of the system to the user location engine.

7. The system of claim 1, wherein the user location engine identifies the initial location using a geography-based transmitter on the first mobile device.

8. The system of claim 1, wherein the user location engine determines the initial location based on a substantial decrease in a velocity of the first user.

9. The system of claim 1, wherein the list of checkpoint identifiers is gathered from a security agency or a government agency.

10. The system of claim 1, wherein the condition crowdsourcing engine adapts the crowdsourced condition data based on the quality rating of the user-generated information.

11. The system of claim 1, further comprising an information partnership management engine that, in operation, associates the user-generated information with an information partner, the information partner providing information that links the third user to one or more of the first user and the second user.

12. The system of claim 1, wherein the secure facility comprises an airport.

13. The system of claim 1, wherein the user-generated information further comprises a timed passage through the security checkpoint.

14. A method, comprising:
identifying an initial location of a first digital device associated with a first user, the initial location corresponding to an entry point of a queue leading to a scanner in a security checkpoint in a secure screening environment of a secure facility;
providing, in response to identifying the initial location of the first digital device, a checkpoint identifier to a first mobile application providing a first user interface in a first web browser or a first container application executing on the first digital device, the checkpoint identifier identifying the security checkpoint, and the checkpoint identifier being from a list of checkpoint identifiers associated with the secure facility, the checkpoint identifier being provided from a comparison of the initial location of the first user to a list of checkpoint locations on a digital airport map;
receiving a selection of the checkpoint identifier, the selection being based on user-input by the first user into the first mobile application, and the selection indicating the first user confirmed the first user is at the initial location;
receiving user-generated information about the security checkpoint, the user-generated information being generated by user input by the first user into the first mobile application, the user-generated information providing a description of an attribute of the secure screening environment;
integrating the user-generated information into crowdsourced condition data associated with the security checkpoint, the crowdsourced condition data providing a crowdsourced measure of a wait time for passengers to pass through the queue to the scanner in the security checkpoint, and the crowdsourced condition data being based on second user input by a second user who passed through the queue to the scanner in the security checkpoint, the second user input being received by a second mobile application providing a second user interface in a second web browser or a second container application executing on a second digital device associated with the second user;
providing the crowdsourced condition data to a third mobile application executing on a third digital device associated with a third user, thereby providing to the third mobile application a crowdsourced wait time corresponding to a wait time for passing through the queue to the scanner in the security checkpoint;
providing to the third mobile application a quality rating of the user-generated information;
assigning a check-in state in the first mobile application corresponding to the first user selecting the checkpoint identifier;
assigning the first user points in response to assigning the check-in state; and
providing profile information enabling offering some of the profile information to an airport or a security agency.

15. The method of claim 14, wherein the user input comprises an estimate of a wait time for the user to pass through the security checkpoint.

16. The method of claim 14, wherein the user input comprises a timed passage through the security checkpoint.

17. The method of claim 14, wherein the description of the attribute of the secure screening environment comprises a user-generated description of one or more of: a physical condition of the security checkpoint, a quality of security service of the security checkpoint, a security concern, a specific security device, and information about another passenger passing through the security checkpoint.

18. The method of claim 14, wherein the description of the attribute of the secure screening environment comprises a selection of a description of one or more of: a physical condition of the security checkpoint, a quality of security service of the security checkpoint, a security concern, and information about another passenger passing through the security checkpoint.

19. The method of claim 14, wherein determining the initial location of the user comprises determining a substantial decrease in velocity of the first user.

20. The method of claim 14, wherein providing the list of checkpoints comprises gathering the list of checkpoints from a security agency or a government agency.

21. The method of claim 14, further comprising adapting the crowdsourced condition data based on the quality rating of the user-generated information.

22. The method of claim 14, further comprising associating the user-generated information with an information partner, the information partner providing information that links the third user to one or more of the first user and the second user.

23. A non-transitory computer-readable medium having embodied thereon a program, the program being executable by a processor for performing a method, the method comprising:
   identifying an initial location of a first digital device associated with a first user, the initial location corresponding to an entry point of a queue leading to a scanner in a security checkpoint in a secure screening environment of a secure facility;
   providing, in response to identifying the initial location of the first digital device, a checkpoint identifier to a first mobile application providing a first user interface in a first web browser or a first container application executing on the first digital device, the checkpoint identifier identifying the security checkpoint, and the checkpoint identifier being from a list of checkpoint identifiers associated with the secure facility, the checkpoint identifier being provided from a comparison of the initial location of the first user to a list of checkpoint locations on a digital airport map;
   receiving a selection of the checkpoint identifier, the selection being based on input by the first user into the first mobile application, and the selection indicating the first user confirmed the first user is at the initial location;
   receiving user-generated information about the security checkpoint, the user-generated information being generated by user input by the first user into the first mobile application, the user-generated information providing a description of an attribute of the secure screening environment;
   integrating the user-generated information into crowdsourced condition data associated with the security checkpoint, the crowdsourced condition data providing a crowdsourced measure of a wait time for passengers to pass through the queue to the scanner in the security checkpoint, and the crowdsourced condition data being based on second user input by a second user who passed through the queue to the scanner in the security checkpoint, the second user input being received by a second mobile application providing a second user interface in a second web browser or a second container application executing on a second digital device associated with the second user;
   providing the crowdsourced condition data to a third mobile application executing on a third digital device associated with a third user, thereby providing to the third mobile application a crowdsourced wait time corresponding to a wait time for passing through the queue to the scanner in the security checkpoint;
   providing to the third mobile application a quality rating of the user-generated information;
   assigning a check-in state in the first mobile application corresponding to the first user selecting the checkpoint identifier;
   assigning the first user points in response to assigning the check-in state; and
   providing profile information enabling offering some of the profile information to an airport or a security agency.

24. The system of claim 1, wherein the first digital device comprises one or more of a smartphone associated with the first user, and a wearable digital device associated with the first user.

25. The method of claim 14, wherein the first digital device comprises one or more of a smartphone associated with the first user, and a wearable digital device associated with the first user.

26. The system of claim 1, wherein the security checkpoint is one of a plurality of security checkpoints in the secure facility.

27. The system of claim 26, wherein each of the plurality of security checkpoints separate a first area of an airport from a second area of the airport by a scanner operated by one or more security screening personnel.

28. The system of claim 26, wherein the checkpoint identifier is one of a plurality of checkpoint identifiers, each of the plurality of checkpoint identifiers identifying one of the plurality of security checkpoints.

29. The system of claim 28, wherein the selection of the checkpoint identifier comprises a selection of one of the plurality of checkpoint identifiers, the one of the plurality of checkpoint identifiers identifying the security checkpoint.

30. The method of claim 14, wherein the security checkpoint is one of a plurality of security checkpoints in the secure facility.

31. The method of claim 30, wherein each of the plurality of security checkpoints separate a first area of an airport from a second area of the airport by scanner operated by one or more security screening personnel.

32. The method of claim 30, wherein the checkpoint identifier is one of a plurality of checkpoint identifiers, each of the plurality of checkpoint identifiers identifying one of the plurality of security checkpoints.

33. The method of claim 32, wherein the selection of the checkpoint identifier comprises a selection of one of the plurality of checkpoint identifiers, the one of the plurality of checkpoint identifiers identifying the security checkpoint.

* * * * *